(12) United States Patent
Moore, II et al.

(10) Patent No.: US 12,411,527 B1
(45) Date of Patent: Sep. 9, 2025

(54) WRAP FOR HANDHELD ELECTRONIC DEVICE AND METHODS FOR USING SAME

(71) Applicant: WYNNSHIELD LLC, Charlotte, NC (US)

(72) Inventors: Kenneth Eugene Moore, II, Charlotte, NC (US); Jennifer Ambrosio, Charlotte, NC (US)

(73) Assignee: WYNNSHIELD LLC, Charlotte, NC (US)

( * ) Notice: Subject to any disclaimer, the term of this patent is extended or adjusted under 35 U.S.C. 154(b) by 189 days.

(21) Appl. No.: 18/232,895

(22) Filed: Aug. 11, 2023

Related U.S. Application Data

(60) Provisional application No. 63/471,042, filed on Jun. 5, 2023, provisional application No. 63/418,756, filed on Oct. 24, 2022, provisional application No. 63/397,170, filed on Aug. 11, 2022.

(51) Int. Cl.
*G06F 1/16* (2006.01)

(52) U.S. Cl.
CPC .................................. *G06F 1/1656* (2013.01)

(58) Field of Classification Search
CPC .... G06F 1/1601; G06F 1/1629; G06F 1/1633; G06F 1/1656; G06F 2200/1633
See application file for complete search history.

(56) References Cited

U.S. PATENT DOCUMENTS

| | | | |
|---|---|---|---|
| 10,422,158 B2 | 9/2019 | Strombeck et al. | |
| 10,712,595 B2 | 7/2020 | Yang | |
| 11,736,136 B1* | 8/2023 | Altman, III | H04B 1/3888 455/575.8 |
| 11,755,063 B2* | 9/2023 | Pruter | B65D 65/00 53/461 |
| 2005/0116334 A1* | 6/2005 | Buehler | G06F 1/1613 257/704 |
| 2008/0055820 A1* | 3/2008 | Coleman | H04B 1/3888 361/600 |
| 2010/0136282 A1* | 6/2010 | Moss | H04N 5/65 428/99 |

(Continued)

*Primary Examiner* — Anthony Q Edwards
(74) *Attorney, Agent, or Firm* — TILLMAN WRIGHT, PLLC; James D. Wright; David R. Higgins

(57) ABSTRACT

A covering section for use in shielding handheld electronic devices from a surrounding environment, includes a pliable layer and a peel-away liner layer. The pliable layer has first and second oppositely facing sides, each including a surface. The surface at the first side is an at least predominantly tacky surface having a water-based adhesive, and the surface at the second side is a non-tacky surface. The peel-away liner layer is removably overlaid against the at least predominantly tacky surface of the pliable layer. The pliable layer is formed of a transparent material, has a thickness measuring between about 2 mils and about 12 mils, and includes an antimicrobial agent. Upon separation of the peel-away liner layer from the pliable layer, the pliable layer is arrangeable relative to a handheld electronic device such that the pliable layer at least substantially entirely covers the handheld electronic device to provide a barrier between the handheld electronic device and the surrounding environment for preventing transmission of contaminants therebetween.

20 Claims, 45 Drawing Sheets

(56) References Cited

U.S. PATENT DOCUMENTS

| | | | |
|---|---|---|---|
| 2011/0147255 A1* | 6/2011 | Kuranda | B65C 9/0006 |
| | | | 53/461 |
| 2011/0283443 A1 | 11/2011 | Simpson | |
| 2012/0071217 A1 | 3/2012 | Park | |
| 2012/0251756 A1 | 10/2012 | Buckley | |
| 2012/0314354 A1* | 12/2012 | Rayner | G06F 1/1633 |
| | | | 361/679.01 |
| 2013/0129958 A1 | 5/2013 | Li | |
| 2014/0162009 A1 | 6/2014 | Hwang | |
| 2015/0108185 A1* | 4/2015 | Polytaridis | A61B 5/14532 |
| | | | 224/191 |
| 2015/0153853 A1 | 6/2015 | Cheng et al. | |
| 2015/0364824 A1 | 12/2015 | Song et al. | |
| 2016/0021997 A1* | 1/2016 | Gonzalez | A45C 11/00 |
| | | | 224/191 |
| 2016/0135314 A1 | 5/2016 | Ma et al. | |
| 2017/0231344 A1 | 8/2017 | Zumbiel | |
| 2018/0289122 A1 | 10/2018 | Lin | |
| 2020/0218307 A1* | 7/2020 | Pruter | B08B 17/04 |
| 2020/0221606 A1 | 7/2020 | Lee et al. | |
| 2021/0229397 A1 | 7/2021 | Conway | |
| 2022/0206541 A1* | 6/2022 | Crawford | G01N 21/78 |
| 2023/0320468 A1* | 10/2023 | Cochran | A45C 11/00 |
| 2023/0393611 A1* | 12/2023 | Pruter | B32B 38/1841 |

\* cited by examiner

WRAP FOR HANDHELD ELECTRONIC DEVICE AND METHODS FOR USING SAME

CROSS-REFERENCE TO RELATED APPLICATIONS

The present application is a U.S. nonprovisional patent application of, and claims priority under 35 U.S.C. § 119 (e) to, each of:
(a) U.S. provisional patent application Ser. No. 63/397,170, filed Aug. 11, 2022, which '170 application is incorporated by reference herein in its entirety;
(b) U.S. provisional patent application Ser. No. 63/418,756, filed Oct. 24, 2022, which '756 application is incorporated by reference herein in its entirety; and
(c) U.S. provisional patent application Ser. No. 63/471,042, filed Jun. 5, 2023, which '042 application is incorporated by reference herein in its entirety.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE PRESENT INVENTION

Field of the Present Invention

The present invention relates generally to electronic device wraps, and, in particular, to wraps that cover a smartphone, a tablet, or other handheld device to act as a barrier between the device and the surrounding environment for impeding the transfer of pathogens.

Background

Handheld electronic devices have become an integral part of modern life and are in the hands of billions of users worldwide every day. Between 2011 and 2018 the adoption rate of such devices skyrocketed from 10% to 60% while the upward trend is expected to reach 85% as soon as 2023.

Smartphones, tablets, and other handheld electronic devices are generally regarded as essential and well-integrated workplace tools. This is particularly true within the health care industry. A 2013 study explored smartphone applicability within a pediatric ward. The study highlighted the effectiveness of smartphones with respect to a wide range of applications including medical calculators (e.g., Qx, PICU calculator, phototherapy calculator), drug information (e.g., Micromedex drug information, the Sanford guide to antimicrobial therapy), epidemiology (e.g., Learn-Stat) and medical news (e.g., MedPage). Additionally, the study indicated that smartphones enable health care providers to connect with clinical information at the point of care, which ultimately provides patients with the best possible evidence-based practice. However, the study further noted that, as handheld devices, smartphones carry the potential to compromise an aseptic environment.

Smartphones, in particular, undergo a high frequency of use. When used as a phone, a smartphone is commonly placed against a user's ear and in close proximity to the user's nose and mouth. If the user happens to be suffering from an illness, perhaps even asymptomatically, then exhaled pathogens are prone to collect on the surface of the smartphone. It should also be noted that smartphones are designed to function as handheld devices, usually with touchscreens to simplify a user's ability to interact with the device. However, despite their convenience, smartphone touchscreens provide a convenient surface upon which germs and pathogens from a user's hands and fingers can adhere. Still further, smartphone behavior has evolved to a point where users tend to take and use their smartphones just about anywhere, which only serves to increase the likelihood of smartphones encountering contaminants.

According to some studies, smartphones are among the dirtiest objects that we come into contact with on a daily basis. In some measurements, it is estimated that an average smartphone carries around 25,000 bacteria per square inch—an amount that places an average smartphone on par with (or dirtier than) such things as a pet food dish, a checkout touchscreen, a doorknob, and even a toilet seat. This may be explained in part by the fact that smartphones, while in operation, tend to heat up to temperatures that favor the survival and growth of microorganisms. Thus, once germs have found their way to a smartphone, the device may itself provide an environment to foster germ growth and spread. Research focused on smartphones as a biosecurity risk has gained momentum in recent years. Relevant factors affecting biosecurity include the in-built temperature control of smartphones, frequent use by unhygienic hands, deposition of saliva droplets on smartphone surfaces during telephone calls, and the absence of any well-defined procedures to decontaminate smartphones. In this regard, devices that rely heavily on a touchscreen interface—particularly smartphones—may be ideal fomites for microorganisms and may be powerful contributors to global microbial dissemination.

In the medical arena, germ-covered smartphones are a legitimate concern. Medical facilities work hard to implement and improve hygienic practices to ensure that contaminants do not enter a sterile location. However, these efforts are easily undermined when a personal smartphone or other device is accessed by a patient or a provider in an otherwise clean environment. Contamination risk can increase when accessing a smartphone is simply part of a regular process in such an environment, such as when a smartphone is used as a tool to research pharmacological effects of a medication, to maintain electronic medical records, or simply to communicate with a colleague.

Cleaning a smartphone is unfortunately not a common practice, even for medical facilities. Although disposable cleaning wipes are sometimes provided, disinfecting chemicals contained on the wipe can cause degradation of the touchscreen over time. Additionally, certain types of cleaning wipes can create scratches in the touchscreen surface. Other disinfecting options include the utilization of an ultraviolet (UV) light pulse that may help eliminate surface bacteria. However, short UV light pulses may not be effective at eliminating all types of bacteria found on smartphones. Nor can UV light keep up with the quantity of new pathogens that come into contact with a smartphone consistently throughout a day. Thus, the inconvenience and time required to keep a smartphone clean by passing through a UV light is simply too great for UV light pulses to be a practical solution.

In view of the foregoing, a need exists for an apparatus and methodology for ensuring that contaminants found on smartphones, tablets, and related handheld electronic devices do not spread to otherwise clean environments, such as medical facilities. This and/or other needs are addressed by one or more aspects of the present invention.

SUMMARY OF THE PRESENT INVENTION

Some exemplary embodiments of the present invention may overcome one or more of the above disadvantages and other disadvantages not described above, but the present invention is not required to overcome any particular disadvantage described above, and some exemplary embodiments of the present invention may not overcome any of the disadvantages described above.

The present invention includes many aspects and features. Moreover, while many aspects and features relate to, and are described in, the context of electronic device wraps, the present invention is not limited to use only in electronic device wraps, as will become apparent from the following summaries and detailed descriptions of aspects, features, and one or more embodiments of the present invention.

Broadly defined, the present invention according to one aspect includes a wrap for at least substantially covering a handheld electronic device to provide a barrier between the handheld electronic device and a surrounding environment to prevent transmission of contaminants therebetween. The wrap includes a transparent material having a tacky surface at a top-facing side and a non-tacky surface at a bottom-facing side. The tacky surface includes a level of adhesive stickiness measuring between about 0.5 ounces per inch to about 12 ounces per inch. The material includes a thickness measuring between about 1 mil to about 6 mils. The tacky surface is adapted to adhere to at least some portions of the handheld electronic device, to the non-tacky surface, and to itself.

In a feature of this aspect, the material includes one or more of polyethylene, polypropylene, polyester, polyurethane, or ethylene vinyl acetate.

In another feature of this aspect, the material includes an antimicrobial additive or agent. In another feature of this aspect, the antimicrobial additive or agent is a coating on the material.

In another feature of this aspect, the material is scratch-resistant.

In another feature of this aspect, the material is water resistant.

In another feature of this aspect, the wrap further includes an indication to a user for where to place the handheld electronic device on the tacky surface. In another feature of this aspect, the indication includes a notch arranged toward a corner of the material.

In another feature of this aspect, the wrap further includes a backing that adheres to and preserves the tacky surface until the wrap is ready for use. In another feature of this aspect, the backing is a peel-away backing. In another feature of this aspect, the backing includes an indication regarding where to peel the backing away from the tacky surface.

In another feature of this aspect, the backing includes one or more colors or branding information. In another feature of this aspect, the backing includes a template for where to place the handheld electronic device on the tacky surface. In another feature of this aspect, the backing includes instructions for how to use the wrap.

In another feature of this aspect, the backing includes a seam that divides the backing into two separate adjacent sections. In another feature of this aspect, each section of the backing is adapted to be removable from the tacky surface while the other section remains in place against the tacky surface.

In another feature of this aspect, the material includes one or more perforations.

In another feature of this aspect, is generally quadrilaterally shaped. In another feature of this aspect, the material is generally rectangular. In another feature of this aspect, the generally rectangular material has long edges measuring about 9 inches and short edges measuring about 8 inches.

In another feature of this aspect, the wrap further includes a zipper closure mechanism attached to the material.

In another feature of this aspect, the material includes one or more perforations or cutouts therein that correspond to locations of one or more of a smartphone camera or smartphone speakers.

In another feature of this aspect, the material includes a water-based coating that includes an antimicrobial agent or additive.

In another feature of this aspect, the material includes a UV stabilizer or a UV inhibitor.

In another feature of this aspect, the material or a coating applied to the material includes embedded silver ion particles as an antimicrobial agent or additive.

In another feature of this aspect, the material is a polyethylene terephthalate material.

Broadly defined, the present invention according to another aspect includes a method of establishing and/or removing a barrier between a handheld electronic device and a surrounding environment to prevent transmission of contaminants therebetween. The method includes: providing a wrap comprising a transparent material having a tacky surface at a top-facing side and a non-tacky surface at a bottom-facing side; positioning a handheld electronic device on the tacky surface; and folding the wrap such that the tacky surface adheres to one or more surfaces of the handheld electronic device, to the non-tacky surface, or to itself, thereby at least substantially entirely covering the handheld electronic device.

In a feature of this aspect, the material includes one or more of polyethylene, polypropylene, polyester, polyurethane, or ethylene vinyl acetate.

In another feature of this aspect, the material includes an antimicrobial additive or agent. In another feature of this aspect, the antimicrobial additive or agent is a coating on the material.

In another feature of this aspect, the material is scratch-resistant.

In another feature of this aspect, the material is water resistant.

In another feature of this aspect, the wrap further comprises an indication to a user for where to place the handheld electronic device on the tacky surface. In another feature of this aspect, positioning the handheld electronic device on the tacky surface includes arranging a corner of the handheld electronic device adjacent the indication.

In another feature of this aspect, the material includes one or more perforations. In another feature of this aspect, the method further includes tearing away, along one of the one or more perforations, an excess portion of the material.

In another feature of this aspect, the method further includes removing wrinkles or air pockets from the folded wrap. In another feature of this aspect, wrinkles or air pockets in the folded wrap are removed with a separate tool having a flat edge.

In another feature of this aspect, the wrap further comprises a backing that adheres to and preserves the tacky surface until the wrap is ready for use. In another feature of this aspect, the backing is a peel-away backing. In another feature of this aspect, the backing includes an indication regarding where to peel the backing away from the tacky surface.

In another feature of this aspect, the backing includes one or more colors or branding information. In another feature of this aspect, the backing includes a template for where to place the handheld electronic device on the tacky surface. In another feature of this aspect, the backing includes instructions for how to use the wrap.

In another feature of this aspect, the method further includes, prior to positioning the handheld electronic device on the tacky surface, removing the backing from the tacky surface.

In another feature of this aspect, the backing includes a seam that divides the backing into two separate adjacent sections. In another feature of this aspect, each section of the backing is adapted to be removable from the tacky surface while the other section remains in place against the tacky surface.

In another feature of this aspect, the method further includes, prior to positioning the handheld electronic device on the tacky surface, removing one of the two sections of the backing from the tacky surface such that the other section is retained against the tacky surface, thereby providing a non-tacky area on the tacky surface. In another feature of this aspect, the non-tacky area of the tacky surface is located along an upper edge of the wrap. In another feature of this aspect, the non-tacky area of the tacky surface extends along an entirety of the upper edge of the wrap and has a side length measuring between about an eighth of an inch to about an inch. In another feature of this aspect, the method further includes lifting an edge or corner of the non-tacky area to initiate removal of the wrap from the handheld electronic device. In another feature of this aspect, the method further includes pulling overlapped layers of the non-tacky section apart from one another.

In another feature of this aspect, the method further includes using the handheld electronic device to accomplish one or more tasks while covered by the wrap.

In another feature of this aspect, the method further includes using a tool having a sharp edge to puncture the wrap to facilitate removal from the handheld electronic device.

In another feature of this aspect, the tacky surface includes a level of adhesive stickiness measuring between about 0.5 ounces per inch to about 12 ounces per inch.

In another feature of this aspect, the material includes a thickness measuring between about 1 mil to about 6 mils.

In another feature of this aspect, the material is generally quadrilaterally shaped. In another feature of this aspect, the material is generally rectangular. In another feature of this aspect, the generally rectangular material has long edges measuring about 9 inches and short edges measuring about 8 inches.

Broadly defined, the present invention according to another aspect includes a wrap for establishing a barrier between a handheld electronic device and a surrounding environment to prevent transmission of contaminants therebetween, substantially as shown and described. In a feature of this aspect, the handheld electronic device is a smartphone. In another feature of this aspect, the handheld electronic device is a tablet.

Broadly defined, the present invention according to another aspect includes a wrap for at least substantially covering a handheld electronic device to provide a barrier between the handheld electronic device and a surrounding environment to prevent transmission of contaminants therebetween. The wrap includes a transparent material having a tacky surface at a top-facing side and a non-tacky surface at a bottom-facing side. The tacky surface is adapted to adhere to at least some portions of the handheld electronic device, to the non-tacky surface, and/or to itself.

Broadly defined, the present invention according to another aspect includes a method of establishing and/or removing a barrier between a handheld electronic device and a surrounding environment to prevent transmission of contaminants therebetween, substantially as shown and described. In a feature of this aspect, the handheld electronic device is a smartphone. In another feature of this aspect, the handheld electronic device is a tablet.

Broadly defined, the present invention according to another aspect includes a method of sandwich wrapping a handheld electronic device using a plurality of wraps, substantially as shown and described.

Broadly defined, the present invention according to another aspect includes a covering section for use in shielding handheld electronic devices from a surrounding environment. The covering section includes a pliable layer and a peel-away liner layer. The pliable layer has first and second oppositely facing sides, each including a surface. The surface at the first side is an at least predominantly tacky surface having a water-based adhesive, and the surface at the second side is a non-tacky surface. The peel-away liner layer is removably overlaid against the at least predominantly tacky surface of the pliable layer. The pliable layer is formed of a transparent material, has a thickness measuring between about 2 mils and about 12 mils, and includes an antimicrobial agent. Upon separation of the peel-away liner layer from the pliable layer, the pliable layer is arrangeable relative to a handheld electronic device such that the pliable layer at least substantially entirely covers the handheld electronic device to provide a barrier between the handheld electronic device and the surrounding environment for preventing transmission of contaminants therebetween. The at least predominantly tacky surface is removably adherable to the handheld electronic device, to the non-tacky surface of the pliable layer, or to itself. A display screen of the handheld electronic device is viewable through the pliable layer. One or more device functions are available when the pliable layer is arranged to at least substantially entirely cover the handheld electronic device.

In a feature of this aspect, the pliable layer has a thickness measuring between about 2 mils and about 3 mils.

In another feature of this aspect, the pliable layer includes one or more of polyethylene, polyethylene terephthalate, polypropylene, polyester, polyurethane, or ethylene vinyl acetate.

In another feature of this aspect, the pliable layer includes an ultraviolet inhibitor to reduce degradation from exposure to ultraviolet light.

In another feature of this aspect, the water-based adhesive is a water-based acrylic adhesive.

In another feature of this aspect, the antimicrobial agent is part of a water-based surface coating applied to the pliable layer.

In another feature of this aspect, the antimicrobial agent includes silver ion particles embedded in the pliable layer.

In another feature of this aspect, the antimicrobial agent includes silver ion particles that are part of a surface coating applied to one or both of the at least predominantly tacky surface and the non-tacky surface.

In another feature of this aspect, a level of tackiness of the water-based adhesive measures between about 0.5 ounces per inch to about 12 ounces per inch.

In another feature of this aspect, the pliable layer is dimensioned to have a generally quadrilateral shape. In another feature of this aspect, the generally quadrilateral shape is a generally square shape having sides measuring approximately nine inches.

In another feature of this aspect, the at least predominantly tacky surface includes an area that is at least substantially free of tackiness located at an edge of the pliable layer to facilitate separation of the peel-away liner layer from the pliable layer.

In another feature of this aspect, one or both of the pliable layer and the peel-away liner layer includes information that includes one or more of a user instruction, an advertisement, or a brand.

In another feature of this aspect, the one or more device functions include one or more of camera functionality, audio functionality, video functionality, wireless connectivity functionality, telephone functionality, text communication functionality, scanning functionality, facial recognition functionality, touchscreen functionality, flashlight functionality, lock/unlock functionality, charging functionality, and volume control functionality.

In another feature of this aspect, the handheld electronic device is a smartphone.

In another feature of this aspect, the handheld electronic device is a tablet computer.

Broadly defined, the present invention according to another aspect includes a method of shielding a handheld electronic device from a surrounding environment. The method includes: providing a covering section having a transparent pliable layer and a peel-away liner layer overlaid against an at least predominantly tacky surface of the transparent pliable layer, the at least predominantly tacky surface having a water-based adhesive; separating the peel-away liner layer from the transparent pliable layer; positioning the handheld electronic device relative to the at least predominantly tacky surface; and folding the transparent pliable layer to at least substantially entirely cover the handheld electronic device such that the at least predominantly tacky surface adheres to the handheld electronic device or to the transparent pliable layer, thereby providing a barrier between the handheld electronic device and the surrounding environment for preventing transmission of contaminants therebetween. With the transparent pliable layer substantially entirely covering the handheld electronic device, a display screen of the handheld electronic device is viewable through the transparent pliable layer, and one or more device functions are available to a user of the handheld electronic device.

In a feature of this aspect, the pliable layer includes an antimicrobial agent.

In another feature of this aspect, the at least predominantly tacky surface includes an area that is at least substantially free of tackiness located at an edge of the transparent pliable layer to facilitate separation of the peel-away liner layer from the transparent pliable layer.

In another feature of this aspect, the one or more device functions include one or more of camera functionality, audio functionality, video functionality, wireless connectivity functionality, telephone functionality, text communication functionality, scanning functionality, facial recognition functionality, touchscreen functionality, flashlight functionality, lock/unlock functionality, charging functionality, and volume control functionality.

Further areas of applicability of the present invention will become apparent from the detailed description provided hereinafter. It should be understood that the detailed description and specific examples, while indicating preferred embodiment(s) of the invention, are intended for purposes of illustration only and are not intended to limit the scope of the invention.

BRIEF DESCRIPTION OF THE DRAWINGS

Further features, embodiments, and advantages of the present invention will become apparent from the following detailed description with reference to the drawings, wherein.

DETAILED DESCRIPTION

Figure 1:
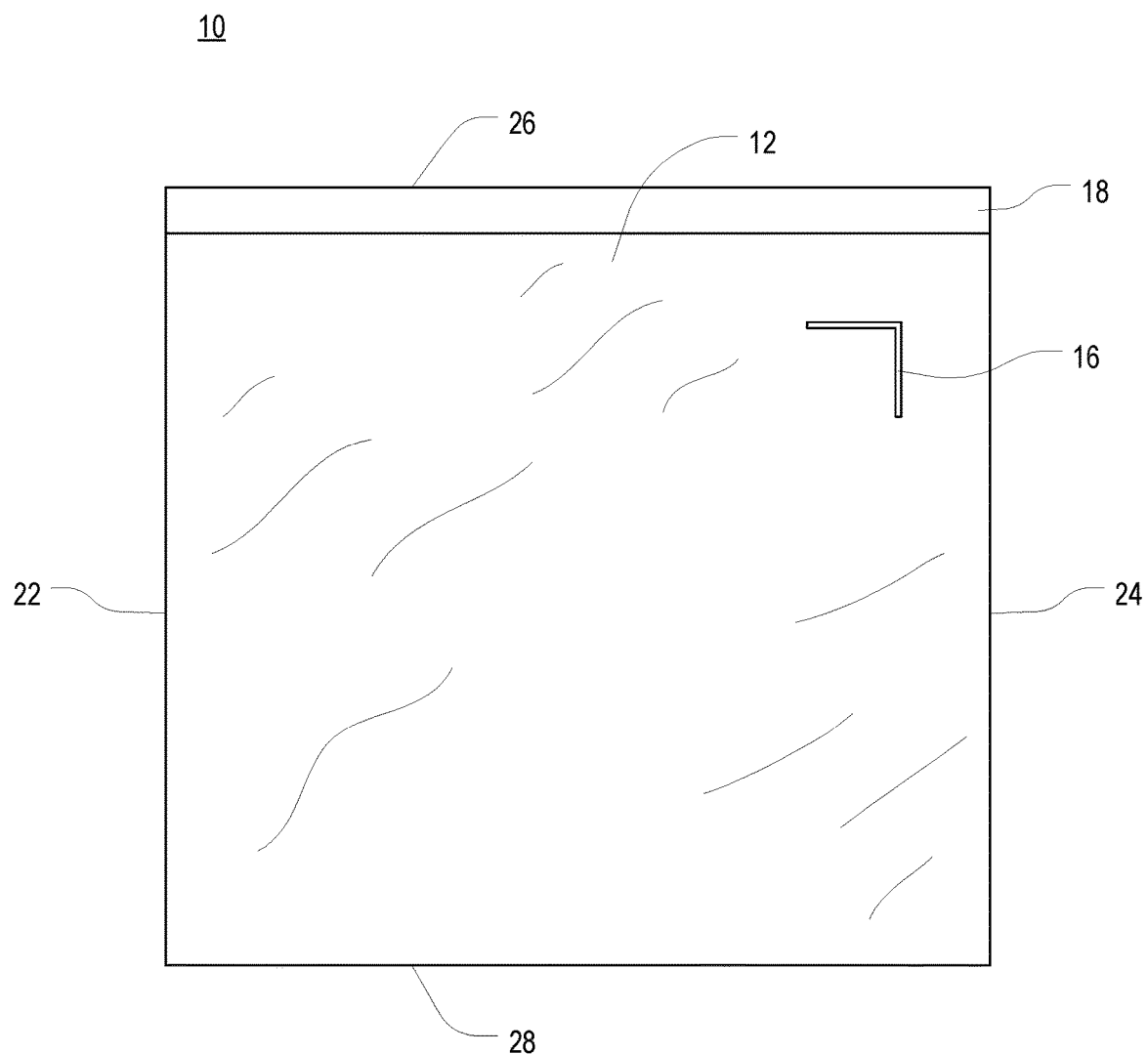
FIG. 1 is a front view of a disposable antimicrobial wrap for a smartphone in accordance with one or more preferred embodiments of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Furthermore, an embodiment of the invention may incorporate only one or a plurality of the aspects of the invention disclosed herein; only one or a plurality of the features disclosed herein; or combination thereof. Moreover, many embodiments, including adaptations, variations, modifications, and equivalent arrangements, are implicitly disclosed herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention in any claim of a patent issuing here from, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the issued claim(s) rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

With regard solely to construction of any claim with respect to the United States, no claim element is to be interpreted under 35 U.S.C. 112(f) unless the explicit phrase "means for" or "step for" is actually used in such claim element, whereupon this statutory provision is intended to and should apply in the interpretation of such claim element. With regard to any method claim including a condition precedent step, such method requires the condition precedent to be met and the step to be performed at least once during performance of the claimed method.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers," "a picnic basket having crackers without cheese," and "a picnic basket having both cheese and crackers." Further, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, one or more preferred embodiments of the present invention are next described. The following description of one or more preferred embodiment(s) is merely exemplary in nature and is in no way intended to limit the invention, its application, or uses.

Figure 32A:
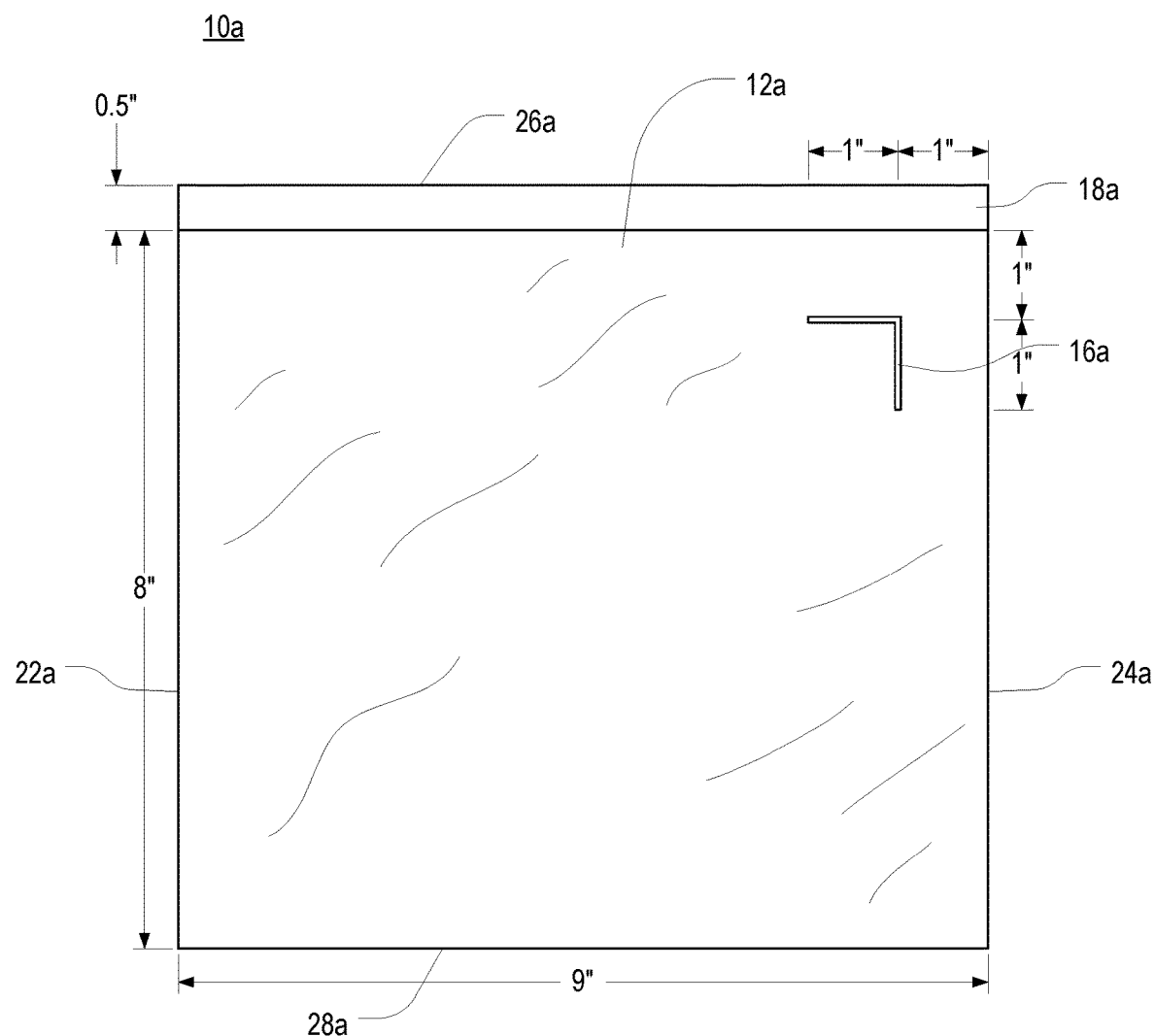
FIG. 32A is a front view of the wrap of FIG. 1 illustrating exemplary dimensions thereof.

FIG. 1 is a front view of a disposable antimicrobial wrap 10 for a smartphone in accordance with one or more preferred embodiments of the present invention. As shown in FIG. 1, the disposable antimicrobial wrap 10 is a pliable, generally quadrilateral section of wrap material having left and right side edges 22,24 and upper and lower edges 26,28. Although depicted in FIG. 1 with right-angled corners, it is also contemplated that the wrap 10 may have rounded or curved corners or edges. A top-facing surface 12, or tacky surface, of the wrap 10 includes a sufficient level of tackiness or stickiness as to be able to adhere to a smartphone or smartphone case as well as to itself. In at least some embodiments (and as will be explained in greater detail below), it is contemplated that the wrap 10 may be provided with a peel-away liner layer (not shown in FIG. 1) that is adhered to the tacky surface and is capable of being peeled away with relative ease to reveal the tacky surface 12. Contemplated dimensions of a disposable antimicrobial wrap 10a for a smartphone in accordance with one or more preferred embodiments of the present invention are shown in FIG. 32A, which is discussed in greater detail herein.

Figure 32B:
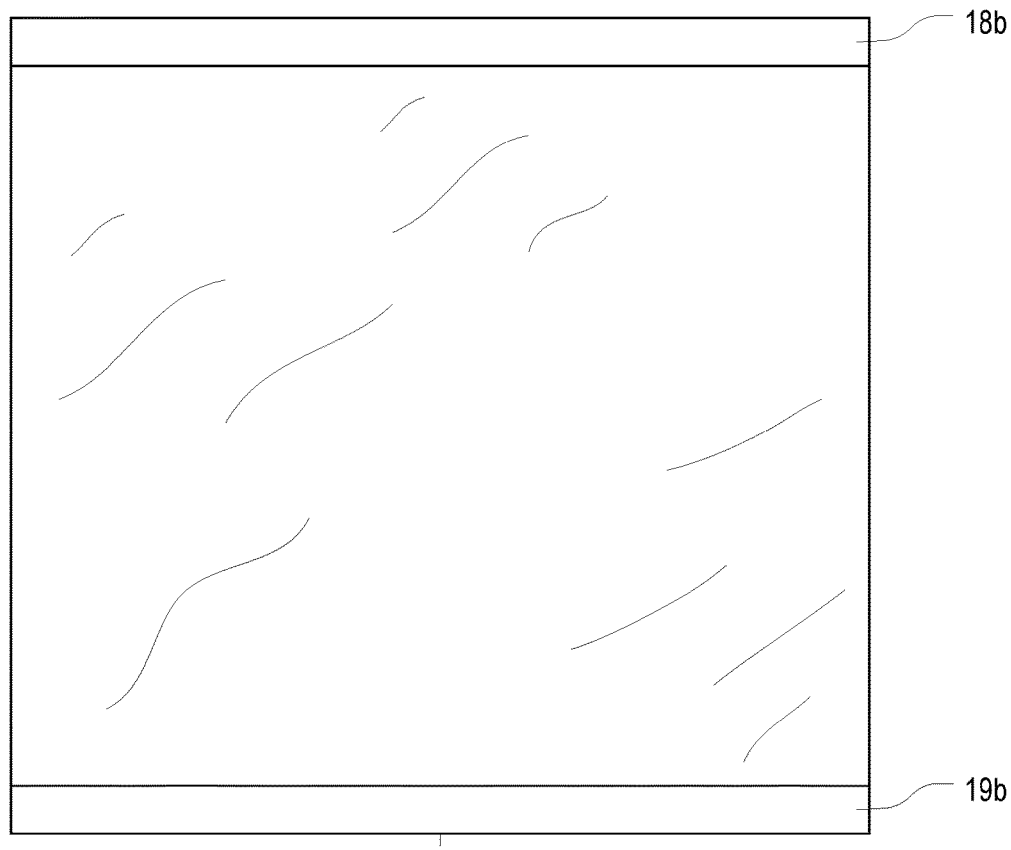
FIG. 32B is a front view of another disposable antimicrobial wrap for a smartphone, similar to that of FIG. 1 and depicting tackiness-free sections at upper and lower edges.

It is further contemplated that, in at least some embodiments, a section 18 of the tacky surface 12 may be free or substantially free of any tackiness or stickiness. In the embodiment of FIG. 1, the tackiness-free section 18 is configured as a relatively narrow strip extending along the upper edge 26 of the wrap 10. It is further contemplated that tackiness-free sections may be arranged in multiple locations on the wrap 10. For example, in one contemplated embodiment, shown in FIG. 32B, one tackiness-free section 18 of a wrap 10b is located along an upper edge of the wrap 10b and another tackiness-free section 19 is located along a lower edge of the wrap 10b. In some contemplated embodiments, the tackiness-free section 18 is formed by a sticker or label that is adhered to the tacky surface 12, a backing of which is smooth and/or non-tacky. In such cases, the sticker or label can include written information, instructions for use, or branding. In other contemplated embodiments, the tackiness-free section 18 is a laminated portion of the wrap 10, whereby the exposed surface of the laminated portion is smooth and/or non-tacky.

The bottom surface 14 of the wrap 10 (not visible in FIG. 1) is preferably a non-tacky, smooth surface. In this manner, a smartphone user would be able to drag a finger along the bottom surface 14 smoothly without sticking, catching, or other interference. Notably, it is contemplated that the tacky surface 12 of the wrap 10 is capable of adhering to another portion of the tacky surface 12 (i.e., to itself) or to the bottom, non-tacky surface 14 of the wrap 10. In this regard, it is contemplated that the tacky surface 12 of the wrap 10 adhering to itself in at least some areas may be effective in forming a sealed barrier.

It is contemplated in various embodiments that a disposable antimicrobial wrap 10 in accordance with one or more aspects of the present invention can be prepared or manufactured using a wide variety of different materials. In various preferred embodiments, the wrap 10 is manufactured from a transparent or clear material so that a user is able to view a smartphone that has been covered with the wrap 10. It is further contemplated that the materials used to prepare or manufacture the wrap 10 may be nontoxic for human use, water resistant, waterproof, scratch resistant, UV-light resistant, and/or resistant to chemical agents that include, but are not limited to, bleach, alcohol, isopropanol, hydrogen peroxide, or common cleaning products. Further still, it is contemplated that the materials used to prepare or manufacture the wrap 10 may include an anti-glare and/or anti-reflective coating to improve vision by reducing reflections, glare, or halo effects, thereby assisting in the avoidance of eye strain in a user. It is also contemplated that the wrap 10 is capable of being written on using a pen or marker.

Contemplated materials for the wrap 10 include, but are not limited to, polyethylene (e.g., low density polyethylene), polyethylene terephthalate (PET), polypropylene, polyester, polyurethane, or ethylene vinyl acetate (EVA). Other contemplated materials for the wrap 10 include off-the-shelf products, such as GLAD® PRESS'N SEAL® Cling Film, which is manufactured by The Clorox Company of Oakland, CA, or SARAN™ Premium Wrap, which is manufactured by SC Johnson of Racine, WI.

Other contemplated materials include any of a variety of clear, adhesive protective films manufactured by Surface Armor, LLC of Rockwall, TX. In preferred embodiments, protective films for use as a material for the wrap 10 include those that are designed for use in connection with stainless steel. Contemplated protective films from Surface Armor, LLC include, but are not limited to, the SURFACE ARMOR® Protective Film 3-363-C product, the SURFACE ARMOR® Protective Film 2U-042-C product, and the SURFACE ARMOR® Protective Film 2-018-C product.

Such protective films commonly utilize a water-based acrylic adhesive that can be implemented on the film to form a tacky surface. Although a range of different tackiness levels (i.e., tack or adhesive stickiness) may be implemented on the film, it is contemplated that the film exhibits an intermediate level of tack so as to reduce the risk of any residue being left behind upon removal of the film. In particular, it is contemplated that a wrap made from such protective films exhibits a level of tack measuring anywhere between about 0.5 ounces per inch to about 12 ounces per inch. In one contemplated embodiment, the wrap 10 may be made using a protective film manufactured by Surface Armor, LLC that exhibits a level of tack measuring about 10 ounces per inch, as in the SURFACE ARMOR® Protective Film 3-363-C product. In another contemplated embodiment, the wrap 10 may be made using a protective film manufactured by Surface Armor, LLC that exhibits a level of tack measuring about 4.5 ounces per inch, as in the SURFACE ARMOR® Protective Film 2U-042-C product. In still another contemplated embodiment, the wrap 10 may be made using a protective film manufactured by Surface Armor, LLC that exhibits a level of tack measuring about 1.7 ounces per inch, as in the SURFACE ARMOR® Protective Film 2-018-C product.

Such protective films also have a thickness (including the film and the adhesive) that is sufficient to afford the material with the ability to protect against abrasions and scratches while also not being so thick as to be too rigid to apply to contoured surfaces. In contemplated embodiments, a wrap made from such protective films has a thickness measuring anywhere between about one mil (i.e., a thousandth of an inch) to about 6 mils. In one contemplated embodiment, the wrap 10 may be made using a protective film that has a thickness measuring about 2.5 mils. In another contemplated embodiment, the wrap 10 may be made using a protective film that has a thickness measuring about 2 mils, as in the SURFACE ARMOR® Protective Film 2U-042-C and SURFACE ARMOR® Protective Film 2-018-C products. In still another contemplated embodiment, the wrap 10 may be made using a protective film that has a thickness measuring about 3 mils, as in the SURFACE ARMOR® Protective Film 3-363-C product.

It is contemplated in various embodiments that the disposable antimicrobial wrap 10 of FIG. 1 may be printed upon via a flexographic printing process. In this regard, the material used for the wrap 10 may be pre-printed with information or graphics, such as a company logo or instructions for use. Other print information may include indicia for placement of smartphones or tablets of different types or models.

It is also contemplated in various embodiments that the disposable antimicrobial wrap 10 of FIG. 1 may include ultraviolet (UV) inhibitors or stabilizers to help protect the wrap 10 from degradation arising from exposure to UV light. In this regard, it is contemplated that a selected UV inhibitor or stabilizer absorbs light of a wavelength corresponding to UV light and, thereby, helps to prevent breakdown of polymers of the wrap material that might otherwise occur as a result of exposure to UV light. It is contemplated that use of a UV inhibitor or stabilizer can increase the useful life of the wrap 10. In at least some embodiments, it is contemplated that a UV inhibitor or stabilizer may be applied as part of a coating applied to the wrap 10 by a spray-on product or liquid.

It is also contemplated in various embodiments that the disposable antimicrobial wrap 10 of FIG. 1 may contain or include an antimicrobial agent or additive to protect against surface bacteria, mold, mildew, fungi, or other biological contaminants. In some contemplated embodiments, an antimicrobial agent or additive is applied as a coating to one or both of the top-facing and bottom-facing surfaces 12, 14 of the wrap 10. In such cases, it is contemplated that the coating may be applied in a liquid form, with the antimicrobial agent or additive (whether in the form of a solid powder or in the form of a liquid) thoroughly mixed with the liquid to form a generally homogenous mixture that may then be applied to one or more surfaces of the wrap 10. It is further contemplated that an antimicrobial coating may be applied to surfaces of the wrap in any of a variety of different ways, including, but not limited to spray coating, dip coating, film coating, powder coating, and roll-to-roll coating. In other contemplated embodiments, an antimicrobial agent or additive is woven or extruded as part of polymer fiber components used to manufacture the material for the wrap 10. In this latter case, it is contemplated that the antimicrobial agent or additive may be embedded in the material that forms the wrap 10.

It is contemplated that a variety of different antimicrobial agents or additives may be used or implemented in connection with the wrap 10 to impart antimicrobial properties thereto. In various embodiments, it is contemplated that an antimicrobial agent or additive may be applied as a coating to the wrap 10 by a spray-on product or liquid, such as any of a variety of antimicrobial products made available by Microban International of Huntersville, NC, or an antimicrobial agent or additive may be embedded into either the coating applied to the wrap 10 or into the material used to form the wrap 10. In at least some contemplated embodiments, a selected antimicrobial agent or additive is free or substantially free of heavy metals. In other contemplated embodiments, an antimicrobial agent or additive may include silver particles, which possess inherent antimicrobial properties and have a history of use in medical applications. Alternatively, or additionally, copper particles may also be used.

In at least some embodiments, an antimicrobial agent or additive that is free or substantially free of heavy metals can be added to a water-based coating that is then applied to the wrap 10. One contemplated antimicrobial agent or additive for use with water-based coatings is available from Microban International of Huntersville, NC under the LAPISSHIELD™ trade name ("LapisShield"). The LapisShield antimicrobial is free of heavy metals and is capable of integration with a water-based coating formulation to incorporate antimicrobial functionality at a surface of the coating. The resulting coating is understood to exhibit UV stability and remains clear after application to a substrate. Maintaining visibility through the coating reduces the optical impact that the coating might otherwise have, thereby maintaining a user's ability to see through the wrap 10 when in use to cover a smartphone. The LapisShield product makes use of sodium-pyrithione as an antimicrobial to inhibit bacterial growth as well as to prevent mold and mildew growth. A water-based coating that includes the LapisShield product may be applied by any of a variety of different coating application processes (e.g., spray coating, dip coating, roll-to-roll coating, and others). It is contemplated that use of the LapisShield product in a water-based coating applied to the wrap 10 helps to establish the wrap with broad-spectrum antimicrobial properties with the ability to maintain effectiveness over the life of the coating.

In at least some embodiments that utilize an antimicrobial agent or additive that includes metal, silver particles and other metals in particle form are understood to limit the spread of existing microbial growth and also help establish an environment that resists onset of growth. In some contemplated embodiments, an antimicrobial agent or additive includes embedded silver ion particles. Silver ion particles may be embedded into the material used to make the wrap at the time of manufacture. Alternatively, or additionally, silver ion particles may be mixed into a coating that is then applied to the wrap 10. In this latter regard, silver ion particles are embedded within the coating applied to the wrap 10.

It is also contemplated in various embodiments that the disposable antimicrobial wrap 10 of FIG. 1 may protect the smartphone 30 from exposure to a wide variety of different cleaning products or cleaning agents including, but not limited to, mild acids, disinfectants, salts, alkaline bases, oils, cleaning solvents, petroleum-based grease, and water. In this regard, the wrap 10 is adapted to shield the smartphone 30 from exposure to cleaning products or agents in the event that the wrapped smartphone is cleaned.

Further, it is contemplated in various embodiments that the disposable antimicrobial wrap 10 of FIG. 1 may function as a shield against various toxins and allergens that may be encountered, including, but not limited to, β-D-glucans, endotoxins, and pet allergens (including feline and canine allergens). Specifically, it is contemplated that the wrap 10, when employed to cover a smartphone or other device, may shield the wrapped smartphone from toxins, allergens, and other contaminants that may exist in the surrounding environment. When a user exits the contaminated environment, the wrap 10 can be removed from the device and discarded. Additionally, it is contemplated that the wrap 10, when employed to cover a smartphone or other device, may shield a clean environment from toxins, allergens, and other contaminants that may already exist on the device. In this regard, the wrap 10 effectively covers and prevents such contaminants from transferring from the device to the clean environment.

Figure 32C:
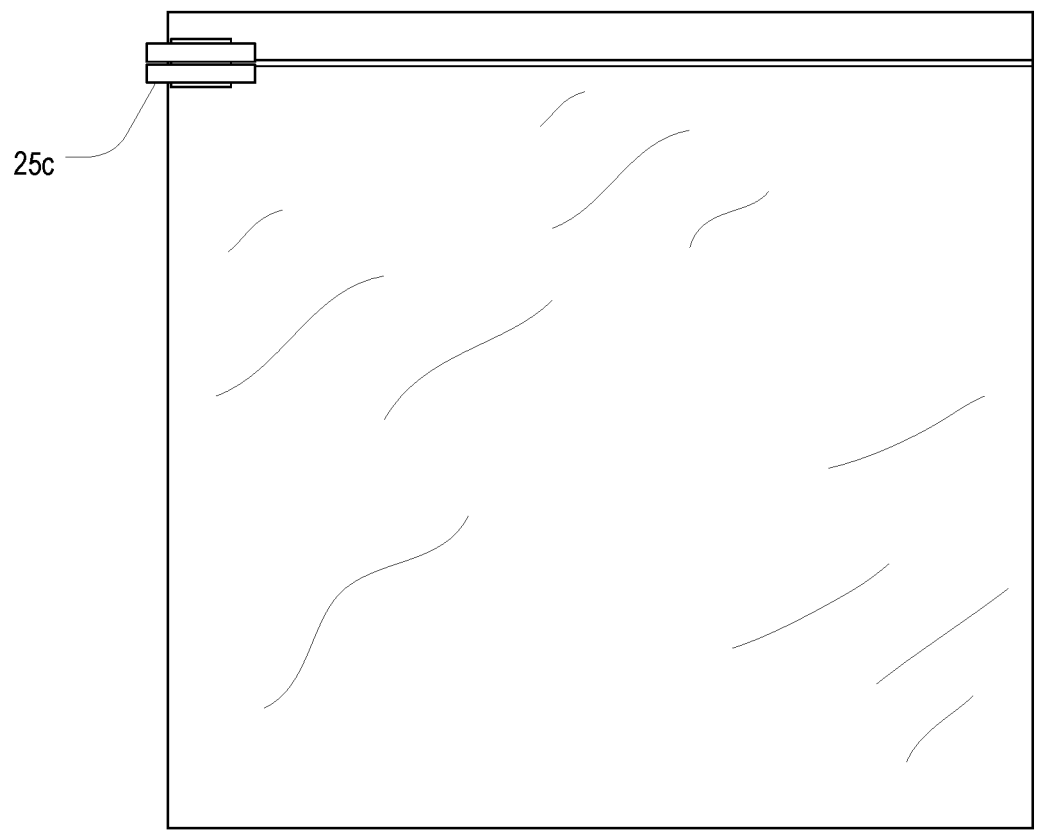
FIG. 32C is a front view of another disposable antimicrobial wrap for a smartphone, similar to that of FIG. 1 and depicting a resealable zipper closure mechanism for sealing the wrap.
Figure 32D:
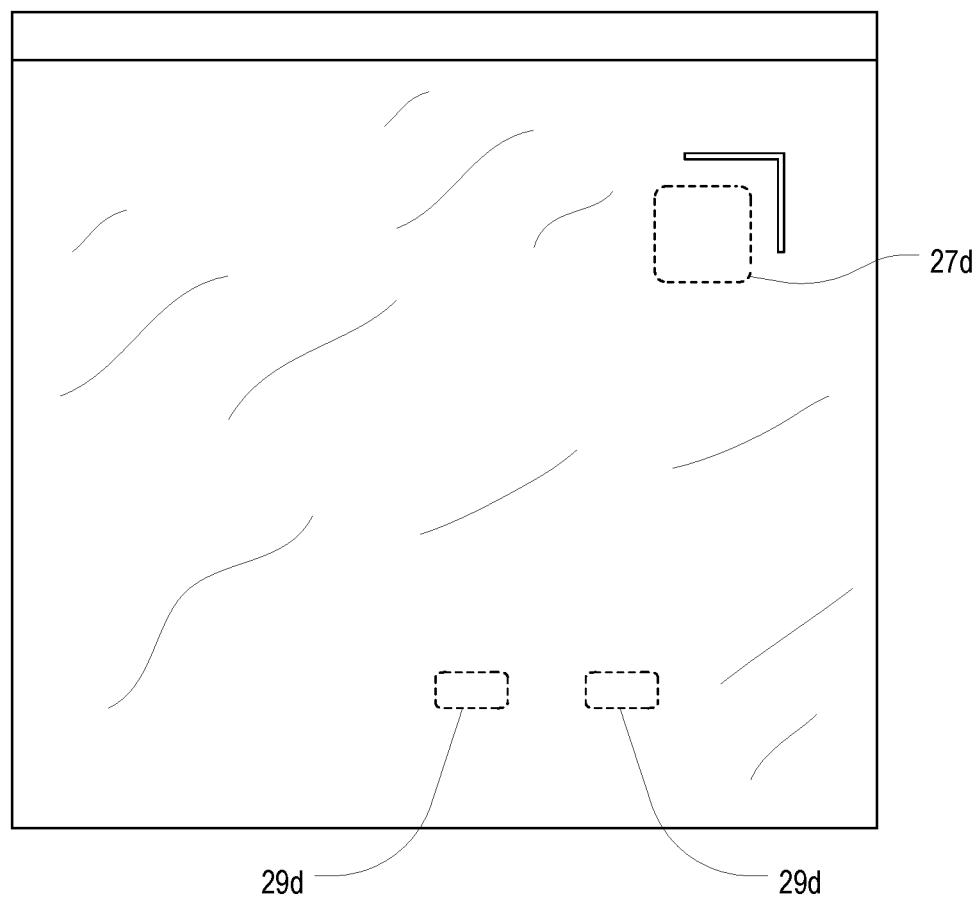
FIG. 32D is a front view of another disposable antimicrobial wrap for a smartphone, similar to that of FIG. 1 and depicting cutouts or perforations corresponding to locations for a camera or for speakers of the smartphone.

In various contemplated embodiments, an example of which is shown in FIG. 32C, a wrap 10c may also include a resealable zipper closure mechanism 25c for sealing the wrap 10c around a smartphone or other device. Additionally, in various contemplated embodiments, an example of which is shown in FIG. 32D, a wrap 10d may include cutouts or perforations 27d,29d corresponding to locations for a camera and/or speakers of a smartphone or other device. In this latter regard, cutouts or perforations 27d,29d may be arranged in locations to correspond with different smartphone models and brands.

Figure 2:
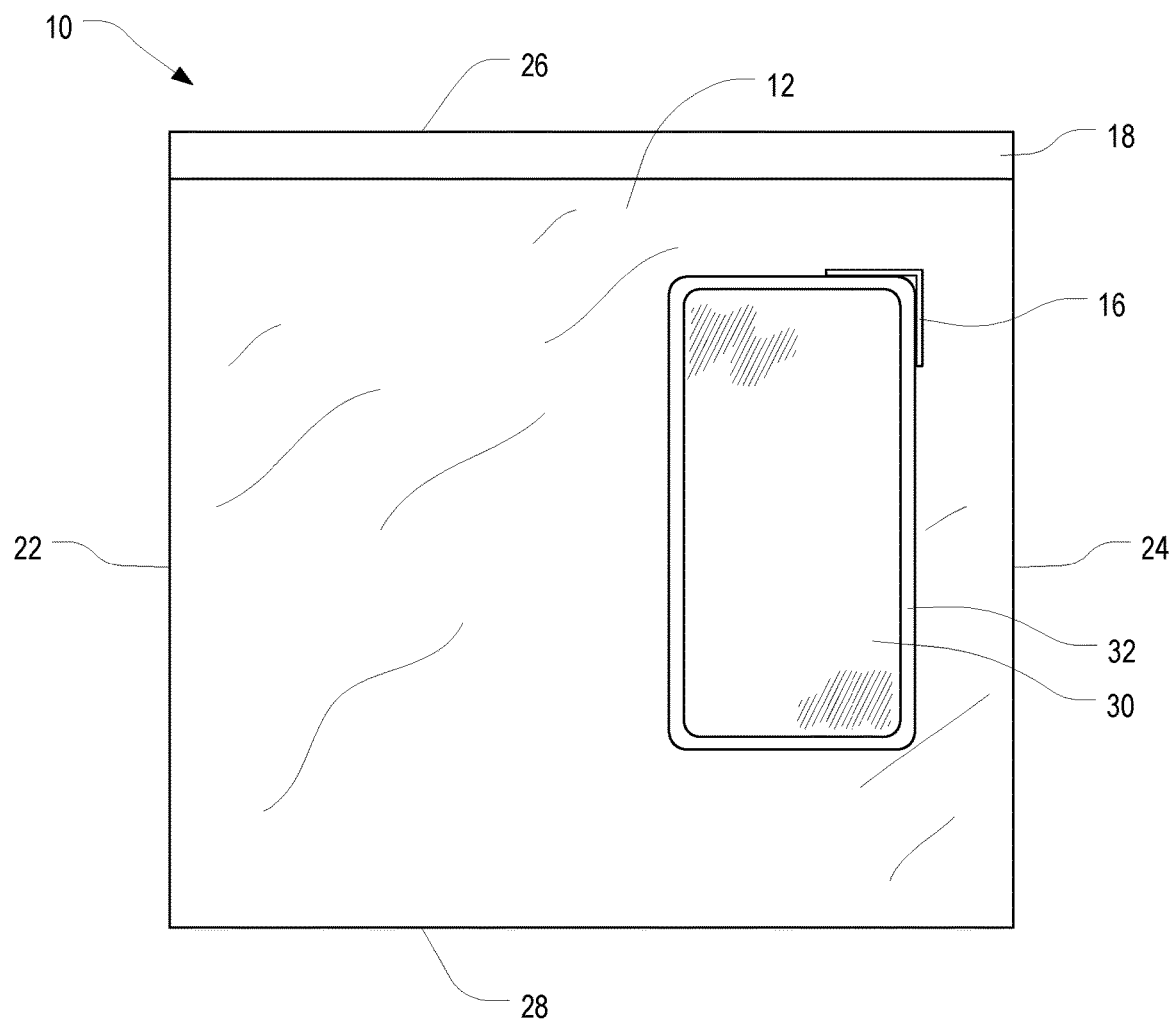
FIG. 2 is a front view of a smartphone placed face-up on the wrap of FIG. 1.

FIG. 2 is a front view of a smartphone 30 placed face-up on the wrap 10 of FIG. 1. The smartphone 30 depicted in FIG. 2 is partially enclosed within a separate case 32 that covers a majority of the back, the sides, and a portion of the front of the smartphone 30. As used herein, the terms "smartphone," "tablet," and "handheld electronic device" are inclusive of devices that may be contained within or retained by a separate case. Cases 32 provide an easy-to-hold grip at the sides of the smartphone 30, while providing user access to the touchscreen and usable areas of the smartphone 30. It is contemplated that a disposable antimicrobial wrap 10 in accordance with one or more aspects of the present invention is adaptable for use with a smartphone 30 retained within a case 32 or a smartphone 30 without a case. It is further contemplated that a disposable antimicrobial wrap 10 in accordance with one or more aspects of the present invention is adaptable for use across a variety of different smartphone sizes, shapes, and configurations. Furthermore, a disposable antimicrobial wrap 10 in accordance with one or more aspects of the present invention is not limited just for use in wrapping a smartphone. In this regard, it is contemplated that a wrap 10 may also be used in connection with cellular phones, mobile phones, tablets, or other handheld electronic devices or instruments.

A contemplated method of using a disposable antimicrobial wrap 10 in accordance with one or more aspects of the present invention is next described. As shown in FIGS. 1 and 2, the wrap 10 may be equipped with a raised L-shaped notch 16 in at least some embodiments. The L-shaped notch 16 defines a right angle near a top right corner of the wrap 10 and provides an indication to the user for proper alignment of a top right corner of the smartphone 30 or smartphone case 32 with the wrap 10. Advantageously, the L-shaped notch 16 may be arranged in such a way as to enable the wrap 10 to accommodate a wide variety of differently sized smartphones. In a contemplated method of use, the wrap 10 is arranged on a surface that is generally flat with the tacky surface 12 facing up. As shown in FIG. 2, a top right corner of the case 32 that retains the smartphone 30 may then be positioned against the L-shaped notch 16, thereby aligning the smartphone relative to the wrap 10. It is contemplated that other indications for smartphone placement may be used in place of the notch, and, in at least some embodiments, no notch is present on the wrap at all.

Figure 3:
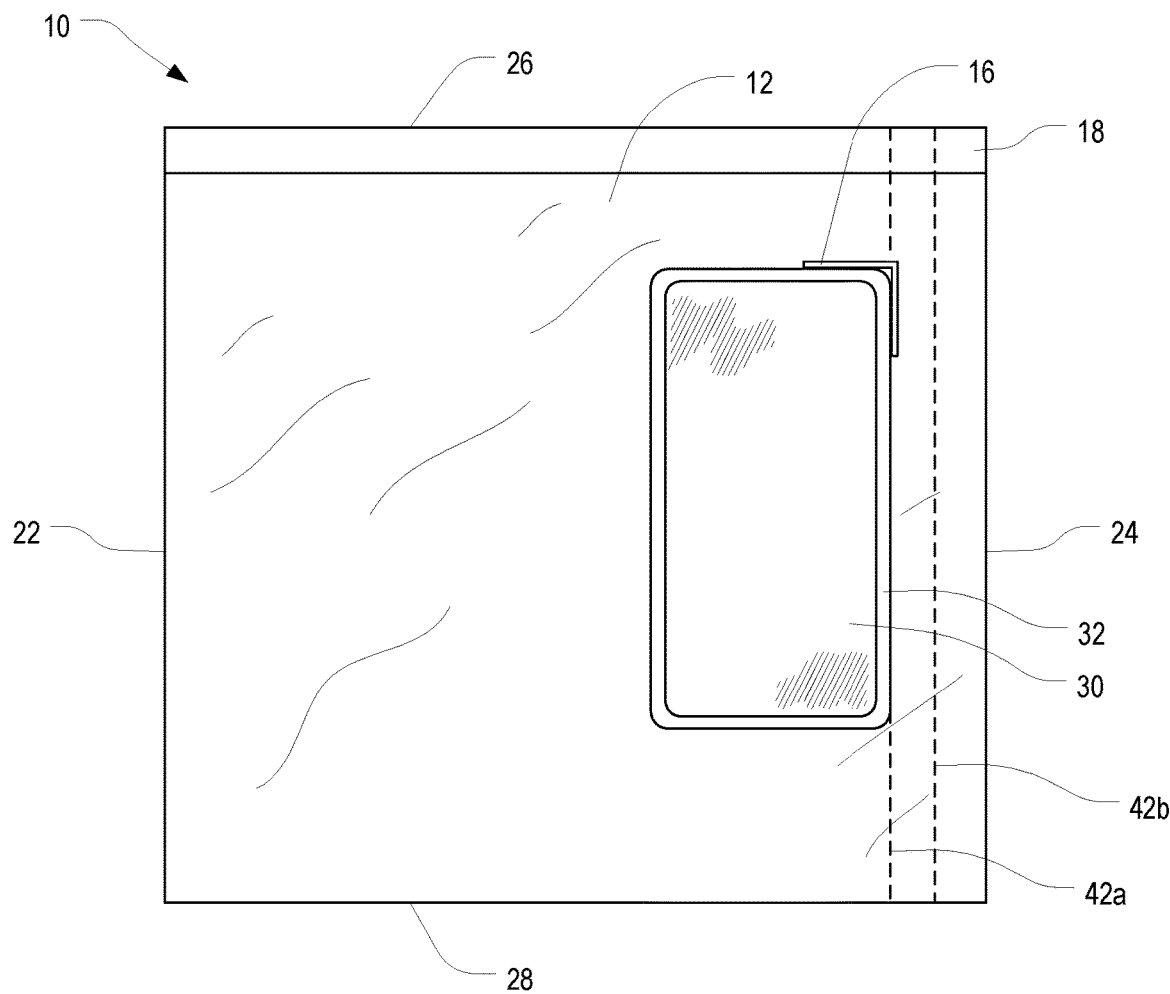
FIG. 3 is a front view of the smartphone and wrap of FIG. 2 illustrating a first set of fold lines.
Figure 4:
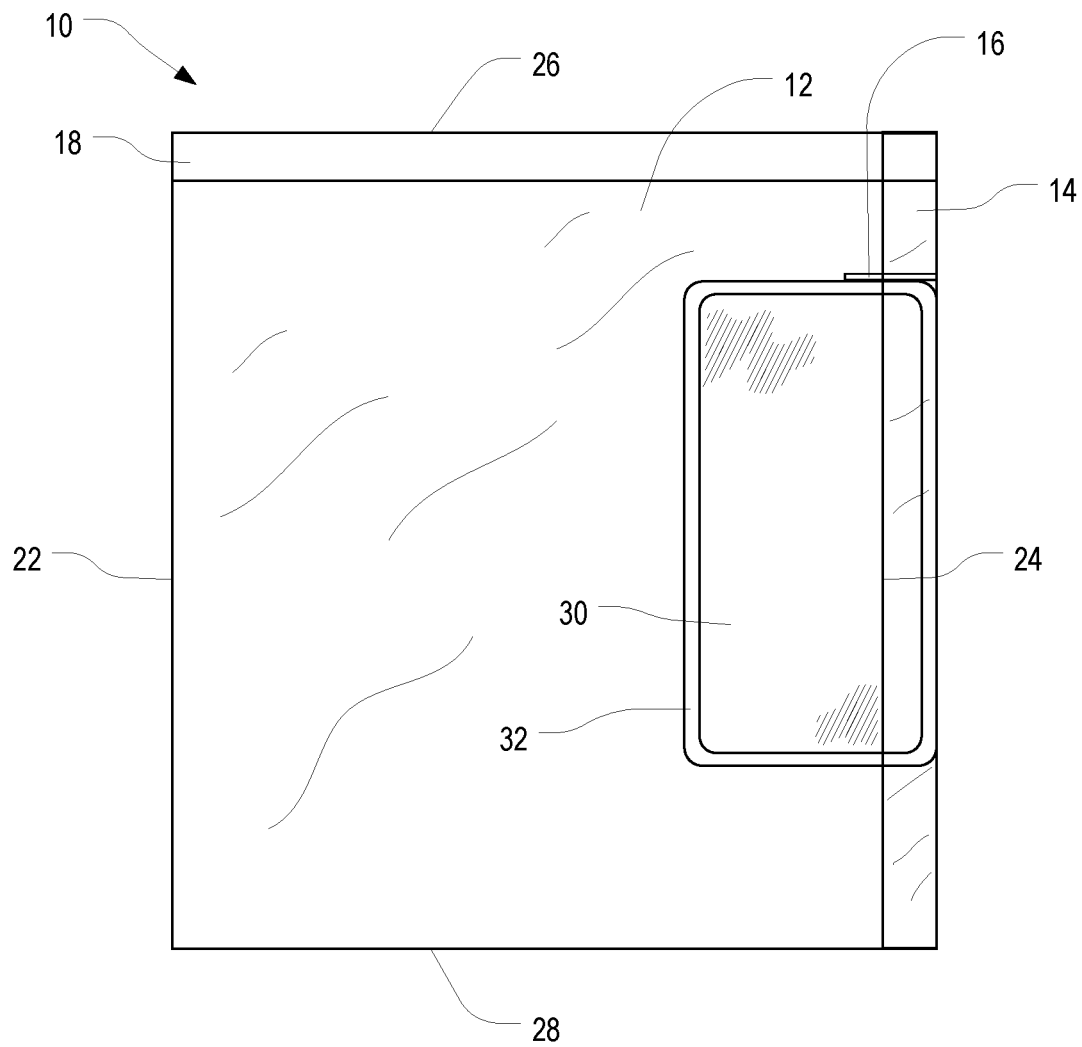
FIG. 4 is a front view of the smartphone and wrap of FIG. 3, shown in a first intermediate wrapping state.
Figure 8:
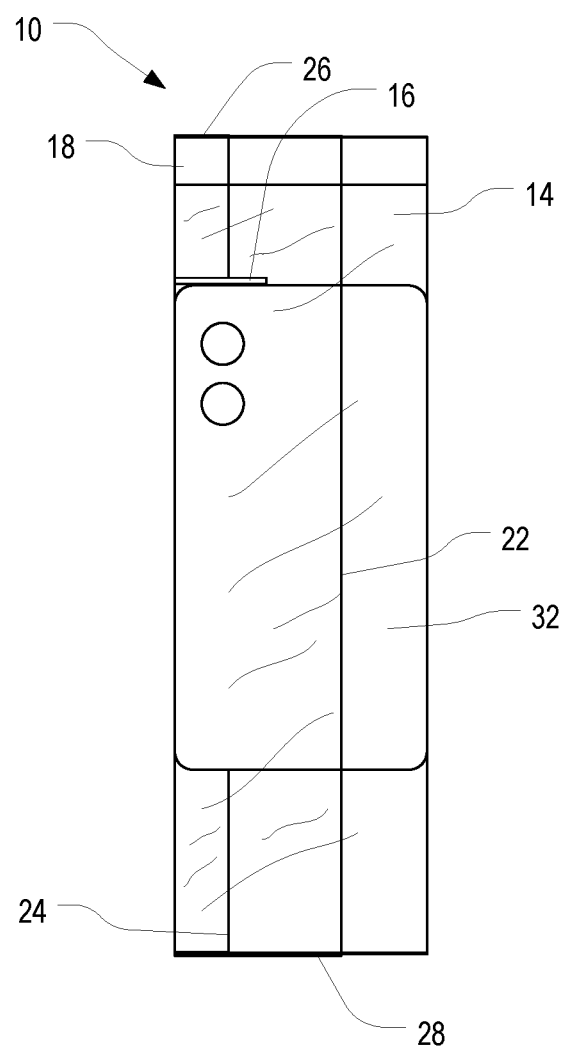
FIG. 8 is a rear view of the smartphone and wrap of FIG. 7, shown in a fully wrapped state.

A process of wrapping the smartphone 30 is shown beginning with FIG. 3 and continuing through FIG. 8. FIG. 3 is a front view of the smartphone 30 and wrap 10 of FIG. 2 illustrating a first set of fold lines 42a,42b, and FIG. 4 is a front view of the smartphone 30 and wrap 10 of FIG. 3, shown in a first intermediate wrapping state. The fold lines 42a, 42b of FIG. 3 identify locations where the wrap 10 has been folded in FIG. 4. In particular, the inner fold line 42a is aligned with the lower right side edge of the smartphone case 32, and the outer fold line 42b is aligned with the upper right side edge of the smartphone case 32. To commence wrapping the smartphone 30 in accordance with this contemplated method, a right side of the wrap 10 is lifted and folded snugly against the right side of the case 32 and a portion of the front of the smartphone 30. Once the folds along lines 42a,42b are complete, as shown in FIG. 4, the tacky surface 12 adheres to portions of the smartphone 30 and case 32 as well as to other portions of the tacky surface 12, and a portion of the non-tacky bottom surface 14 is visible at the front of the smartphone 30. The right side edge 24 of the wrap 10 is arranged along the front of the smartphone 30.

Figure 5:
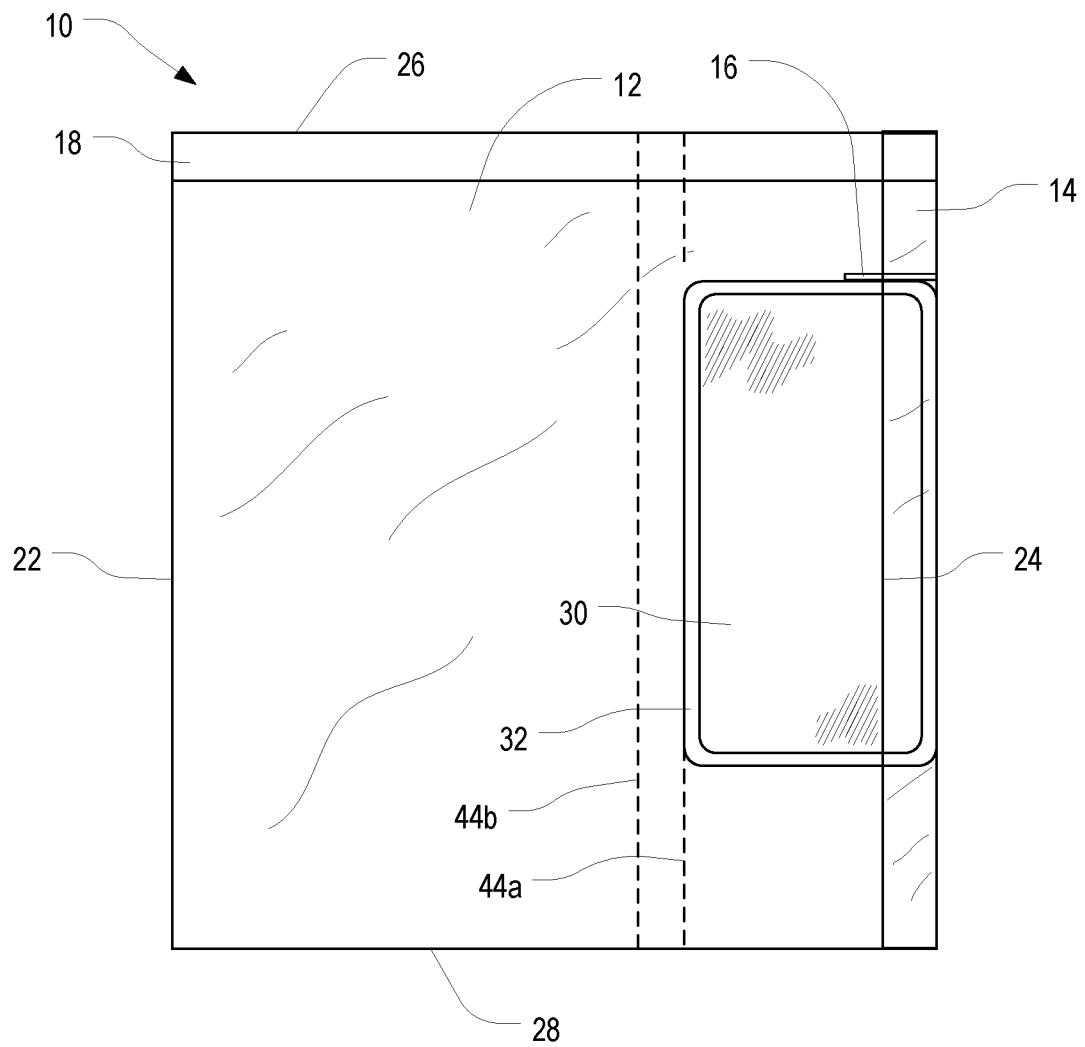
FIG. 5 is a front view of the partially wrapped smartphone of FIG. 4 illustrating a second set of fold lines.
Figure 6:
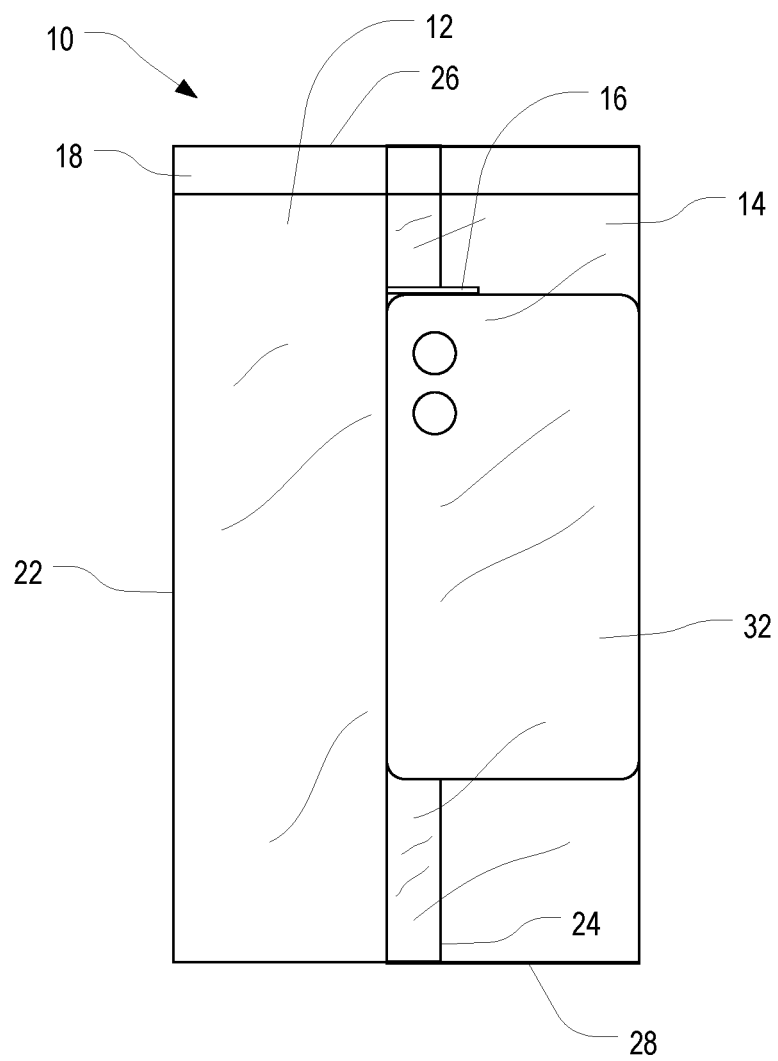
FIG. 6 is a rear view of the smartphone and wrap of FIG. 5, shown in a second intermediate wrapping state.

FIG. 5 is a front view of the partially wrapped smartphone 30 of FIG. 4 illustrating a second set of fold lines 44a,44b, and FIG. 6 is a rear view of the smartphone 30 and wrap 10 of FIG. 5, shown in a second intermediate wrapping state. The fold lines 44a,44b of FIG. 5 identify locations where the wrap 10 has been folded in FIG. 6. In particular, the inner fold line 44a is aligned with the lower left side edge of the smartphone case 32, and the outer fold line 44b is aligned with the upper left side edge of the smartphone case 32. To continue wrapping the smartphone 30 in accordance with this contemplated method, the smartphone 30 is lifted at its right side, rotated about its left side, and then placed face-down on the tacky surface 12 of the wrap 10. As the smartphone is rotated, the tacky surface 12 engages and adheres to the left side of the case and the entirety of the front of the smartphone 30 (including the portion of the non-tacky bottom surface 14 of the wrap 10 that is visible in FIG. 4 as well as other portions of the tacky surface 12). Once the folds along lines 44a,44b are complete, as shown in FIG. 6, a new larger portion of the non-tacky bottom surface 14 is visible at the rear of the case 32.

Figure 7:
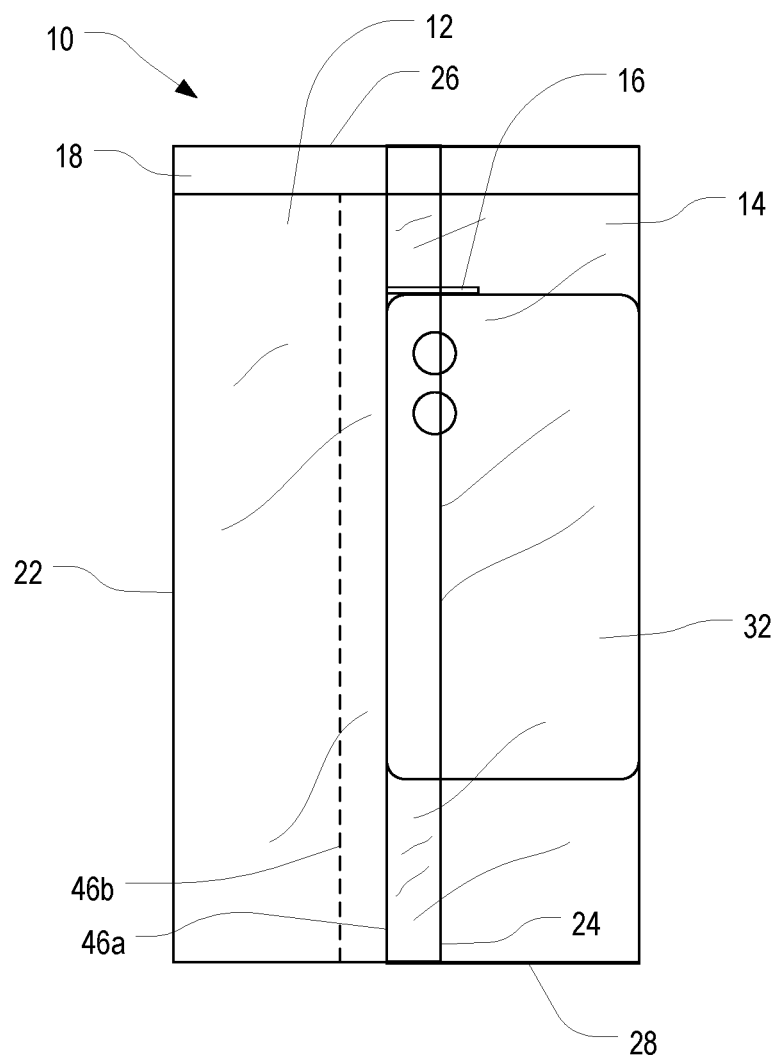
FIG. 7 is a rear view of the partially wrapped smartphone of FIG. 6 illustrating a third set of fold lines.

FIG. 7 is a rear view of the partially wrapped smartphone 30 of FIG. 6 illustrating a third set of fold lines 46a,46b, and FIG. 8 is a rear view of the smartphone 30 and wrap 10 of FIG. 7, shown in a fully wrapped state. The fold lines 46a,46b of FIG. 7 identify locations where the wrap 10 has been folded in FIG. 8. In particular (and noting that the smartphone 30 is arranged face-down in FIGS. 7 and 8), the inner fold line 46a is aligned with the upper right side edge of the smartphone case 32, and the outer fold line 46b is aligned with the lower right side edge of the smartphone case 32. To complete wrapping the smartphone 30 in accordance with this contemplated method, a left side of the wrap 10 is lifted and folded snugly against the right side of the case 32 and a portion of the rear of the smartphone 30. Once the folds along lines 42a,42b are complete, as shown in FIG. 4, the tacky surface 12 adheres to portions of the smartphone 30 and case 32 as well as to at least some of the larger portion of the non-tacky bottom surface 14 of the wrap 10 that is visible in FIG. 6. The left side edge 22 of the wrap 10 is arranged along the case 32 at the rear of the smartphone 30. In addition to the methodology described hereinabove in connection with FIGS. 3-7, it is further contemplated that the smartphone 30 may be covered by rolling, end over end, in the wrap 10.

With further reference to FIG. 8, the wrap 10 is arranged snugly around the smartphone 30 and case 32, thereby sealing the smartphone 30, and no portion of the tacky surface 12 is left exposed. Because the wrap 10 is flush against the smartphone and formed of a transparent material, the smartphone 30 remains free for use and retains functionality. In contemplated embodiments, functionality retained while the smartphone is covered with the wrap 10 includes, but is not limited to, touchscreen functionality, internet connectivity functionality, visual interface viewing functionality, telephone communication functionality, text communication functionality, email functionality, facial recognition functionality, video viewing functionality, music playing functionality, speaker or ringtone functionality, vibration notification functionality, Bluetooth functionality, photographing functionality, QR code or barcode scanning functionality, wallet functionality, lock/unlock functionality, on/off functionality, charging functionality (such as by magnets or by a charging pad); volume control functionality, airport boarding pass scan functionality, and flashlight functionality. Dirt, germs, or biological contaminants that may exist on the surface of the smartphone 30 or case 32 are no longer exposed to the surrounding environment. Furthermore, antimicrobial capabilities of the wrap 10 may serve to help eliminate biological contaminants at the surface of the smartphone 30 or case 32 while simultaneously preventing growth of such contaminants at the exterior surface of the wrap 10 (i.e., the bottom, now-exposed surface 14).

Figure 9:
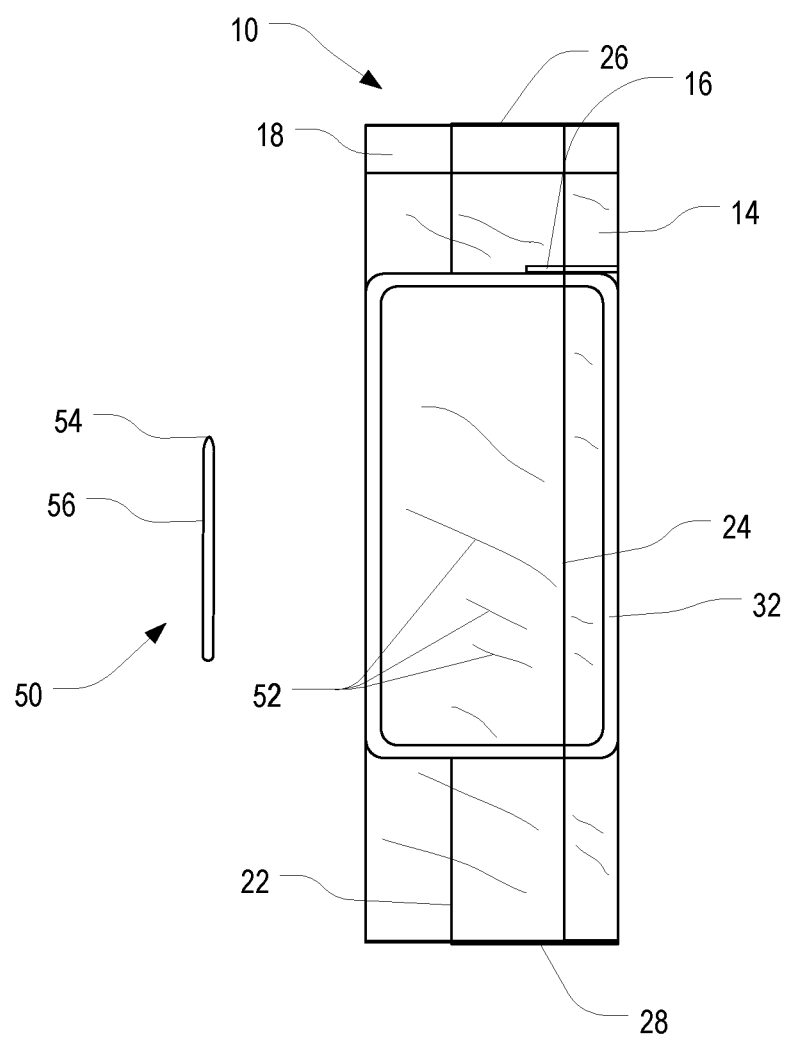
FIG. 9 is a front view of the wrapped smartphone of FIG. 8, shown with a stylus.

It is further contemplated that one or more additional steps may be implemented in connection with a method of using a disposable antimicrobial wrap 10 in accordance with one or more aspects of the present invention to cover a smartphone 30. In this regard, FIG. 9 is a front view of the wrapped smartphone 30 of FIG. 8, shown with a stylus 50. In some contemplated embodiments, the wrap 10 may be provided with a stylus 50, which is a small tool that includes a sharp end 54 and at least one flat edge 56. During the wrapping process of FIGS. 3-8, it is contemplated that small pockets of air or wrinkles 52 may be formed in the wrap 10. Air pockets or wrinkles 52 may be particularly common where the wrap 10 engages a smooth, flat surface, such as the front face of the smartphone 30 (usually where a touchscreen is found). Because touchscreens are nearly ubiquitous in current smartphone models, air pockets and wrinkles 52 in the wrap 10 (and, particularly, on the touchscreen) may interfere with a user's ability to interact with the smartphone 30.

Figure 10:
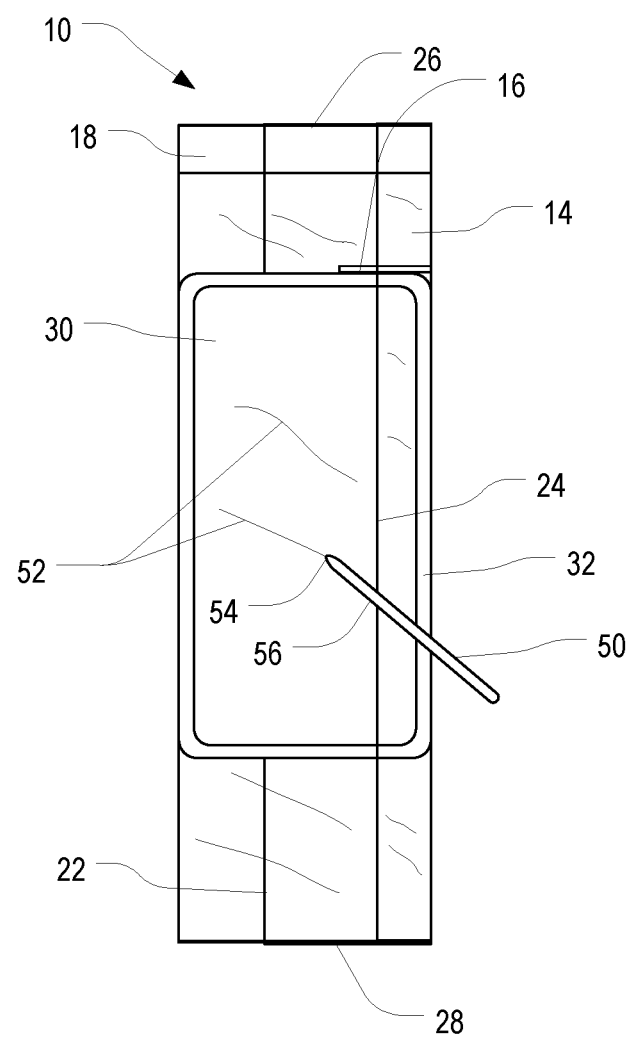
FIG. 10 is a front view of the wrapped smartphone of FIG. 9 illustrating use of the stylus.
Figure 11:
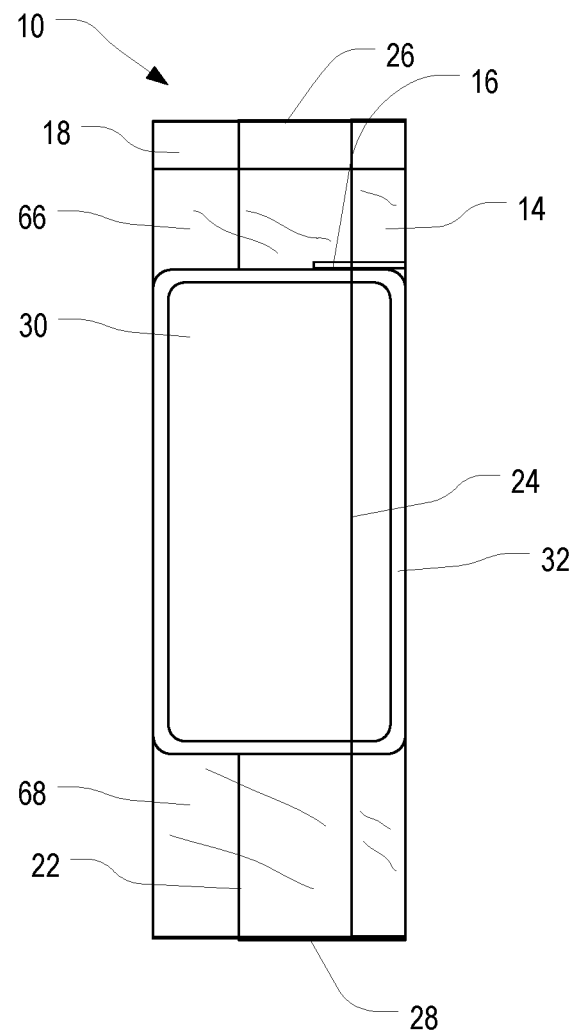
FIG. 11 is a front view of the wrapped smartphone of FIG. 10, shown after portions of the wrap covering the front of the smartphone have been smoothed out.

FIG. 10 is a front view of the wrapped smartphone 30 of FIG. 9 illustrating use of the stylus 50, and FIG. 11 is a front view of the wrapped smartphone 30 of FIG. 10, shown after portions of the wrap 10 covering the front of the smartphone 30 have been smoothed out. With reference to FIG. 10, it is contemplated that the flat edge 56 of the stylus 50 may be used to smooth out any air pockets or wrinkles 52 that may form in the wrap 10 during the wrapping process. In particular, the flat edge 56 may be used to push air pockets or wrinkles 52 above or beneath the front face of the smartphone 30 so that a touchscreen area is smooth and wrinkle-free, as shown in FIG. 11. In this manner, a user's ability to interact with the smartphone 30 after the wrap 10 is installed is unimpeded by air pockets or wrinkles 52. In addition, or instead of using a stylus, it is further contemplated that a user may use a finger to smooth out air pockets or wrinkles 52 that may appear in the wrap 10.

It is further contemplated that the stylus 50 may have additional utility in connection with removing the wrap 10 from the smartphone 30 after use. The sharp end 54 of the stylus 50 may be used as a pick to puncture the wrap 10 at one or more locations to aid in removal. In other contemplated embodiments, the wrap may be punctured or cut with any of a pair of scissors, a knife, or a razor blade. Once the wrap 10 has been punctured, it is contemplated that the wrap may be peeled away from the smartphone 30 and case 32 with relative ease. Further in this regard, it is contemplated that a level of tackiness on the tacky surface 12 of the wrap 10 is not so great as to leave an adhesive residue or any other residue on the smartphone 30 or case 32. Thus, in preferred aspects, it is contemplated that the smartphone 30 has the same appearance and functionality upon removal of the wrap 10 as existed prior to use of the wrap 10. It is further contemplated that clean removal of the wrap 10 (i.e., removal without leaving any residue or stickiness behind on surfaces of the smartphone 30 or case 32) may be a characteristic that arises in connection with the type of material or film selected for the wrap 10.

Figure 12:
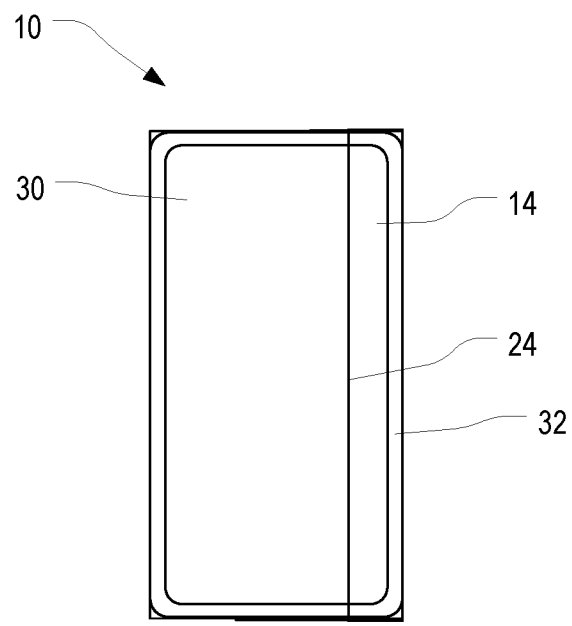
FIG. 12 is a front view of the wrapped smartphone of FIG. 11, shown with excess top and bottom portions of the wrap folded down over the back of the smartphone.

In another contemplated additional step, excess material of the wrap 10 may be folded toward the rear of the smartphone 30. In this regard, FIG. 12 is a front view of the wrapped smartphone 30 of FIG. 11, shown with excess top and bottom portions 66,68 of the wrap 10 folded down over the back of the smartphone 30. With reference to FIGS. 11, the smartphone 30 is fully wrapped, and the stylus 50 has been used to smooth out any air pockets or wrinkles in the wrap 10 that appear at the front face of the smartphone 30. Excess top and bottom portions 66,68 of the wrap 10 extend from above and beneath the wrapped smartphone 30 and have the potential to become obtrusive during use of the smartphone 30 in its wrapped state. In this regard, it is contemplated that each of the excess top portion 66 and the excess bottom portion 68 may be folded behind the smartphone 30, as shown in FIG. 12, so that the fully wrapped smartphone 30 has the general shape and appearance of the smartphone in its original, unwrapped state. In this regard, it is further contemplated that one or both of the excess top portion 66 and the excess bottom portion 68 can be secured at the rear of the smartphone 30 to help ensure that the front of the smartphone 30 remains unobstructed when in use. The excess top portion 66 and the excess bottom portion 68 can be secured in a variety of ways. In one contemplated embodiment, the excess top portion 66 and the excess bottom portion 68 are secured at the rear of the wrapped smartphone 30 with an adhesive that is either applied as a separate material to the surface of the wrap or is configured as part of the surface of the wrap. In this latter regard, it is contemplated that such an adhesive may be covered by a separate backing that is removable to reveal the adhesive for securing the excess top portion 66 and the excess bottom portion 68.

While the smartphone 30 and case 32 are fully wrapped, as in FIGS. 8-12, a seal is formed between the smartphone 30 and case 32 and the surrounding environment. In this regard, it is contemplated that there is no transfer of contaminants from the surface of the smartphone 30 or case 32 to the surrounding environment, which may be of particular significance if the surrounding environment is a sterile environment (e.g., an operating room, a laboratory, etc.). Notably, it is also contemplated that, despite the smartphone 30 and case 32 being fully sealed from the surrounding environment, the smartphone may still be capable of receiving charge for restoring the battery life and lengthening the time available for using the smartphone in the environment. In this regard, it is contemplated that a disposable antimicrobial wrap 10 in accordance with one or more aspects of the present invention does not interfere with conventional wireless charging technologies, including use of a wireless charging pad or station, magnetic charging, zone-based wireless charging, or proximity-based wireless charging.

Figure 13:
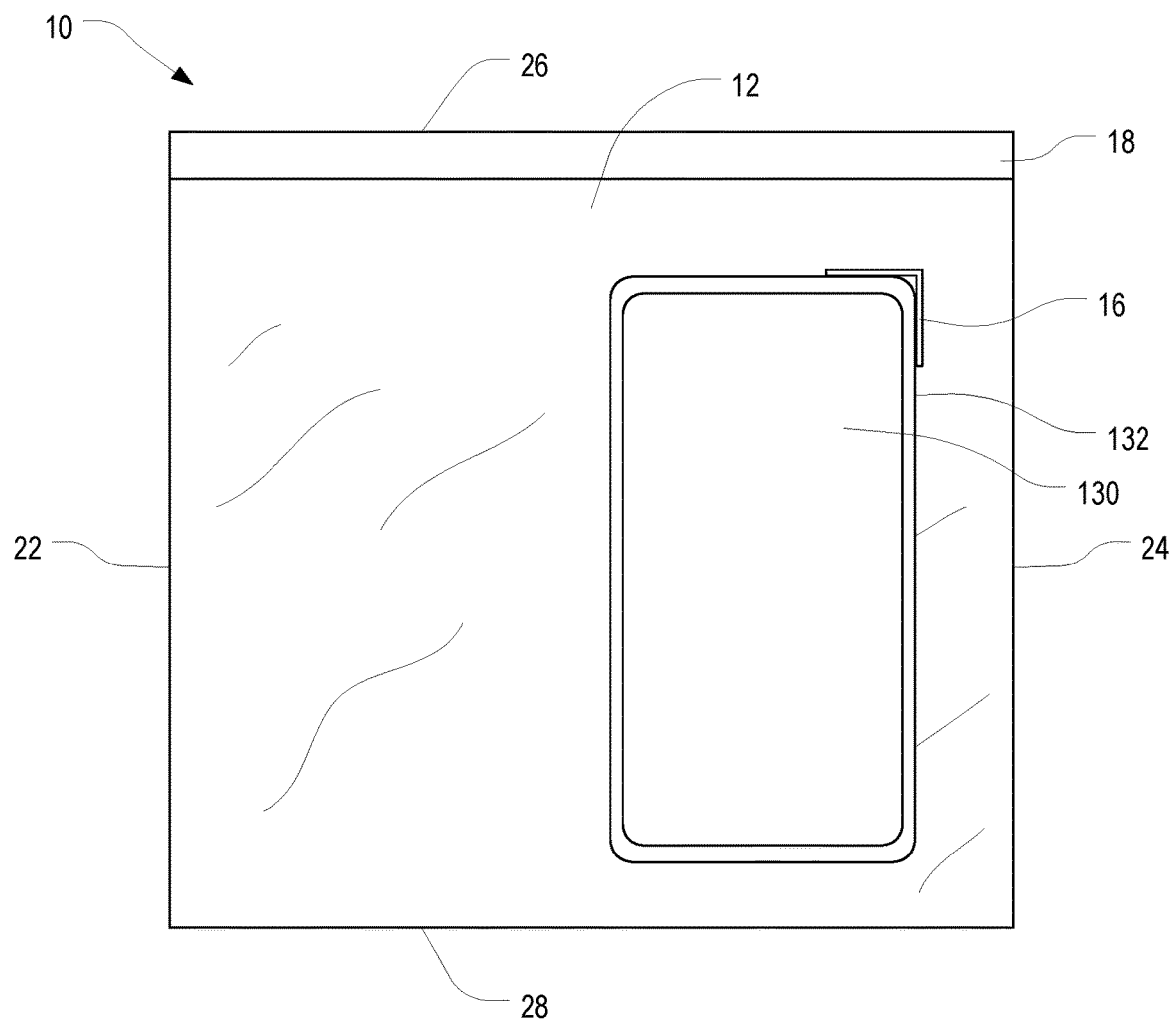
FIG. 13 is a front view of a large smartphone placed on the wrap of FIG. 1.
Figure 14:
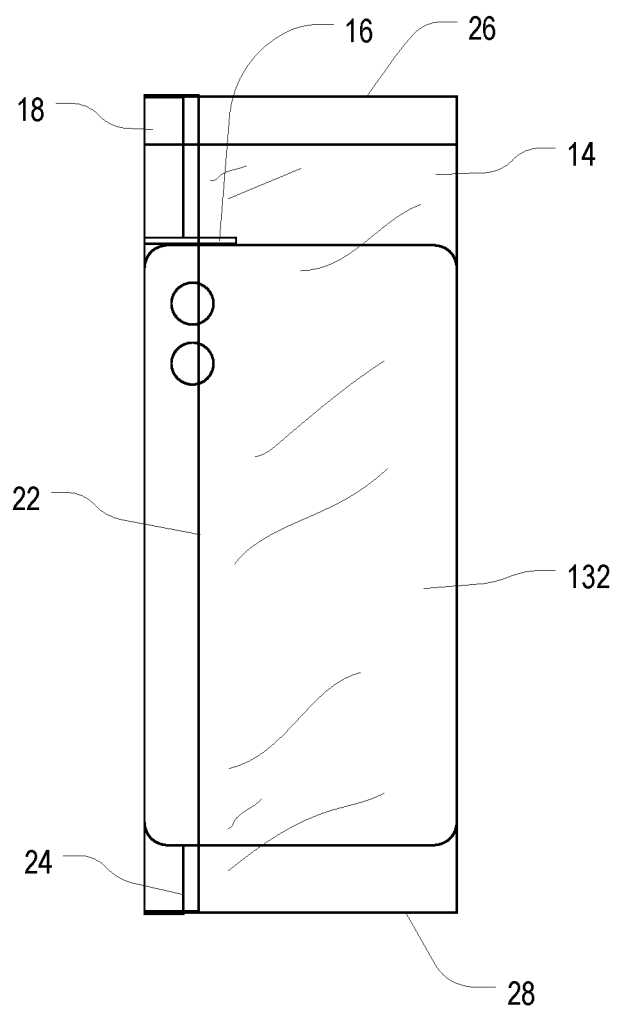
FIG. 14 is a rear view of the large smartphone and wrap of FIG. 13, shown in a fully wrapped state.

As discussed above, it is contemplated that a disposable antimicrobial wrap 10 in accordance with one or more aspects of the present invention is dimensioned to fully cover a wide variety of differently sized and shaped smartphones. In this regard, FIG. 13 is a front view of a large smartphone 130 placed on the wrap 10 of FIG. 1, and FIG. 14 is a rear view of the large smartphone 130 and wrap 10 of FIG. 13, shown in a fully wrapped state. The large smartphone 130 depicted in FIG. 13 is partially enclosed within a case 132 that covers a majority of the back, the sides, and a portion of the front of the large smartphone 130. In this manner, the case 132 provides an easy-to-hold grip at the sides of the smartphone 130, while providing user access to the touchscreen and usable areas of the smartphone 130. It is contemplated that a disposable antimicrobial wrap 10 in accordance with one or more aspects of the present invention is adaptable for use with a large smartphone 130 retained within a case 132 or a large smartphone 130 without a case.

As shown in FIG. 13, the large smartphone 130 is placed on the wrap 10 with a top right corner of the case 132 that retains the smartphone 130 positioned against the L-shaped notch 16, thereby aligning the large smartphone 130 relative to the wrap 10. A wrapping process may then be conducted in generally the same manner as described above in connection with FIGS. 3-8. With reference to FIG. 14, the wrap 10 is arranged snugly around the large smartphone 130 and case 132, and no portion of the tacky surface 12 of the wrap 10 is left exposed. Because the wrap 10 is flush against the large smartphone 130 and formed of a clear material, the large smartphone 130 remains free for use and retains key functionality for viewing, for communicating, as well as for privacy features such as facial recognition. Dirt, germs, or biological contaminants that may exist on the surface of the large smartphone 130 or case 132 are no longer exposed to the surrounding environment. Furthermore, antimicrobial capabilities of the wrap 10 may serve to help eliminate biological contaminants at the surface of the large smartphone 130 or case 132 while simultaneously preventing growth of such contaminants at the exterior surface of the wrap 10 (i.e., the bottom, now-exposed surface 14). Additionally, the fully wrapped large smartphone 130 is ready for implementation of additional steps, such as use of the stylus 50 for removing air bubbles or wrinkles and/or folding excess top and bottom portions of the wrap toward the rear of the large smartphone 130.

Figure 15:
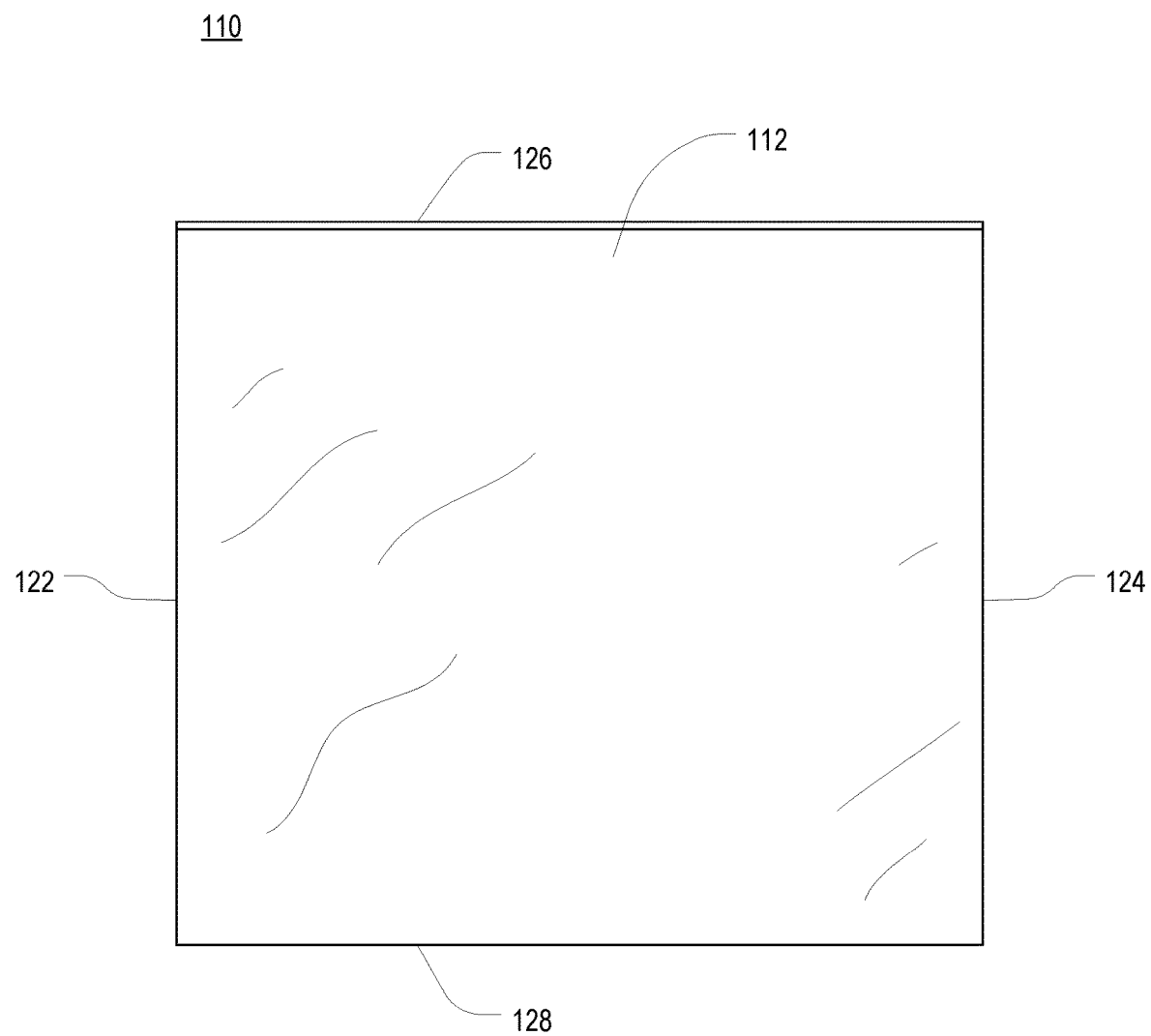
FIG. 15 is a front view of a wrap for use with a second such wrap for sandwich wrapping a smartphone in accordance with one or more preferred embodiments of the present invention.
Figure 16:
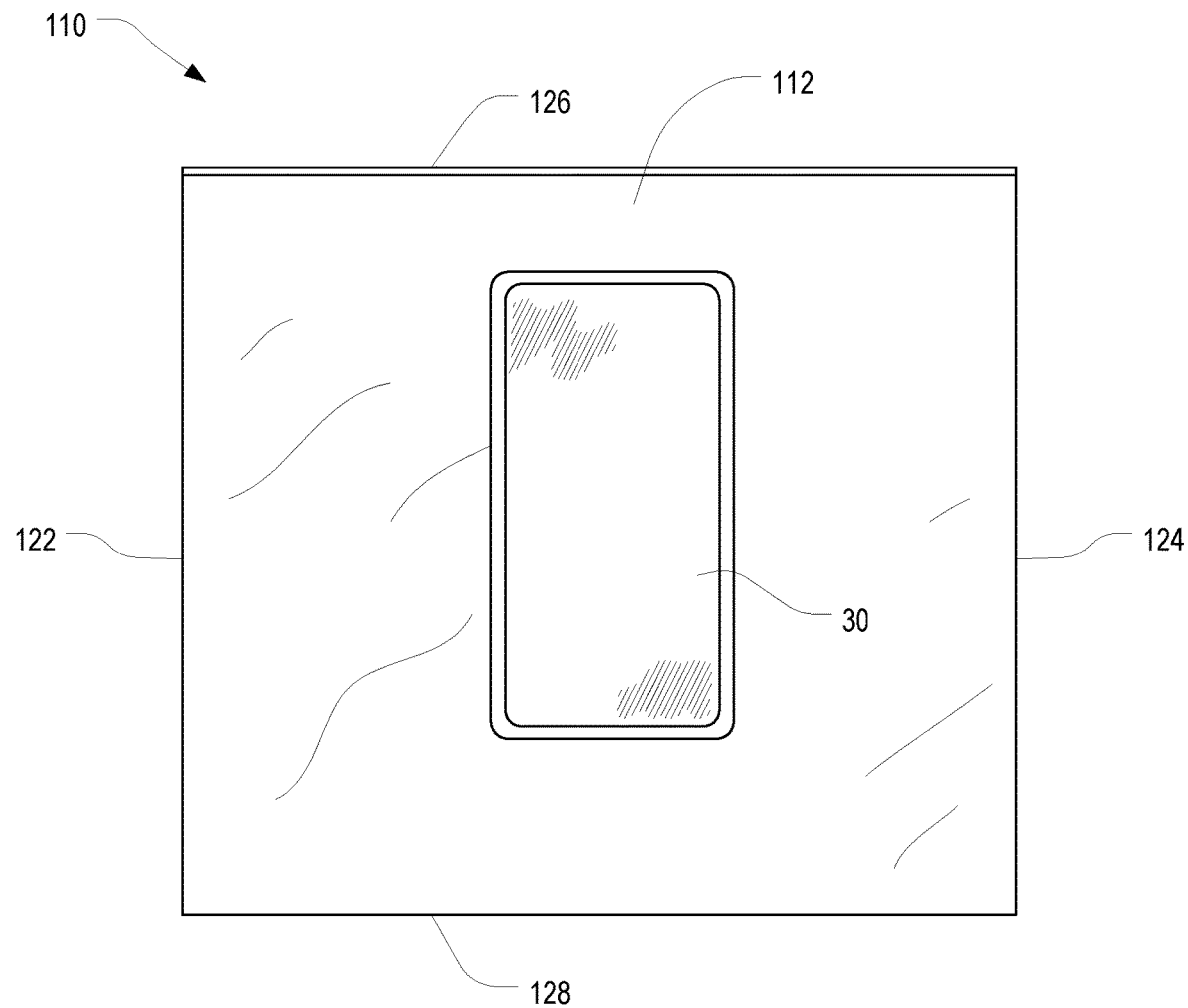
FIG. 16 is a front view of a smartphone placed face-up on the wrap of FIG. 15.
Figure 17:
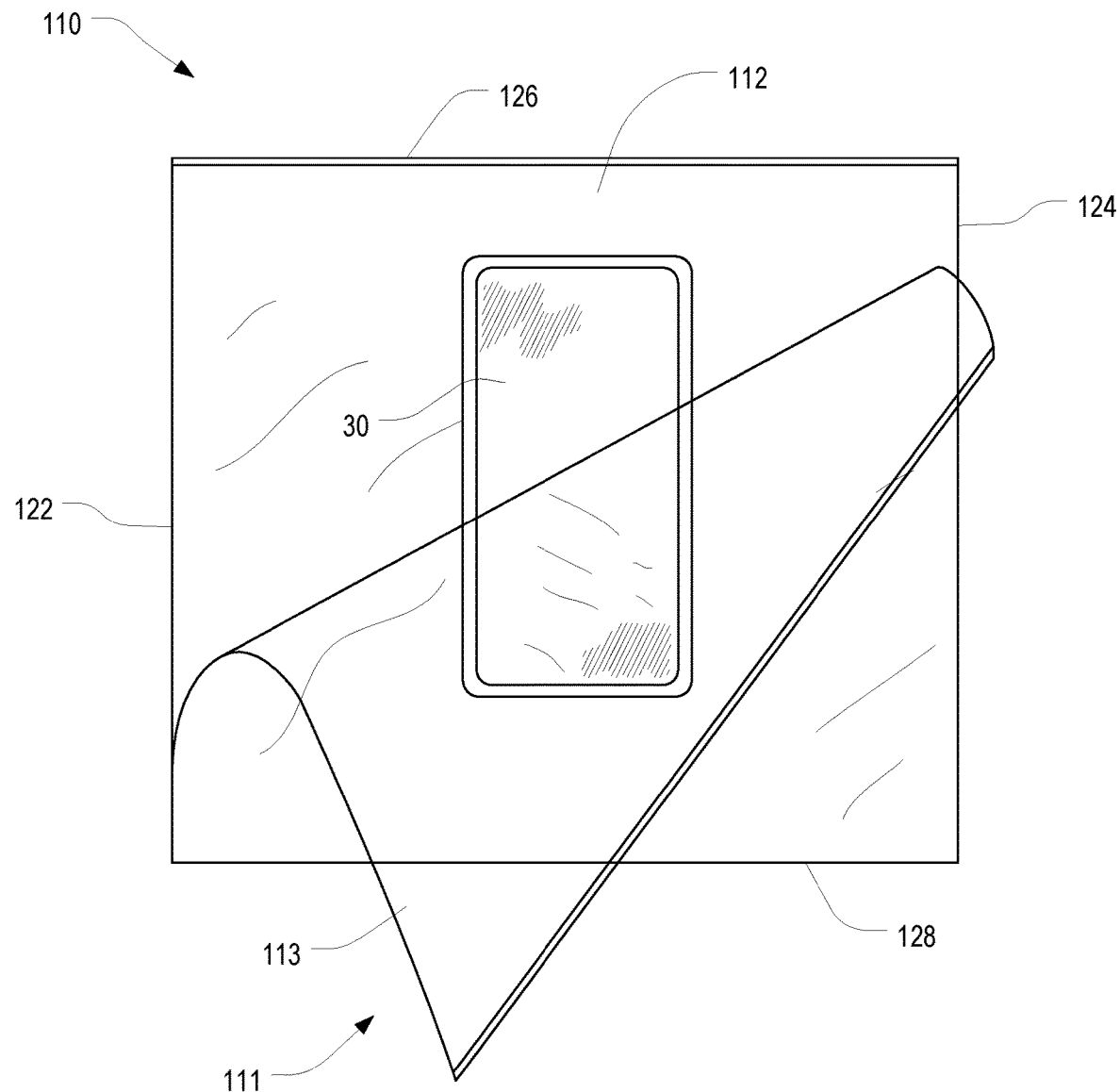
FIGS. 17-19 are front views of a pair of wraps of FIG. 16, shown in a process of sandwich wrapping the smartphone.
Figure 18:
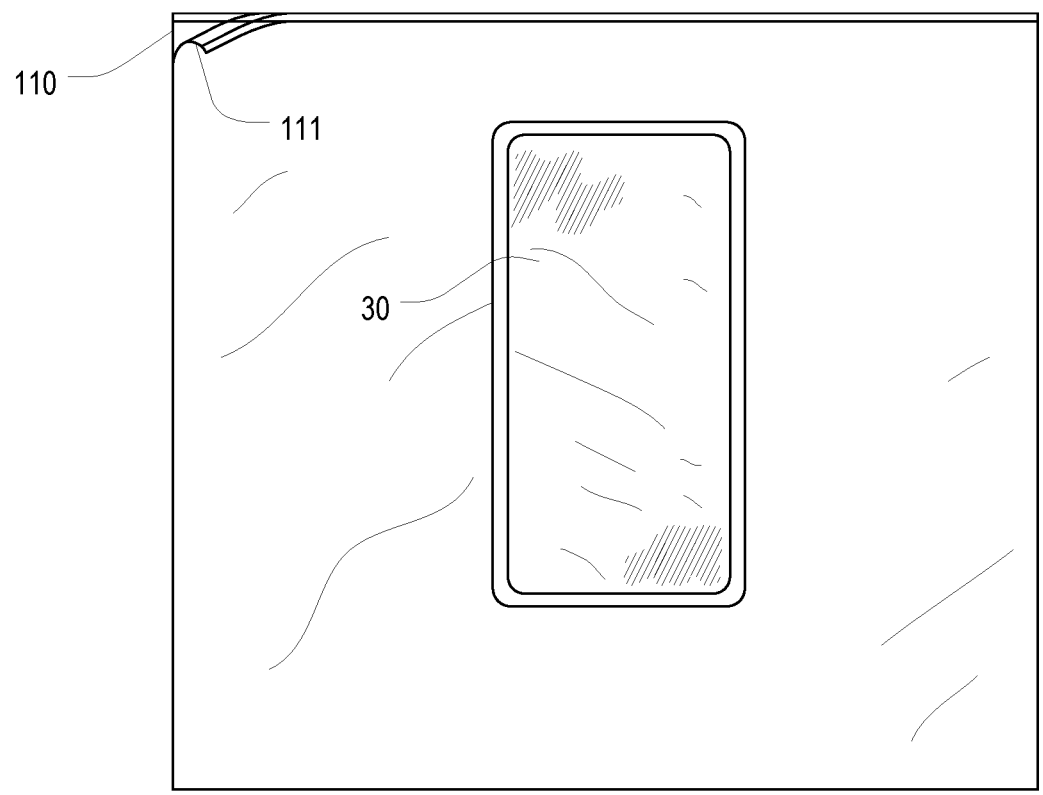
Figure 19:
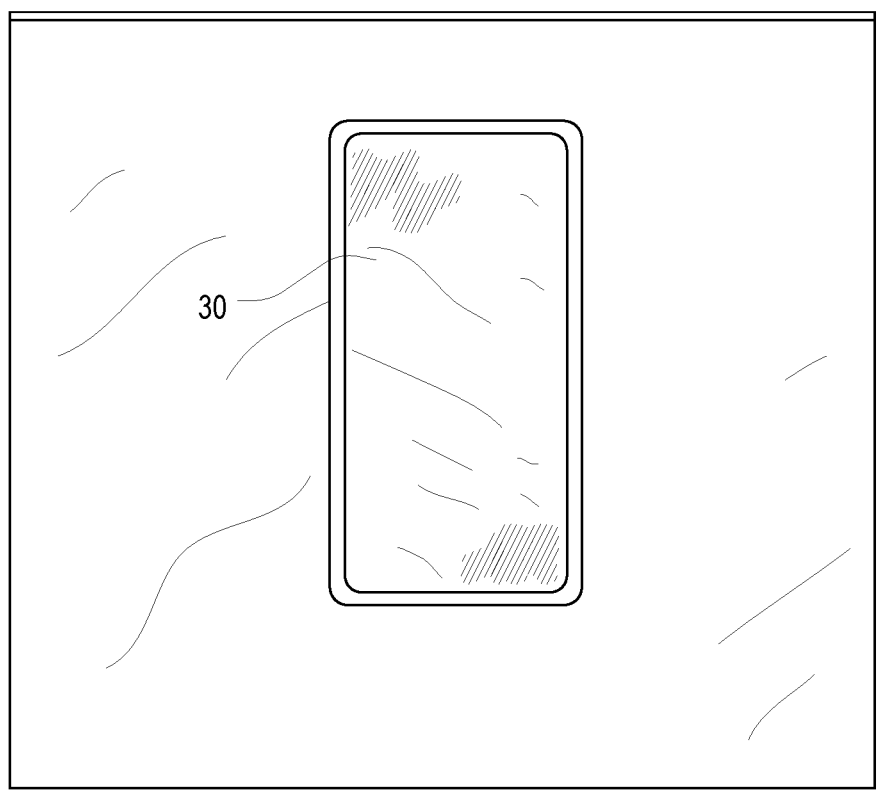

Another contemplated method of using one or more disposable antimicrobial wraps 110 in accordance with one or more aspects of the present invention is next described. Here, it is contemplated that smartphones and even larger devices, such as tablets, may be wrapped using two wraps 110 adhered to one another with the smartphone or tablet sandwiched therebetween. Such a methodology may be particularly useful for wrapping large devices that may not be coverable using a single wrap. In this regard, FIG. 15 is a front view of a wrap 110 for use with a second such wrap for sandwich wrapping a smartphone in accordance with one or more preferred embodiments of the present invention, and FIG. 16 is a front view of a smartphone 30 placed face-up on the wrap of FIG. 15. In FIG. 15, a disposable antimicrobial wrap 110 in accordance with one or more aspects of the present invention, similar to that of FIG. 1, is placed on a surface that is generally flat with a tacky surface 112 facing up. As shown in FIG. 16, the smartphone 30 (with or without a case) can then be placed onto the tacky surface 112 such that edges of the smartphone 30 are spaced from edges 122,124,126,128 of the wrap 110. FIGS. 17-19 are front views of a pair of wraps 110 of FIG. 16, shown in a process of sandwich wrapping the smartphone 30. Here, a second wrap 111, with the tacky surface 113 facing down, is aligned with and placed over the tacky surface 112 of the first wrap 110. The tacky surface 113 of the second wrap 111 adheres to a front face of the smartphone 30 and to the remaining exposed areas of the tacky surface 112 of the first wrap 110 (i.e., areas not covered by the smartphone 30). In this manner, the tacky surfaces 112,113 establish a seal with one another around the smartphone 30, thereby forming a sandwich wrap 190 around the smartphone 30 (as shown in FIG. 19). The fully wrapped smartphone 30 is ready for implementation of additional steps, such as use of the stylus 50 for removing air bubbles or wrinkles and/or folding excess top and bottom portions of the wrap toward the rear of the smartphone 30 or removal of excess material entirely.

Other folding and wrapping methodologies are likewise contemplated. For example, it is contemplated that a smartphone or other device may be capable of being wrapped with a single wrap that is folded twice (i.e., so that side edges meet or overlap at a rear of the smartphone). In other embodiments, it is contemplated that a smartphone or other device may be capable of being wrapped with a single wrap that is folded once (i.e., so that the wrap is essentially folded in half with the smartphone in between the folded layers. In this regard, the methodologies disclosed herein are not restricted to any particular quantity of folding or wrapping steps. Nor is there any restriction as to a quantity of wraps that may be implemented in a wrapping process.

Figure 20:
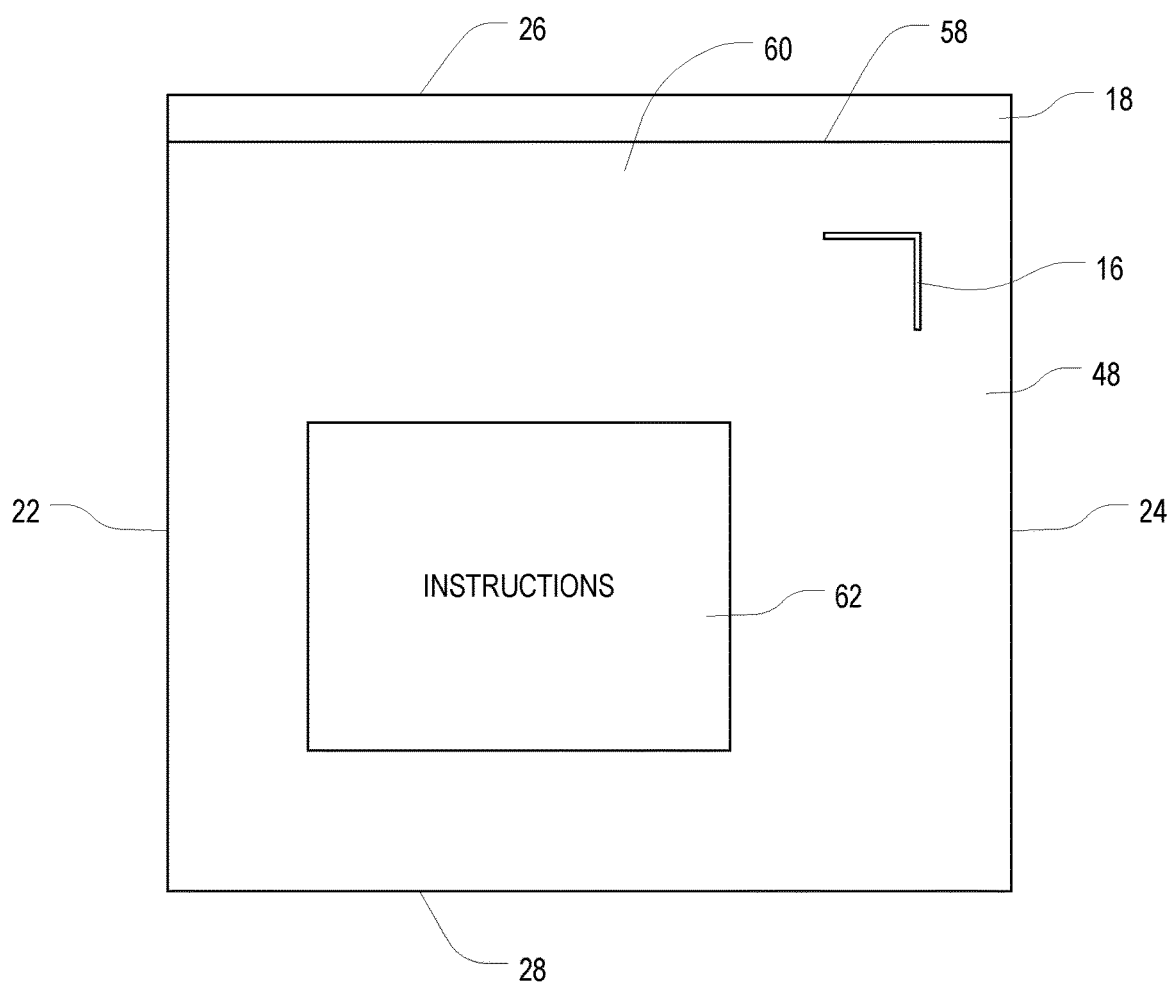
FIG. 20 is a front view of the wrap of FIG. 1, shown with a removable backing.

As also discussed above, it is contemplated that a disposable antimicrobial wrap 10 in accordance with one or more aspects of the present invention may be provided with a peel-away backing or liner layer that is adhered to the tacky surface 12 and is capable of being peeled away with relative ease to reveal the tacky surface 12. In this regard, FIG. 20 is a front view of the wrap 10 of FIG. 1, shown with a removable backing 60. As shown in FIG. 20, the removable backing 60 covers the tacky surface 12 of the wrap 10 before the wrap is used, and, in at least some embodiments, it is contemplated that the removable backing covers 60 the entire tacky surface 12. Additionally, in at least some embodiments, the removable backing 10 may include a perforation or score cut line to facilitate ease of separation of the backing from the tacky surface 12 of the wrap 60. In such instances, a perforation or score cut line may be arranged at any location along the backing 60 where the backing might be gripped or pulled for separation from the tacky surface 12, such as at a corner or an edge. In at least some embodiments, a perforation or score cut line is arranged just beneath the tackiness-free section 18 of the wrap 10.

The removable backing 60 helps to ensure that the tacky surface 12 remains sufficiently tacky as to be effective in wrapping a smartphone. In at least some contemplated embodiments, the backing 60, which may be at least partially opaque or may include one or more solid colors or patterns, includes a set of instructions 62 for how to use the wrap 10 in connection with wrapping a smartphone. In other contemplated embodiments, the backing 60 may be translucent. It is further contemplated that the peel-away backing 60 may include branding information or advertising information for either or both of a company that manufactures or sells the wrap 10 and a company that may provide the wrap 10 as a resource for its patients, employees, clients, patrons, or visitors to help prevent spread of biological contaminants in an environment. Further still, it is contemplated that the peel-away backing may include an instruction adjacent to, and positioned interiorly of, the notch 16 that informs a user to "Place Smartphone Here." In this regard, it is contemplated that the backing 60 may provide a visual template for how to use the wrap 10, including an indication for where to place the smartphone 30 on the tacky surface 12. Additionally, in contemplated embodiments, the backing 60 may be written upon with a pen or marker. Further still, it is contemplated that the backing 60 may be made using a "lay flat" material, whereby the backing 60 is resistant to curling or twisting when peeled, printed upon, or otherwise manipulated.

Figure 21:
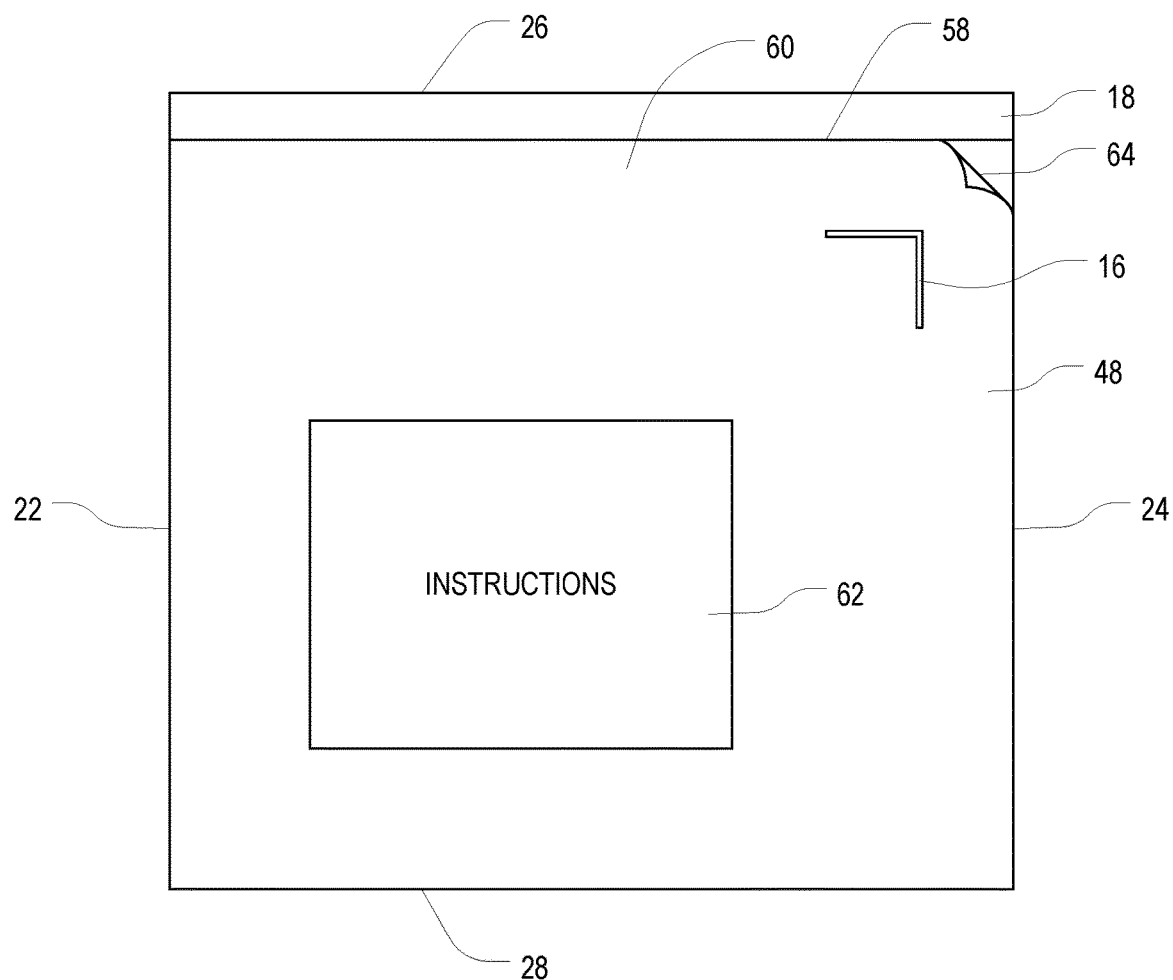
FIGS. 21-23 are front views of the wrap of FIG. 20, shown with the backing in partial states of removal.
Figure 22:
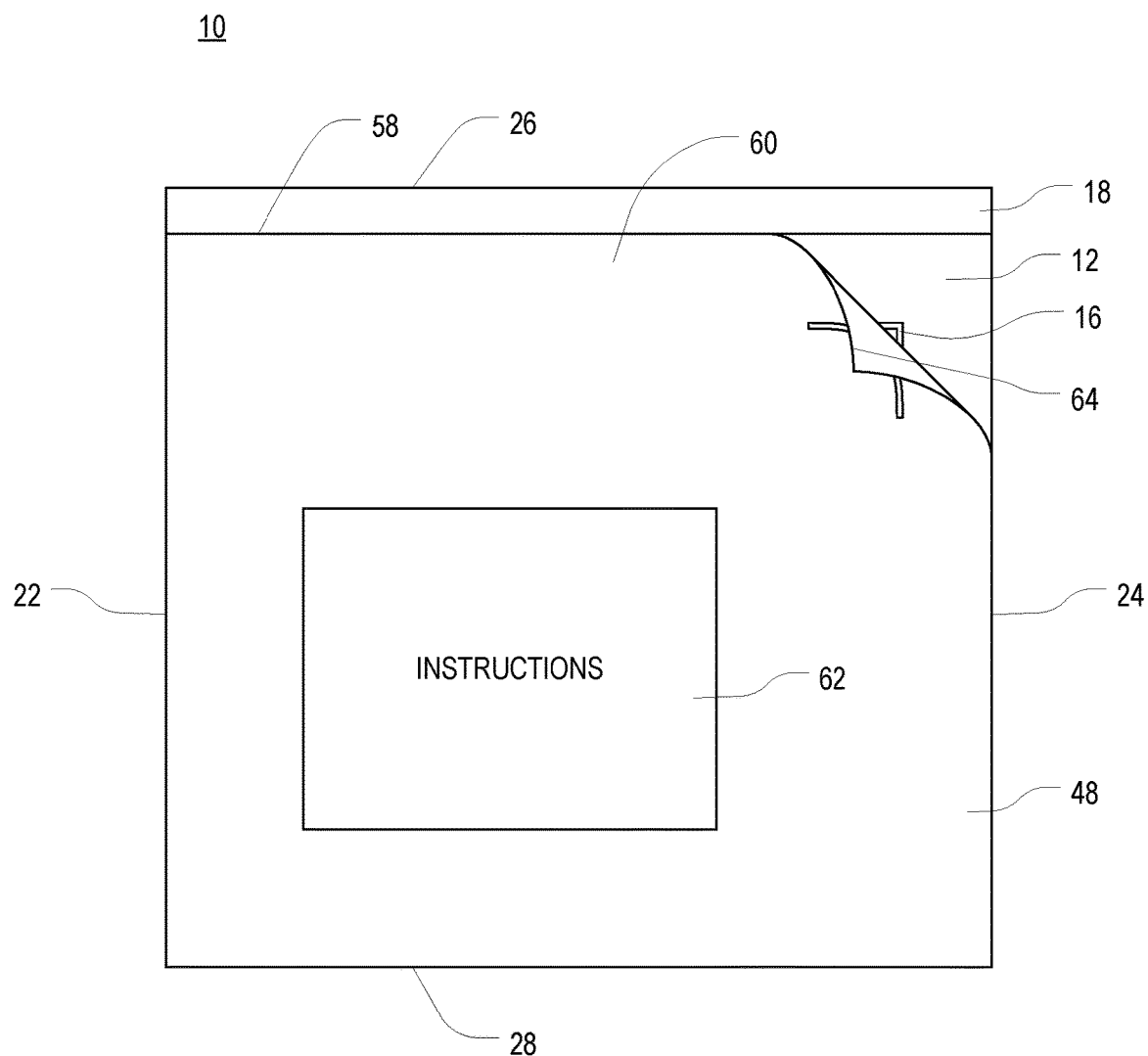
Figure 23:
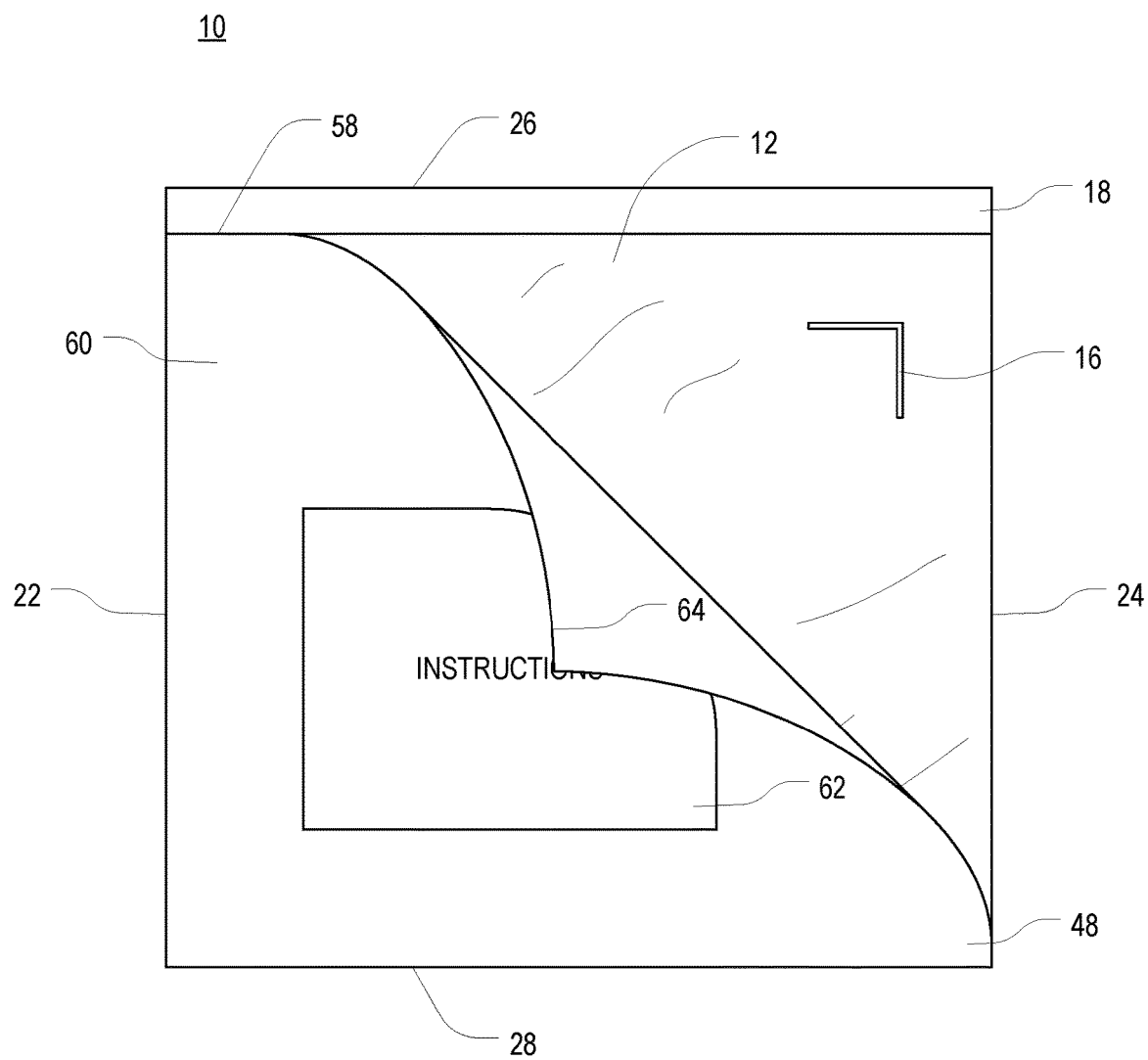

FIGS. 21-23 are front views of the wrap 10 of FIG. 20, shown with the backing 60 in partial states of removal. As shown in FIGS. 21-23, it is contemplated that at least part of the backing 60 may be peeled away to reveal the tacky surface 12. In particular, it is contemplated that the backing 60 may include a perforation, seam, or score cut 58 extending horizontally across the wrap 10 adjacent the upper edge 26 thereof. In this regard, the seam 58 divides the backing 60 into two sections: a large lower section 48 that is intended to be peeled away to reveal the tacky surface 12 and a more narrow upper section 18 that is intended to remain in place so that a section of the tacky surface 12 adjacent the upper edge 26 remains free or substantially free of any tackiness or stickiness. It is contemplated that the lower section 48 of the backing 60 is removable from the tacky surface 12 by lifting a corner 64 thereof (here, the top right corner, although it is contemplated that any corner or edge may be used) and gently pulling the lower section 48 away from the tacky surface 12. In this regard, removal of the lower section 48 of the backing 60 from the tacky surface 12 is comparable to peeling a conventional sticker from its backing. It is contemplated that printed arrows or other indications may be present to provide information regarding where the lower section 48 may be peeled away.

Once the lower section 48 of the backing 60 is removed, the wrap 10 is ready for use in wrapping a smartphone. It is contemplated that the wrap 10 with the lower section 48 of the backing 60 removed would have the same appearance as that of FIG. 1, discussed above. Notably, the upper section 18 of the backing 60 remains in place against the tacky surface 12 so as to ensure that a narrow section along the upper edge 26 of the wrap 10 is free or substantially free of any tackiness or stickiness. In contemplated embodiments, the upper section 18 may include customizations such as corporate names, brands, logos, colors, and the like, as it is intended to remain in place while the wrap 10 is in use. It is further contemplated that the upper section 18, by not having tackiness or stickiness, may be used for gripping the wrap 10 when in use.

Figure 24:
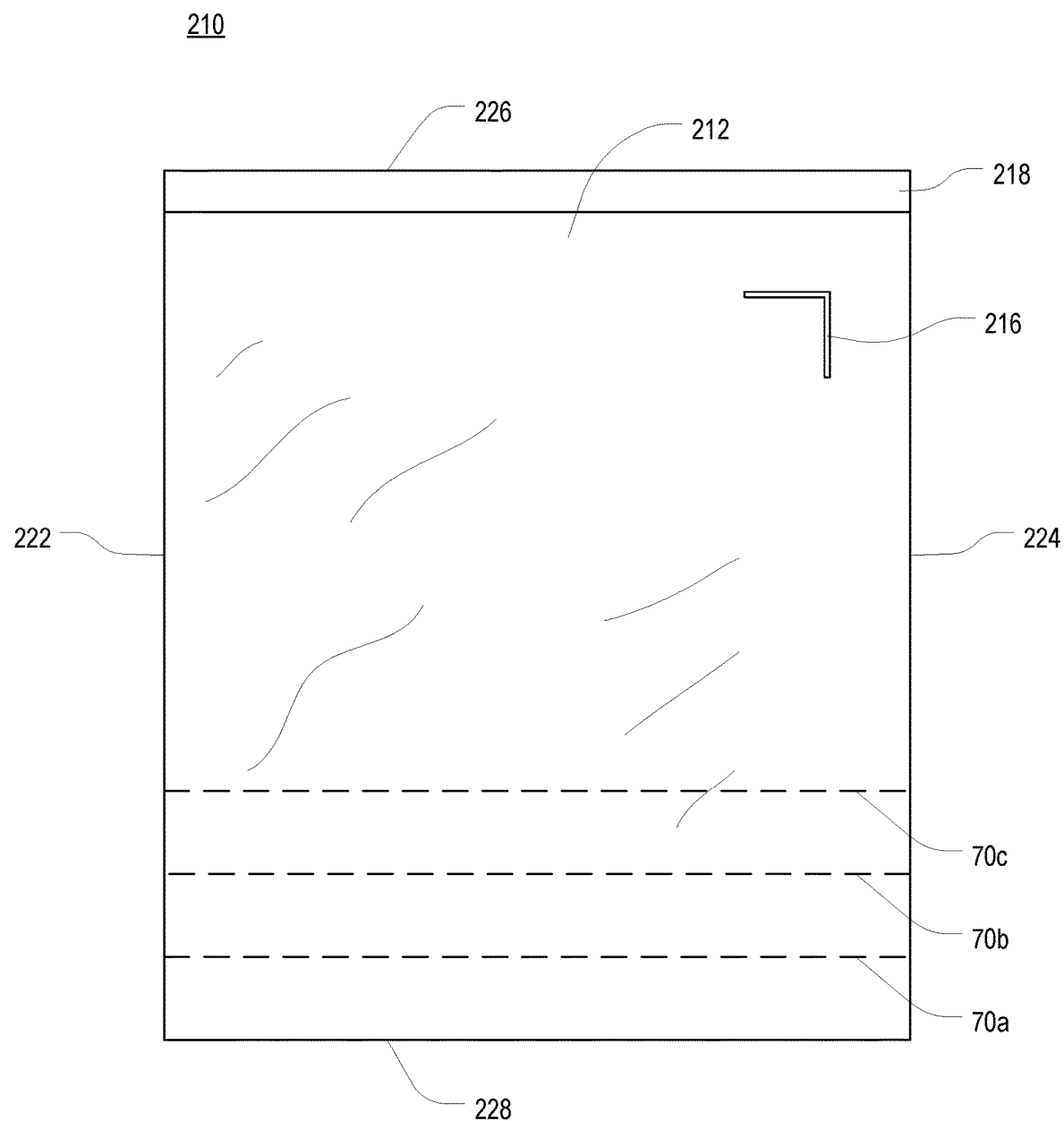
FIG. 24 is a front view of a wrap having tear-off portions in accordance with one or more preferred embodiments of the present invention.

FIG. 24 is a front view of a wrap 210 having tear-off portions in accordance with one or more preferred embodiments of the present invention. With reference to FIG. 24, it is contemplated that a disposable antimicrobial wrap 210 in accordance with one or more aspects of the present invention may include tear-off portions that are formed by perforation seams or score cuts 70a, 70b, 70c across the wrap 210. The perforation seams or score cuts 70a, 70b, 70c enable easy tearing away of excess material once the wrap 210 has been used to cover a smartphone. In contemplated embodiments, the perforation seams or score cuts 70a, 70b, 70c are arranged horizontally across the lower portion of the wrap 210 and are generally evenly spaced apart from one another. In FIG. 24, a lowermost perforation seam or score cut 70a is shown spaced apart by a small margin from the bottom edge 228 of the wrap 210. The middle perforation seam or score cut 70b is spaced apart from the lowermost seam or score cut 70a by roughly the same margin, and the uppermost perforation seam or score cut 70c is likewise spaced from the middle seam by roughly the same margin. It is contemplated that multiple perforation seams or score cuts 70a, 70b, 70c provide a user with the ability to tailor the fit of the wrap 210 to suit the dimensions of the smartphone. It should also be noted that perforation seams or score cuts may be located in other areas of the wrap and may have alternate orientations, as might be preferred.

Figure 25:
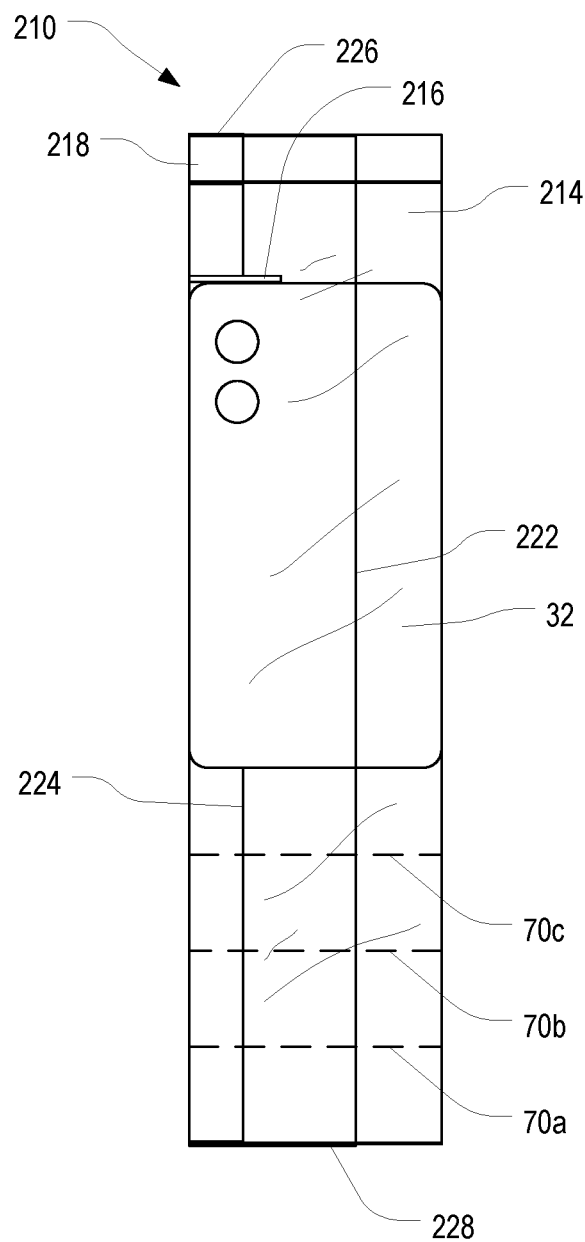
FIG. 25 is a rear view of a smartphone fully wrapped in the wrap of FIG. 24.
Figure 26:
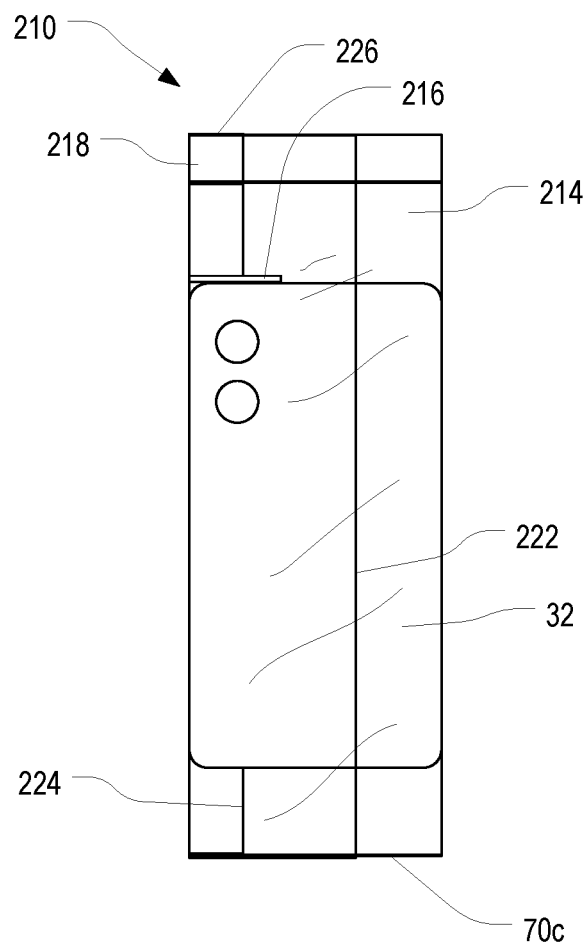
FIG. 26 is a rear view of the fully wrapped smartphone of FIG. 25, shown with one or more tear-off portions removed.
Figure 27:
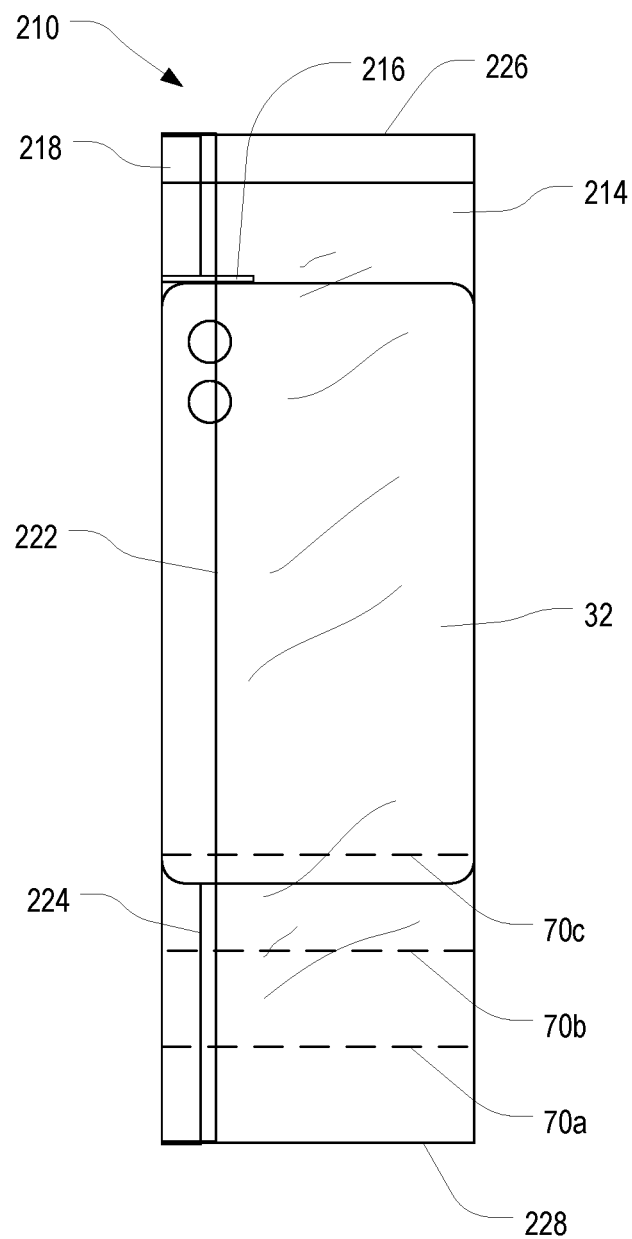
FIG. 27 is a rear view of a large smartphone fully wrapped in the wrap of FIG. 24.
Figure 28:
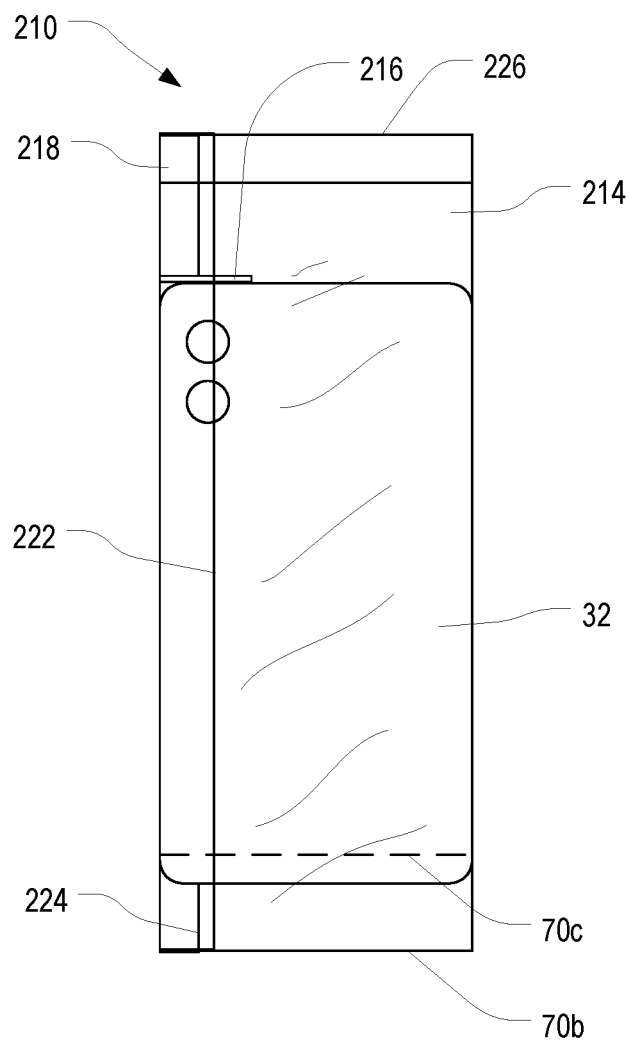
FIG. 28 is a rear view of the fully wrapped smartphone of FIG. 27, shown with one or more tear-off portions removed.

FIG. 25 is a rear view of a smartphone 30 fully wrapped in the wrap 210 of FIG. 24, and FIG. 26 is a rear view of the fully wrapped smartphone 30 of FIG. 25, shown with one or more tear-off portions removed. Additionally, FIG. 27 is a rear view of a large smartphone 130 fully wrapped in the wrap 210 of FIG. 24, and FIG. 28 is a rear view of the fully wrapped smartphone 130 of FIG. 27, shown with one or more tear-off portions removed. With reference to FIGS. 25-28, the notch 216 adjacent the upper edge 226 of the wrap 210 standardizes the position of a smartphone 30,130 relative to the upper edge 226, irrespective of the dimensions of the smartphone. Beneath the fully wrapped smartphone 30,130, however, excess material may be present. Furthermore, the amount of excess material beneath the smartphone may vary depending on the dimensions of the smartphone. For example, with reference to FIG. 25, three perforation seams or score cuts 70a, 70b, 70c are visible beneath the lower edge of the fully wrapped smartphone 30. As shown in FIG. 26, it is contemplated that the wrap 210 may be torn along the uppermost perforation seam or score cut 70c to remove excess material. Turning to FIG. 27, which shows a fully wrapped large smartphone 130, only two perforation seams or score cuts 70a, 70b are visible beneath the lower edge of the fully wrapped large smartphone 130. And, as shown in FIG. 28, it is contemplated that the wrap 210 may be torn along the middle perforation seam or score cut 70b to remove excess material. In this regard, the wrap 210 is customizable to suit the particular dimensions of the smartphone that is wrapped.

Figure 29:
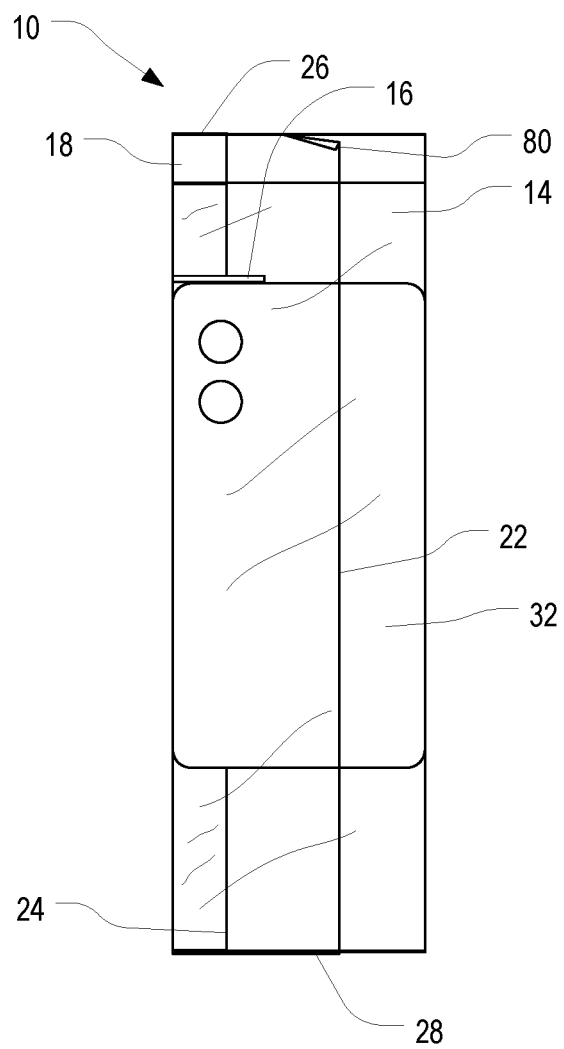
FIG. 29 is a rear view of the fully wrapped smartphone of FIG. 8, shown with a corner of the wrap being separated for removal.
Figure 31:
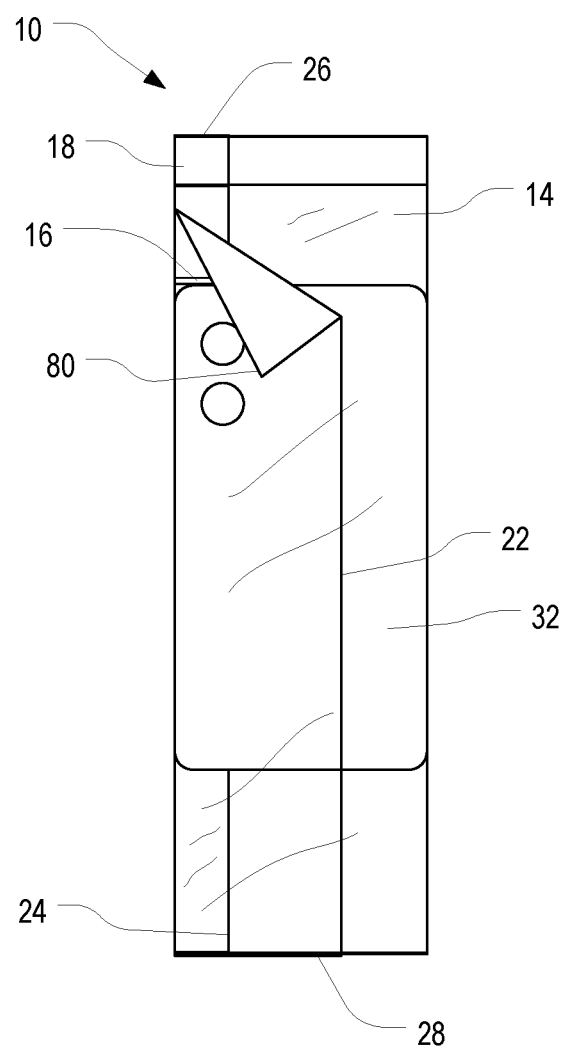
FIG. 31 is a rear view of the wrapped smartphone of FIG. 30, shown with still more of the corner of the wrap being separated for removal.

A process of unwrapping the smartphone 30 is shown beginning with FIG. 29 and continuing through FIG. 31. FIG. 29 is a rear view of the fully wrapped smartphone 30 of FIG. 8, shown with a corner 80 of the wrap 10 being separated for removal. As discussed above, a section 18 of the tacky surface 12 adjacent the upper edge 26 of the wrap 10 may be free or substantially free of any tackiness or stickiness. In at least some embodiments, the non-tacky section 18 of the wrap 10 is formed by retaining a corresponding portion of the peel-away backing 60 in place against the tacky surface 12 while the remaining portion of the backing 60 is removed to reveal the tacky surface 12 of the wrap 10. With reference to FIG. 29, it is contemplated that a corner 80 of the wrap 10 (where the left side edge 22 of the wrap 10 is arranged along the rear of the smartphone case 32) can be lifted with relative ease, as there is no tacky surface at the underside of the section 18 of which the corner 80 is a part. In other contemplated embodiments, the wrap may include one or more perforations or score cuts (not shown) that may be used to tear away a portion of the wrap and facilitate wrap removal.

Figure 30:
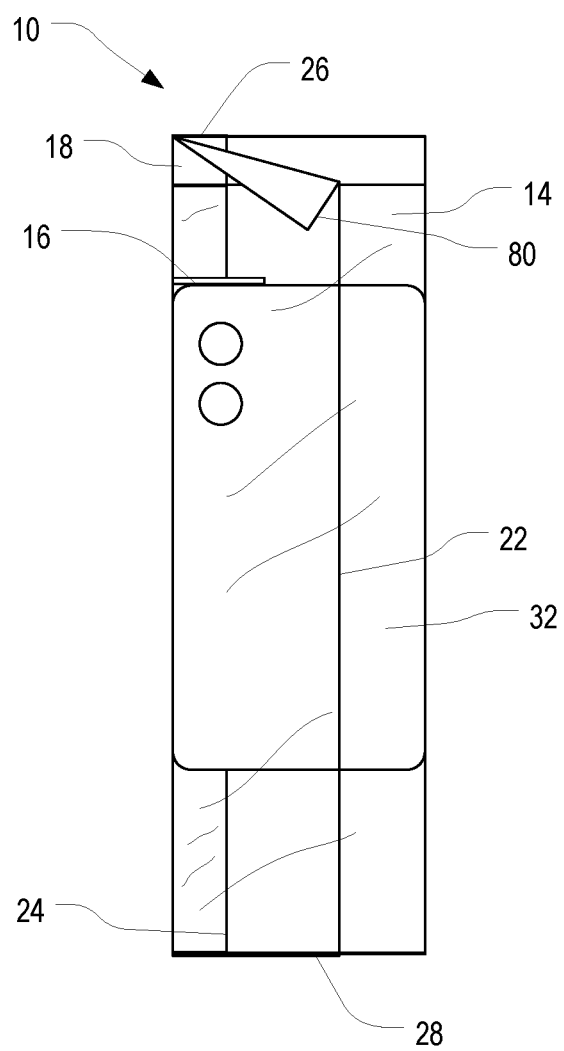
FIG. 30 is a rear view of the wrapped smartphone of FIG. 29, shown with more of the corner of the wrap being separated for removal.

FIG. 30 is a rear view of the wrapped smartphone 30 of FIG. 29, shown with more of the corner 80 of the wrap 10 being separated for removal, and FIG. 31 is a rear view of the wrapped smartphone 30 of FIG. 30, shown with still more of the corner 80 of the wrap 10 being separated for removal. By lifting and pulling the corner 80, the wrap 10 is cleanly separated from itself as well as from the smartphone 30 and case 32. Once removed, it is contemplated that the wrap 10 may be discarded, and the smartphone 30 is returned to its original unwrapped state. It is further contemplated that the corner 80 of the wrap 10 to be lifted for initiating wrap removal may be configured as a bent tab for easier lifting. In this latter regard, it is contemplated that, as part of the section 18 without tackiness at an underside thereof, the bent tab would be simple to identify and lift, thereby enabling overlapped layers of the non-tacky section 18 to be pulled apart from one another. Additionally, in at least some embodiments, it is contemplated that the removed wrap may be reused or recycled. Further still, it is contemplated that the tacky surface of the wrap may pull away debris or other unwanted material from the surface of the smartphone or case as the wrap is removed.

FIG. 32A is a front view of the wrap 10a of FIG. 1 illustrating exemplary dimensions thereof. It is contemplated that the wrap may be provided with dimensions capable of accommodating a wide variety of differently sized and shaped smartphones or other portable devices. In at least some embodiments, it is contemplated that the wrap 10a may have the dimensions shown in FIG. 32A. Here, the wrap 10a has a rectangular shape with long edges measuring about 9 inches and short edges measuring about 8 inches. The non-tacky section 18a of the wrap 10a along the upper edge 26a has a side length measuring about 0.5 inches. The notch 16a is spaced apart from each of the upper edge 26a and the right side edge 24a by about one inch, and each leg of the L-shape of the notch 16a measures about one inch.

Other shapes and dimensions of the wrap and the features thereon are likewise contemplated. For example, it is contemplated that the wrap may have a generally square shape, with dimensions of about 7 inches by about 7 inches, about 8 inches by about 8 inches, about 8.5 inches by about 8.5 inches, about 9 inches by about 9 inches, or about 10 inches by about 10 inches. Another contemplated rectangular shape for the wrap may have dimensions measuring about 9 inches by about 8.5 inches. Furthermore, it is contemplated that the non-tacky section along the upper edge of the wrap may have a side length anywhere from about an eighth of an inch to multiple inches (measured from the upper edge). In at least some contemplated embodiments, the non-tacky section along the upper edge of the wrap has a side length measuring about a quarter inch (measured from the upper edge).

Figure 33:
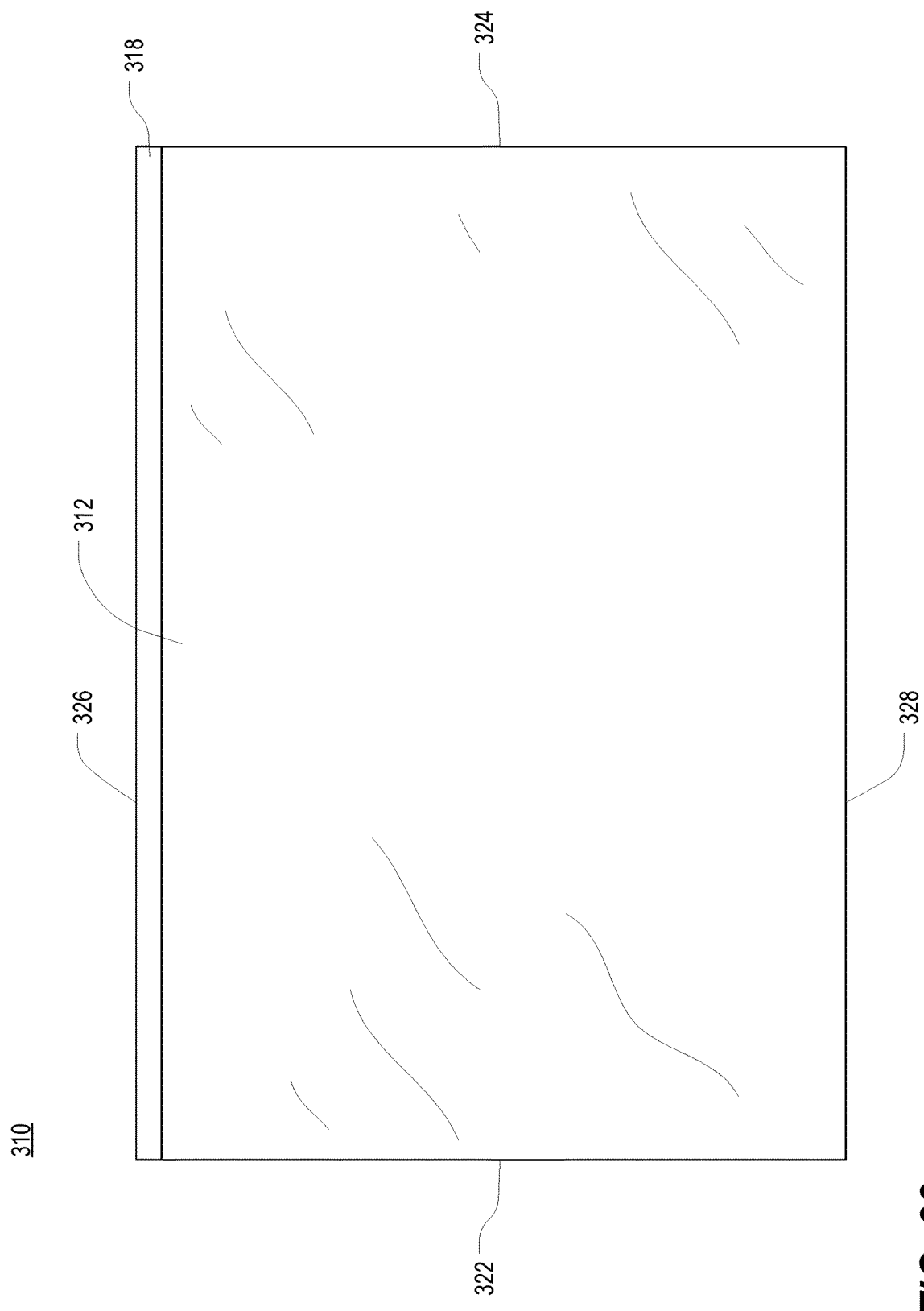
FIG. 33 is a front view of a disposable antimicrobial wrap for a tablet in accordance with one or more preferred embodiments of the present invention.
Figure 34:
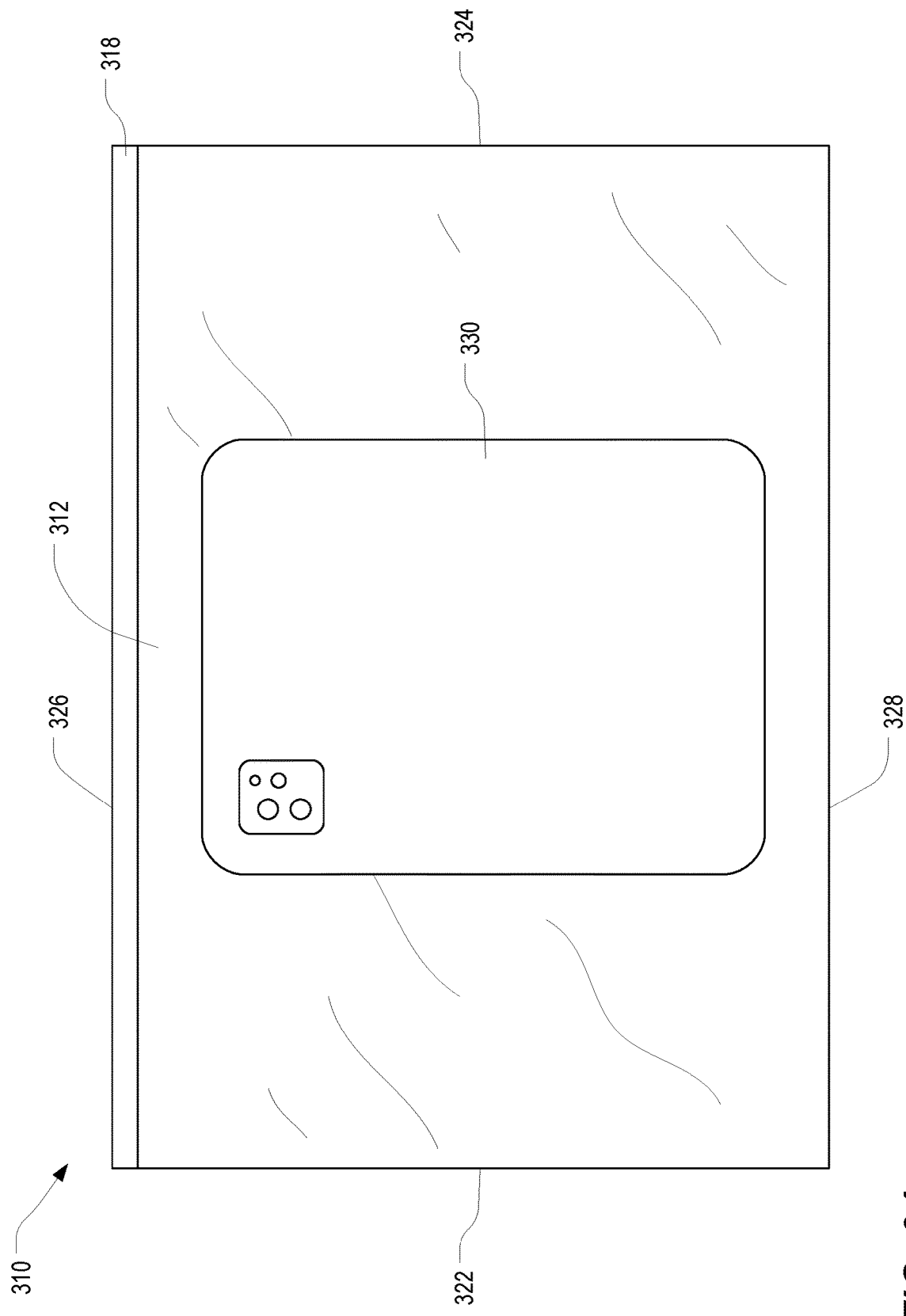
FIG. 34 is a rear view of a tablet placed on the wrap of FIG. 33.

In another contemplated embodiment, a single disposable antimicrobial wrap 310 is sized and dimensioned to fully cover a tablet computer such as, for example, any of a variety of tablet computers manufactured by Apple Inc. of Cupertino, CA under the IPAD® trade name. In this regard, FIG. 33 is a front view of a disposable antimicrobial wrap 310 for a tablet in accordance with one or more preferred embodiments of the present invention, and FIG. 34 is a rear view of a tablet 330 placed on the wrap 310 of FIG. 33. As with smartphones, it is contemplated that a disposable antimicrobial wrap 310 in accordance with one or more aspects of the present invention is adaptable for use with a tablet 330 retained within a case (not shown) or a tablet 330 without a case.

With reference to FIG. 33 in particular, the disposable antimicrobial wrap 310 is a generally quadrilateral section of wrap material having left and right side edges 322,324 and upper and lower edges 326,328. Although depicted in FIG. 33 with right-angled corners, it is also contemplated that the wrap 310 may have rounded or curved corners or edges. A top-facing surface 312, or tacky surface, of the wrap 310 includes a sufficient level of tackiness or stickiness as to be able to adhere to a tablet or tablet case as well as to itself. In at least some embodiments, it is contemplated that the wrap 310 may be provided with a peel-away liner layer (as described hereinabove in connection with the wrap 10) that is adhered to the tacky surface and is capable of being peeled away with relative ease to reveal the tacky surface 312. It is further contemplated that, in at least some embodiments, a section 318 of the tacky surface 312 may be free or substantially free of any tackiness or stickiness. In the embodiment of FIG. 33, the tackiness-free section 318 is configured as a relatively narrow strip extending along the upper edge 326 of the wrap 310. The bottom surface 314 of the wrap 310 (not visible in FIG. 33) is preferably a non-tacky, smooth surface. In this manner, a device user would be able to drag a finger along the bottom surface 314 smoothly without sticking, catching, or other interference. Notably, it is contemplated that the tacky surface 312 of the wrap 310 is capable of adhering to another portion of the tacky surface 312 (i.e., to itself) or to the bottom, non-tacky surface 314 of the wrap 310. In this regard, it is contemplated that the tacky surface 312 of the wrap 310 adhering to itself in at least some areas may be effective in forming a sealed barrier.

In most respects, the disposable antimicrobial wrap 310 of FIGS. 33 and 34 is largely the same as that of FIG. 1 other than with respect to its size and dimensions, as noted hereinbelow. It is also noted that the wrap 310 of FIGS. 33 and 34 may optionally include a notch (not shown) to assist with positioning and aligning a tablet on the wrap 310. As shown in FIG. 33, the wrap 310 is placed on a surface that is generally flat with the tacky surface 312 facing up. Then, as shown in FIG. 34, a tablet 330 (with or without a case) can be placed face down onto the tacky surface 312 such that edges of the tablet 330 are spaced from edges 322,324,326, 328 of the wrap 310. The tablet is placed face down on the wrap 310 to ensure that edges 322,324,326,328 of the wrap 310 do not interfere or obstruct the touchscreen and viewable interface during and after the wrapping process. Once the tablet is in position on the wrap 310, a wrapping process may be conducted in a manner similar to that which is described above in connection with FIGS. 3-8.

Figure 35:
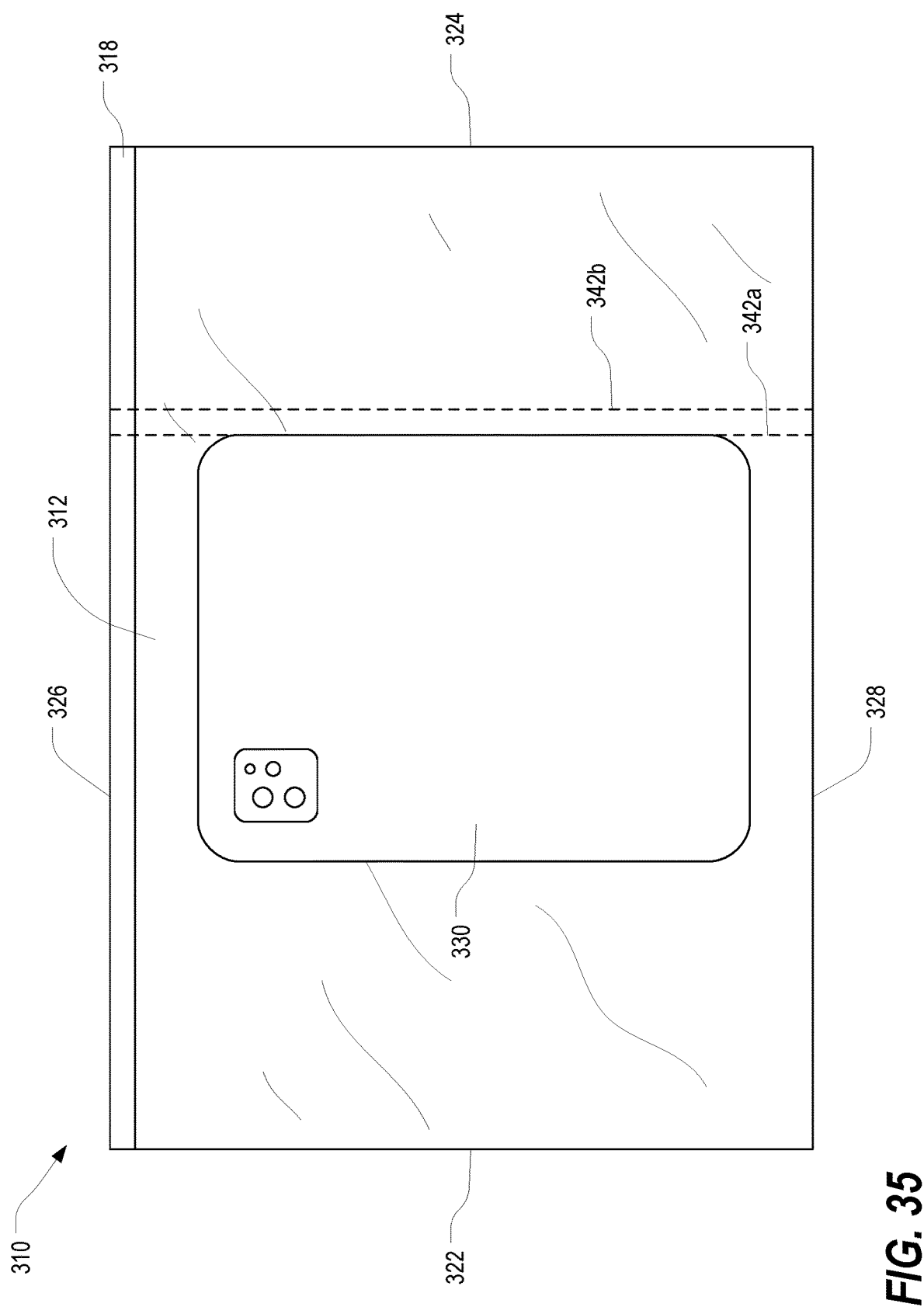
FIG. 35 is a rear view of the tablet and wrap of FIG. 34 illustrating a first set of fold lines.
Figure 36:
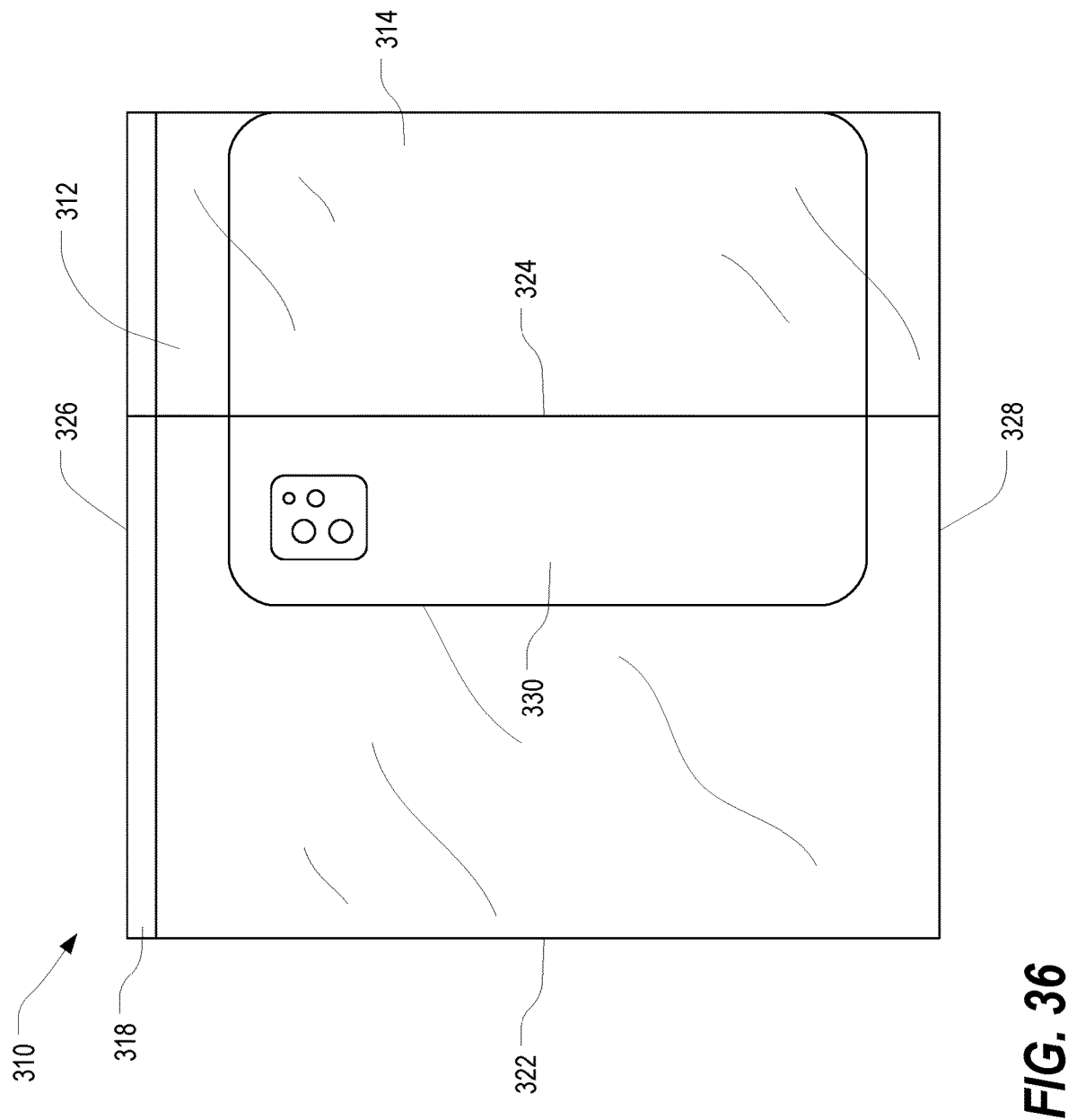
FIG. 36 is a rear view of the tablet and wrap of FIG. 35, shown in a first intermediate wrapping state.
Figure 38:
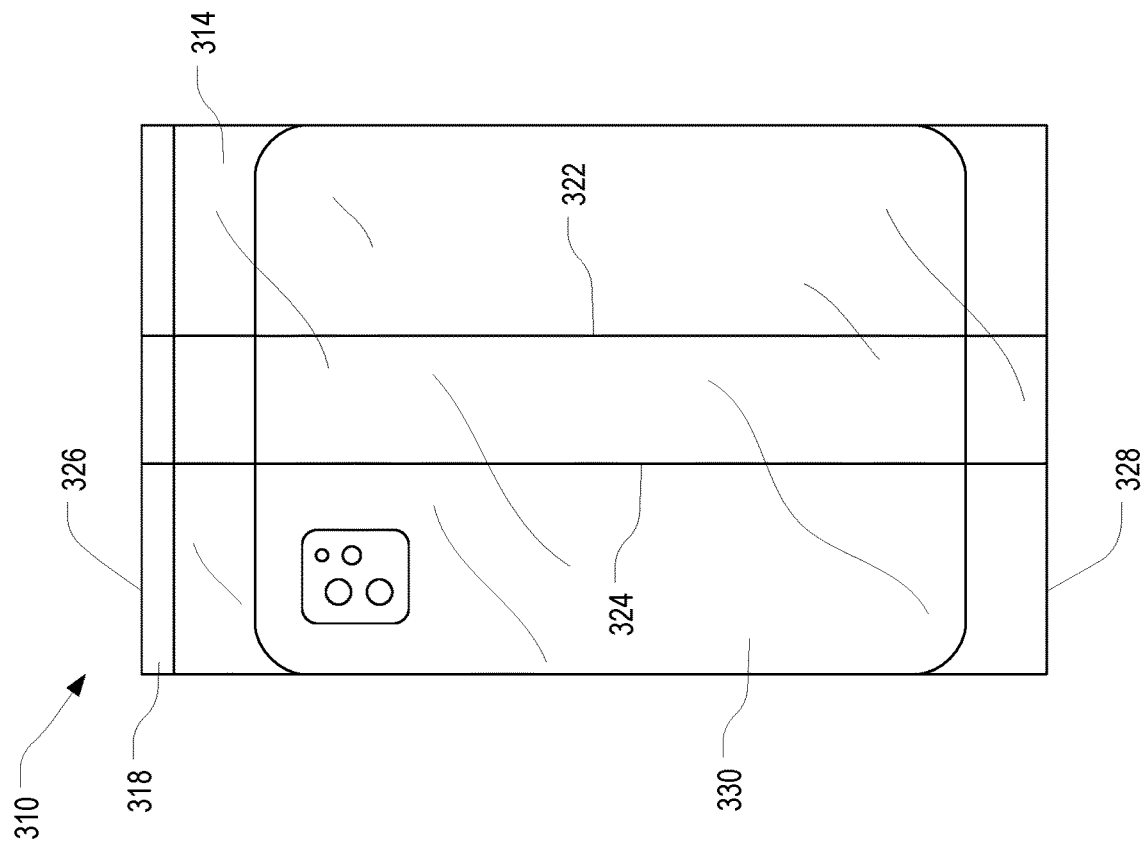
FIG. 38 is a rear view of the tablet and wrap of FIG. 37, shown in a fully wrapped state.

A process of wrapping the tablet 330 is shown beginning with FIG. 35 and continuing through FIG. 38. FIG. 35 is a rear view of the tablet 330 and wrap 310 of FIG. 34 illustrating a first set of fold lines 342a,342b, and FIG. 36 is a rear view of the tablet 330 and wrap 310 of FIG. 35, shown in a first intermediate wrapping state. The fold lines 342a, 342b of FIG. 35 identify locations where the wrap 310 has been folded in FIG. 36. In particular, the inner fold line 342a is aligned with the front left side edge of the tablet 330, and the outer fold line 342b is aligned with the rear left side edge of the tablet 330. To commence wrapping the tablet 330 in accordance with this contemplated method, a right side of the wrap 310 is lifted and folded snugly against the left side and a portion of the rear of the tablet 330. Once the folds along lines 342a,342b are complete, as shown in FIG. 36, the tacky surface 312 adheres to portions of the tablet 330 as well as to other portions of the tacky surface 312, and a portion of the non-tacky bottom surface 314 is visible. The right side edge 324 of the wrap 310 is arranged along the rear of the tablet 330.

Figure 37:
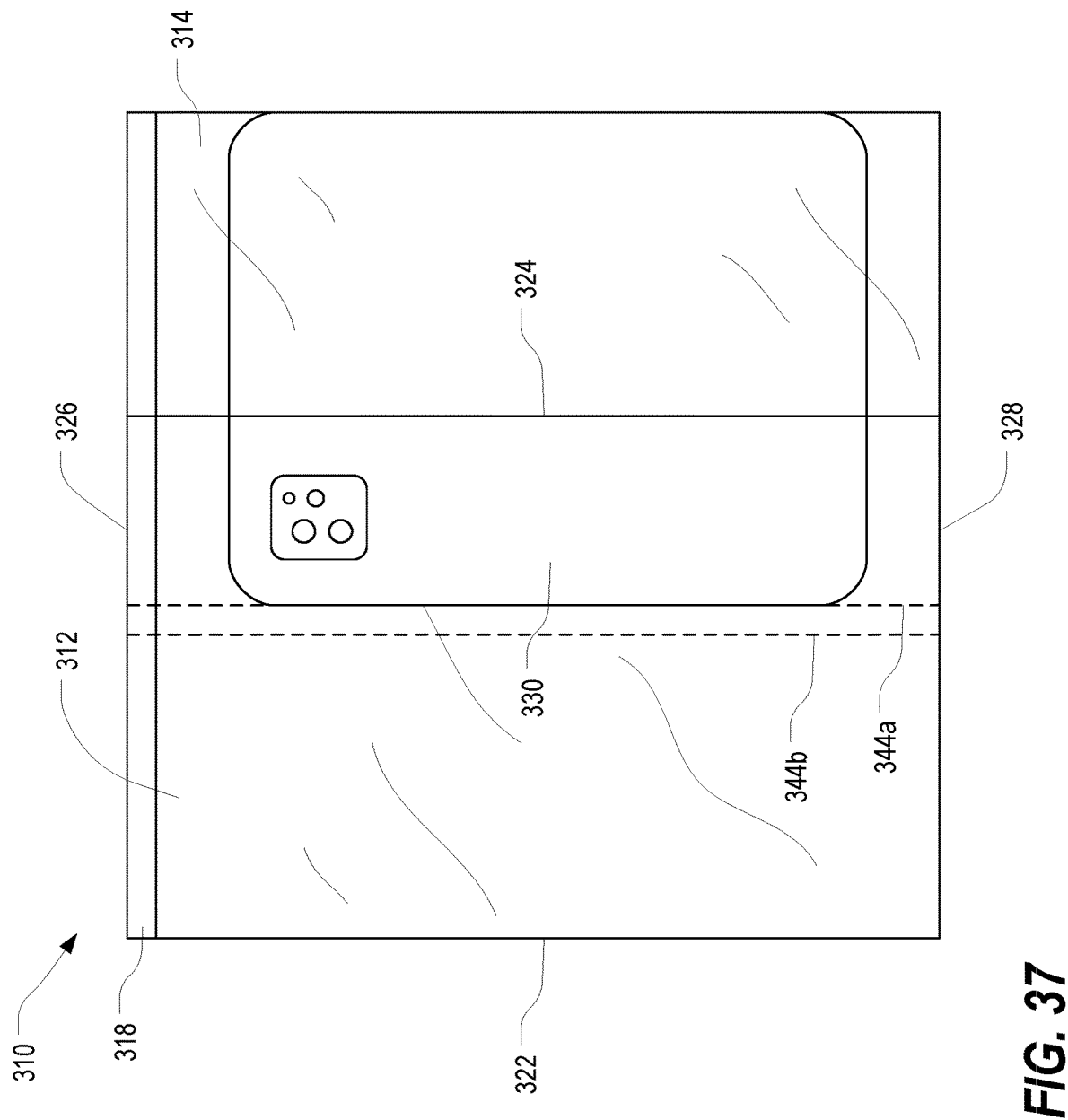
FIG. 37 is a rear view of the partially wrapped tablet of FIG. 36 illustrating a second set of fold lines.

FIG. 37 is a rear view of the partially wrapped tablet 330 of FIG. 36 illustrating a second set of fold lines 344a,344b, and FIG. 38 is a rear view of the tablet 330 and wrap 310 of FIG. 37, shown in a fully wrapped state. The fold lines 344a,344b of FIG. 37 identify locations where the wrap 310 has been folded in FIG. 38. In particular, the inner fold line 344a is aligned with the front right side edge of the tablet 330, and the outer fold line 344b is aligned with the rear right side edge of the tablet 330. To complete wrapping the tablet 330 in accordance with this contemplated method, a left side of the wrap 310 is lifted and folded snugly against the right side and a portion of the rear of the tablet 330. Once the folds along lines 344a,344b are complete, as shown in FIG. 38, the tacky surface 312 adheres to portions of the tablet 330 as well as to other portions of the tacky surface 312, and an additional portion of the non-tacky bottom surface 314 is visible. The left side edge 322 of the wrap 310 overlaps the right side edge 324 and is likewise arranged along the rear of the tablet 330.

Figure 39:
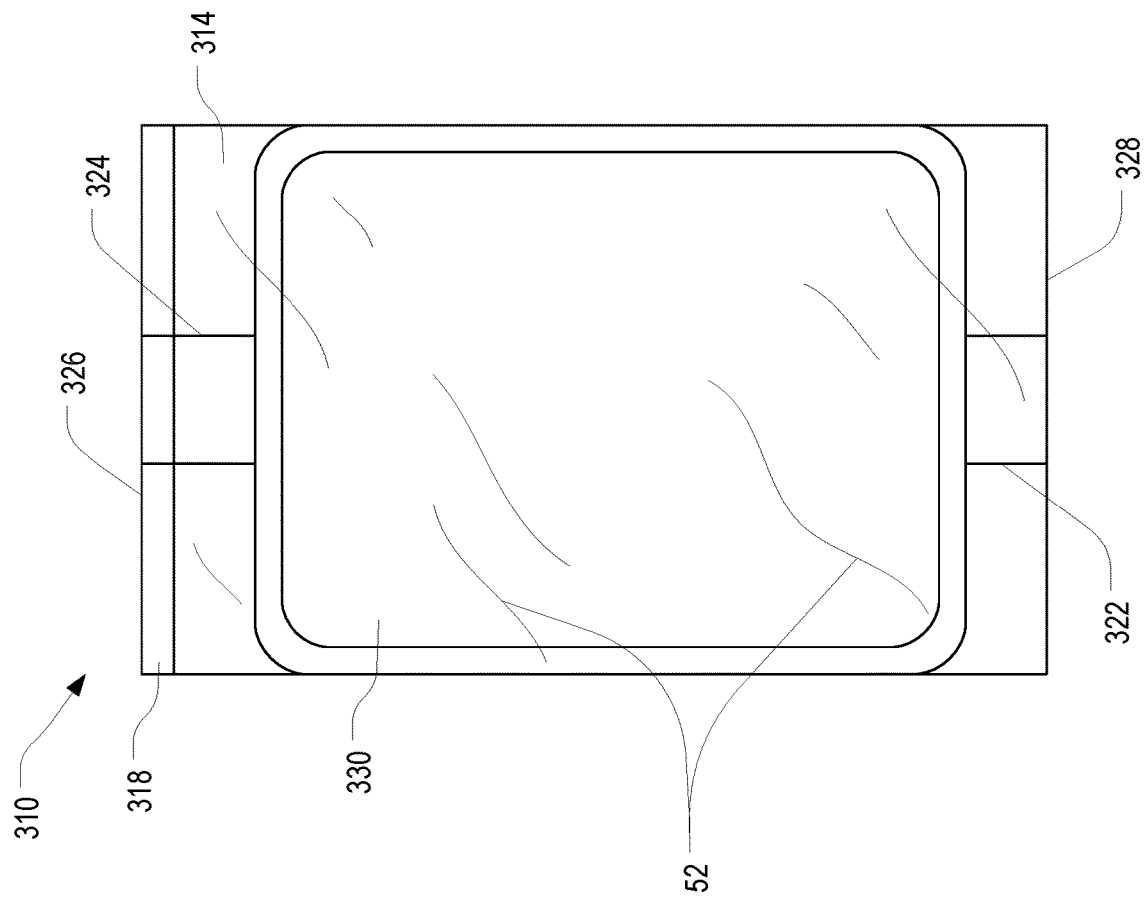
FIG. 39 is a front view of the wrapped tablet of FIG. 38.
Figure 40:
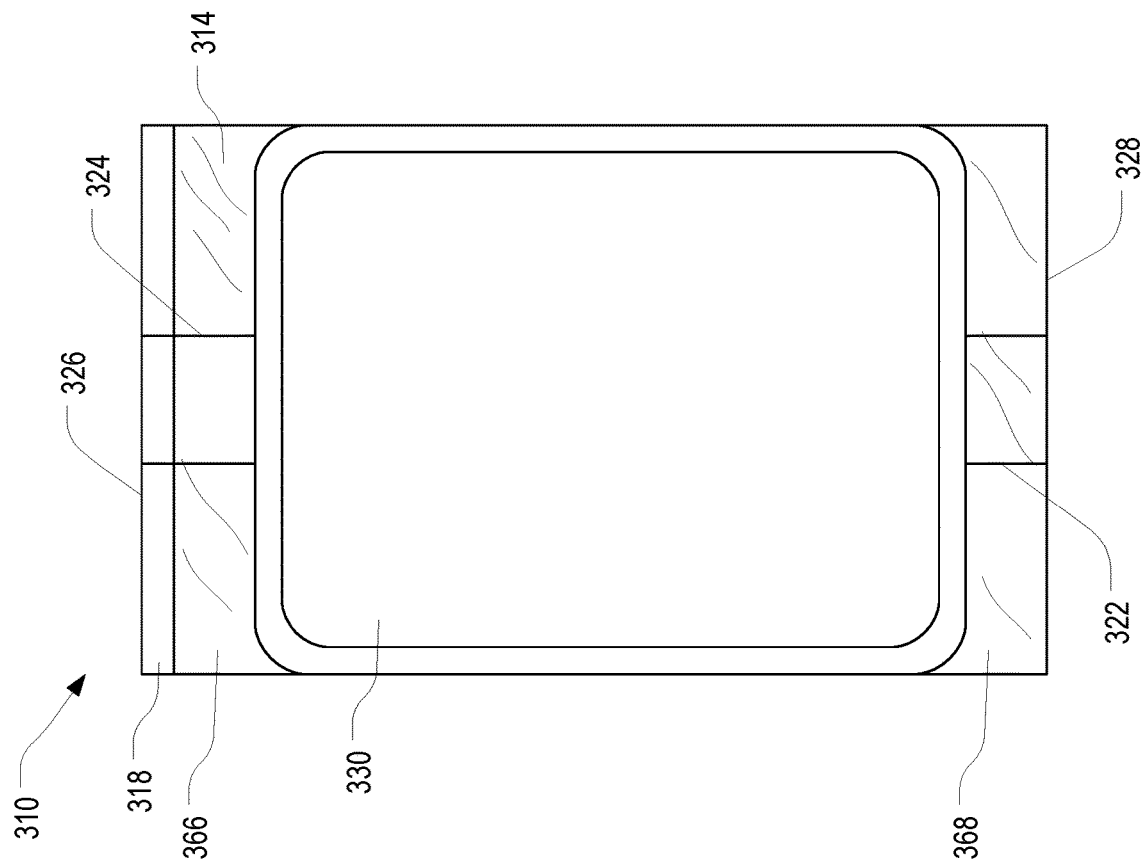
FIG. 40 is a front view of the wrapped tablet of FIG. 39, shown with some air bubbles or wrinkles removed.
Figure 41:
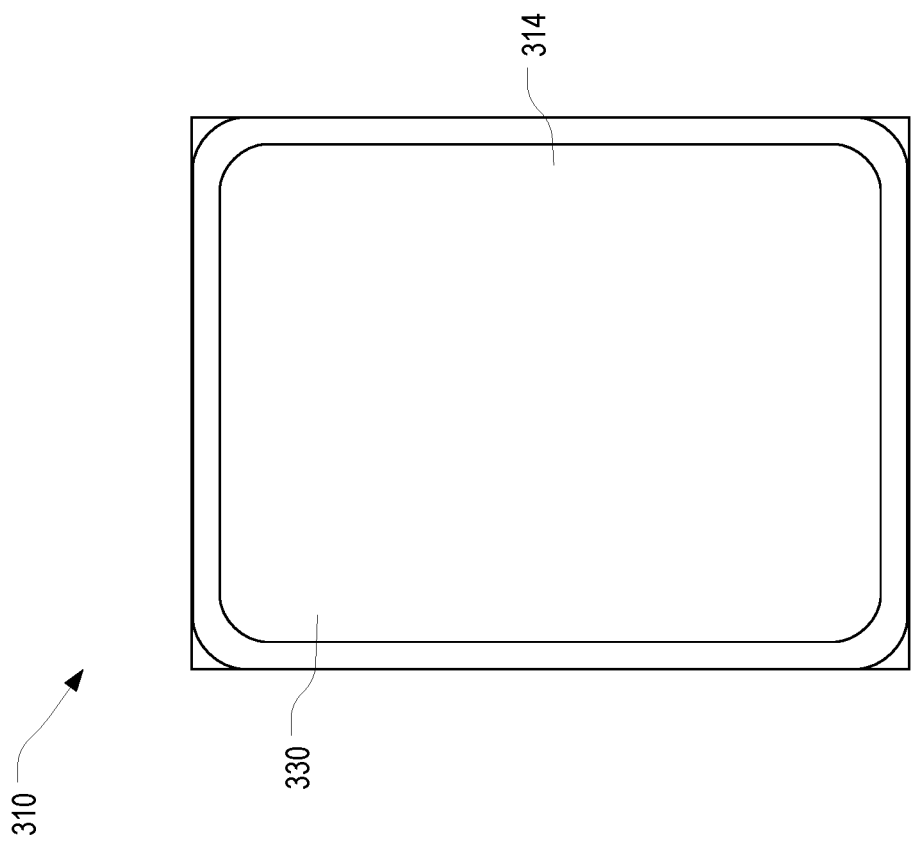
FIG. 41 is a front view of the wrapped tablet of FIG. 40, shown with excess top and bottom portions of the wrap folded down over the back of the tablet.

FIG. 39 is a front view of the wrapped tablet of FIG. 38. With reference to FIG. 39, the wrap 310 is arranged snugly around the large tablet 330, and no portion of the tacky surface 312 of the wrap 310 is left exposed. Because the wrap 310 is flush against the tablet 330 and formed of a clear material, the tablet 330 remains free for use and retains key functionality for viewing, for communicating, as well as for privacy features such as facial recognition. Dirt, germs, or biological contaminants that may exist on the surface of the tablet 330 are no longer exposed to the surrounding environment. Furthermore, antimicrobial capabilities of the wrap 310 may serve to help eliminate biological contaminants at the surface of the tablet 330 while simultaneously preventing growth of such contaminants at the exterior surface of the wrap 310 (i.e., the bottom, now-exposed surface 314). Additionally, the fully wrapped tablet 330 is ready for implementation of additional steps, such as use of the stylus 50 for removing air bubbles or wrinkles 52 and/or folding excess top and bottom portions of the wrap toward the rear of the tablet 330. In this regard, FIG. 40 is a front view of the wrapped tablet of FIG. 39, shown with air bubbles or wrinkles 52 removed from a front of the tablet 330 where the touchscreen and/or viewing interface is located to improve usability of the tablet while in the wrapped state, and FIG. 41 is a front view of the wrapped tablet of FIG. 40, shown with excess top and bottom portions 366,368 of the wrap 310 folded down over the back of the tablet 330. With respect to FIG. 41, it is also contemplated that one or both of the excess top and bottom portions 366,368 of the wrap 310 can be secured at the rear of the tablet 330 to help ensure that the front of the tablet 330 remains unobstructed when in use, as discussed above in connection with the wrap 10. In one contemplated embodiment, an adhesive for securing the excess top and bottom portions 366,368 at the rear of the wrapped tablet may be applied to the wrap either as a separate material or may be configured as part of the surface of the wrap. In this latter regard, it is contemplated that such an adhesive may be covered by a separate backing that is removable to reveal the adhesive for securing the excess top portion 366 and the excess bottom portion 368.

Figure 42:
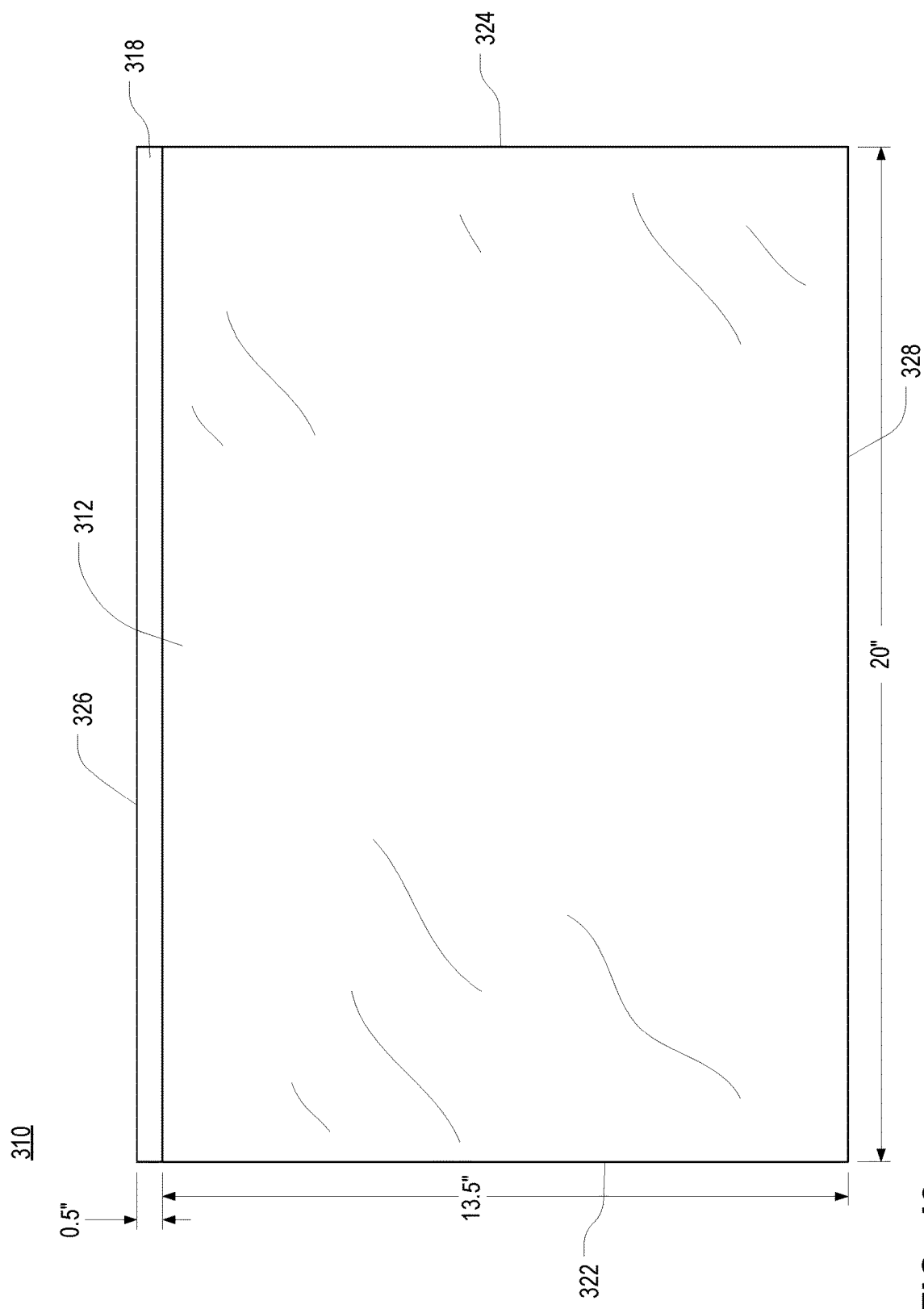
FIG. 42 is a front view of the wrap of FIG. 33 illustrating exemplary dimensions thereof.

FIG. 42 is a front view of the wrap 310 of FIG. 33 illustrating exemplary dimensions thereof. It is contemplated that the wrap may be provided with dimensions capable of accommodating a wide variety of differently sized and shaped tablets or other portable devices. In at least some embodiments, it is contemplated that the wrap 310 may have the dimensions shown in FIG. 42. Here, the wrap 310 has a rectangular shape with long edges measuring about 20 inches and short edges measuring about 13.5 inches. The non-tacky section 318 of the wrap 310 along the upper edge 326 has a side length measuring about 0.5 inches.

In some embodiments, it is contemplated that a plurality of disposable antimicrobial wraps in accordance with one or more aspects of the present invention may be provided to consumers as a large roll with a center spool. In such cases, individual wraps may be dispensed from the roll with perforations or score cuts separating adjacent wraps on the roll. A backing layer covering the tacky surface, as discussed above, may help preserve the tackiness of the tacky surface and ensures that each wrap is dispensed properly without sticking to the remaining roll of wraps.

In other embodiments, it is contemplated that a plurality of disposable antimicrobial wraps in accordance with one or more aspects of the present invention may be provided to consumers as a pack of individual wraps, such as a box that contains a stack of individual wraps. In this regard, a backing layer covering the tacky surface similarly helps to preserve the tackiness of the tacky surface and ensures that wraps within the stack do not stick to one another when removed from the box. It is contemplated that individual wraps within a box may be packaged independently of one another in sterile packages.

In use, it is contemplated that a disposable antimicrobial wrap 10,110,210,310 in accordance with one or more aspects of the present invention may be made available to potential users at a location near a point of entry into a clean or sterile environment. Prior to entry into the clean or sterile environment, a user is able to collect an individual wrap 10,110,210,310 (e.g., from a roll of wraps or from a stack of individual wraps) and use the wrap 10,110,210,310 to cover a smartphone or other portable device in accordance with one or more methods described herein. Once the smartphone and, optionally, a case for the smartphone are fully wrapped, a seal is formed between the smartphone and case, and there is no longer any risk of transfer of contaminants from the surface of the smartphone or case to the surrounding environment. The user may then enter into the clean or sterile environment without risk of contaminating the clean or sterile environment, and the smartphone is capable of complete or nearly complete functionality while the user remains in the clean or sterile environment. Once the user has left the clean or sterile environment, the wrap 10,110,210,310 may be removed from the smartphone or case in accordance with one or more methods described herein, and the wrap 10,110, 210,310 may be discarded.

It is likewise contemplated that a disposable antimicrobial wrap 10,110,210,310 in accordance with one or more aspects of the present invention can be made available to potential users at a location near a point of entry into a dirty or high-germ environment. Just as with a clean or sterile environment, a user is able to collect an individual wrap 10,110,210,310 (e.g., from a roll of wraps or from a stack of individual wraps) and use the wrap 10,110,210,310 to cover a smartphone or other portable device in accordance with one or more methods described herein prior to entry. Once the smartphone and, optionally, a case for the smartphone are fully wrapped, a seal is formed between the smartphone and case, and there is no longer any risk of transfer of contaminants to or from the smartphone or case vis-à-vis the surrounding environment. The user may then enter into the dirty or high-germ environment without risk of introducing contaminants from the environment to the smartphone and case, or vice versa, and the smartphone is capable of complete or nearly complete functionality while the user remains in the dirty or high-germ environment. It is contemplated that the wrap 10,110,210,310 shields the smartphone from contaminated desks, counters, or other surfaces upon which the wrapped smartphone may be placed. Once the user has left the dirty or high-germ environment, the wrap 10,110,210,310 may be removed from the smartphone in accordance with one or more methods described herein, and the wrap 10,110,210 may be discarded. Germs or dirt from the dirty or high-germ environment that may have collected on the exterior of the wrap (i.e., the non-tacky surface 14) are likewise discarded with the wrap 10,110,210.

With the foregoing in mind, it is contemplated that a disposable antimicrobial wrap 10,110 in accordance with one or more aspects of the present invention has utility across a broad range of use environments. Because the wrap 10,110,210,310 forms a seal around the smartphone and case, contaminants from the smartphone cannot enter into the surrounding environment, and contaminants from the surrounding environment cannot collect on the surface of the smartphone. Antimicrobial properties of the wrap 10,110, 210,310 likewise have the effect of further mitigating growth and spread of biological contaminants, whether on the surface of the smartphone (at an interior of the wrap 10,110, 210,310) or on an exterior, exposed surface of the wrap 10,110,210,310. Contemplated use environments for a disposable antimicrobial wrap 10,110,210,310 in accordance with one or more aspects of the present invention include, but are not limited to, medical facilities (including clean or sterile environments such as operating rooms or intensive care units), schools, universities, restaurants, banks, hotels, airports, nursing homes, dialysis facilities, physician offices, dental offices, gyms, collegiate locker rooms, professional locker rooms, and water parks. It is likewise contemplated that a disposable antimicrobial wrap 10,110,210,310 in accordance with one or more aspects of the present invention may have utility across a wide variety of employment positions in varying fields, including, but not limited to, health care workers, hospital workers, doctors, nurses, patients, laboratory workers, bank workers, post office or shipping workers, sewer company workers, construction workers, sanitation workers, hazardous material workers, farmers, hospitality workers, chefs, bartenders, food handlers, retail workers, officer building workers, factory workers, military workers, police officers, firefighters, pilots or aviation workers, mechanics, plumbers, meat packing workers, coal miners, painters, students, teachers, and early education workers.

Although the foregoing discussion centers on use and implementation of a disposable antimicrobial wrap 10,110, 210,310 in accordance with one or more aspects of the present invention in connection with covering a smartphone, it is contemplated that such a wrap and the methodologies discussed herein may be implemented in connection with other surfaces in various environments. For example, it is contemplated that other surfaces that may be covered by a disposable antimicrobial wrap 10,110,210,310 in accordance with one or more aspects of the present invention include, but are not limited to, doorknobs, door locks, door plates for pushing a door open, handrails, shopping cart handles, elevator buttons, computer touch screens, keypads, and movable partition grips. Notably, it is contemplated that the principles of the present invention, including a wrap as well as the methods for implementing a wrap, may be adapted and applied to any contact point that is exposed to high traffic (e.g., such as regular use by many different people on a daily or even hourly basis).

Based on the foregoing information, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claim(s) appended hereto and the equivalents thereof.

What is claimed is:

1. A covering section for use in shielding handheld electronic devices from a surrounding environment, the covering section comprising:
    a pliable layer having first and second oppositely facing sides, each including a surface, wherein the surface at the first side is an at least predominantly tacky surface having a water-based adhesive, and wherein the surface at the second side is a non-tacky surface; and
    a peel-away liner layer removably overlaid against the at least predominantly tacky surface of the pliable layer;
    wherein the pliable layer is formed of a transparent material, has a thickness measuring between about 2 mils and about 12 mils, and includes an antimicrobial agent; and
    wherein, upon separation of the peel-away liner layer from the pliable layer, the pliable layer is arrangeable relative to a handheld electronic device such that the pliable layer at least substantially entirely covers the handheld electronic device to provide a barrier between the handheld electronic device and the surrounding environment for preventing transmission of contaminants therebetween, whereby
        the at least predominantly tacky surface is removably adherable to the handheld electronic device, to the non-tacky surface of the pliable layer, or to itself,
        a display screen of the handheld electronic device is viewable through the pliable layer, and
        one or more device functions are available when the pliable layer is arranged to at least substantially entirely cover the handheld electronic device.

2. The covering section of claim 1, wherein the pliable layer has a thickness measuring between about 2 mils and about 3 mils.

3. The covering section of claim 1, wherein the pliable layer includes one or more of polyethylene, polyethylene terephthalate, polypropylene, polyester, polyurethane, or ethylene vinyl acetate.

4. The covering section of claim 1, wherein the pliable layer includes an ultraviolet inhibitor to reduce degradation from exposure to ultraviolet light.

5. The covering section of claim 1, wherein the water-based adhesive is a water-based acrylic adhesive.

6. The covering section of claim 1, wherein the antimicrobial agent is part of a water-based surface coating applied to the pliable layer.

7. The covering section of claim 1, wherein the antimicrobial agent includes silver ion particles embedded in the pliable layer.

8. The covering section of claim 1, wherein the antimicrobial agent includes silver ion particles that are part of a surface coating applied to one or both of the at least predominantly tacky surface and the non-tacky surface.

9. The covering section of claim 1, wherein a level of tackiness of the water-based adhesive measures between about 0.5 ounces per inch to about 12 ounces per inch.

10. The covering section of claim 1, wherein the pliable layer is dimensioned to have a generally quadrilateral shape.

11. The covering section of claim 10, wherein the generally quadrilateral shape is a generally square shape having sides measuring approximately nine inches.

12. The covering section of claim 1, wherein the at least predominantly tacky surface includes an area that is at least substantially free of tackiness located at an edge of the pliable layer to facilitate separation of the peel-away liner layer from the pliable layer.

13. The covering section of claim 1, wherein one or both of the pliable layer and the peel-away liner layer includes information that includes one or more of a user instruction, an advertisement, or a brand.

14. The covering section of claim 1, wherein the one or more device functions include one or more of camera functionality, audio functionality, video functionality, wireless connectivity functionality, telephone functionality, text communication functionality, scanning functionality, facial recognition functionality, touchscreen functionality, flashlight functionality, lock/unlock functionality, charging functionality, and volume control functionality.

15. The covering section of claim 1, wherein the handheld electronic device is a smartphone.

16. The covering section of claim 1, wherein the handheld electronic device is a tablet computer.

17. A method of shielding a handheld electronic device from a surrounding environment, the method comprising:
providing a covering section having a transparent pliable layer and a peel-away liner layer overlaid against an at least predominantly tacky surface of the transparent pliable layer, the at least predominantly tacky surface having a water-based adhesive;
separating the peel-away liner layer from the transparent pliable layer;
positioning the handheld electronic device relative to the at least predominantly tacky surface; and
folding the transparent pliable layer to at least substantially entirely cover the handheld electronic device such that the at least predominantly tacky surface adheres to the handheld electronic device or to the transparent pliable layer, thereby providing a barrier between the handheld electronic device and the surrounding environment for preventing transmission of contaminants therebetween;
wherein, with the transparent pliable layer substantially entirely covering the handheld electronic device,
a display screen of the handheld electronic device is viewable through the transparent pliable layer, and
one or more device functions are available to a user of the handheld electronic device.

18. The method of claim 17, wherein the pliable layer includes an antimicrobial agent.

19. The method of claim 17, wherein the at least predominantly tacky surface includes an area that is at least substantially free of tackiness located at an edge of the transparent pliable layer to facilitate separation of the peel-away liner layer from the transparent pliable layer.

20. The method of claim 17, wherein the one or more device functions include one or more of camera functionality, audio functionality, video functionality, wireless connectivity functionality, telephone functionality, text communication functionality, scanning functionality, facial recognition functionality, touchscreen functionality, flashlight functionality, lock/unlock functionality, charging functionality, and volume control functionality.

\* \* \* \* \*